(12) United States Patent
Sugai

(10) Patent No.: US 10,946,652 B2
(45) Date of Patent: *Mar. 16, 2021

(54) DISPLACEMENT AMPLIFYING MECHANISM AND LIQUID EJECTING APPARATUS USING THE SAME

(71) Applicant: SEIKO EPSON CORPORATION, Tokyo (JP)

(72) Inventor: Keigo Sugai, Chino (JP)

(73) Assignee: Seiko Epson Corporation, Tokyo (JP)

(*) Notice: Subject to any disclaimer, the term of this patent is extended or adjusted under 35 U.S.C. 154(b) by 28 days.

This patent is subject to a terminal disclaimer.

(21) Appl. No.: 16/146,810

(22) Filed: Sep. 28, 2018

(65) Prior Publication Data

US 2019/0100008 A1   Apr. 4, 2019

(30) Foreign Application Priority Data

Sep. 29, 2017 (JP) .............................. JP2017-189285
Nov. 30, 2017 (JP) .............................. JP2017-229812

(51) Int. Cl.
*B41J 2/14* (2006.01)
*F04B 43/04* (2006.01)
(Continued)

(52) U.S. Cl.
CPC ......... *B41J 2/14201* (2013.01); *F04B 17/003* (2013.01); *F04B 43/046* (2013.01);
(Continued)

(58) Field of Classification Search
CPC .................. B41J 2/14201; B41J 2202/12; B41J 2202/05; B41J 2002/14483; F04B 43/06; F04B 17/003; F04B 43/046; H02N 2/043

See application file for complete search history.

(56) References Cited

U.S. PATENT DOCUMENTS 4,380,018 A * 4/1983 Andoh ................. B41J 2/14298
346/47
4,383,264 A 5/1983 Lewis
(Continued)

FOREIGN PATENT DOCUMENTS

DE 4407962 C 6/1995
JP 63-169778 A 7/1988
(Continued)

OTHER PUBLICATIONS

Partial European Search Report issued in Application No. EP18197523 dated Jun. 11, 2019.

*Primary Examiner* — Geoffrey S Mruk
(74) *Attorney, Agent, or Firm* — Workman Nydegger

(57) ABSTRACT

An displacement amplifying mechanism that enlarges an amount of displacement of an actuator includes an accommodation chamber in which a liquid is sealed, a first wall portion that forms a wall surface of the accommodation chamber and applies a pressure to the liquid in accordance with displacement of the actuator, and a second wall portion that forms the wall surface of the accommodation chamber and is displaced in a first direction which is a direction away from the accommodation chamber in a state where an elastic force acting in a second direction approaching the accommodation chamber is generated by a pressure of the liquid when the first wall portion applies the pressure to the liquid, in which an area of the second wall portion in contact with the liquid is smaller than an area of the first wall portion in contact with the liquid.

5 Claims, 24 Drawing Sheets

(51) Int. Cl.
*F04B 43/06* (2006.01)
*F04B 17/00* (2006.01)
*H02N 2/04* (2006.01)

(52) U.S. Cl.
CPC ..... *F04B 43/06* (2013.01); *B41J 2002/14483* (2013.01); *B41J 2202/05* (2013.01); *B41J 2202/12* (2013.01); *H02N 2/043* (2013.01)

(56) References Cited

U.S. PATENT DOCUMENTS

| | | |
|---|---|---|
| 10,518,532 B2 * | 12/2019 | Sugai .................. B41J 2/14201 |
| 2009/0311116 A1 | 12/2009 | Bai |
| 2011/0228012 A1 | 9/2011 | Yoshida et al. |
| 2012/0113197 A1 * | 5/2012 | Kashu ................... B41J 2/1404 |
| | | 347/89 |
| 2013/0047839 A1 | 2/2013 | Melz |
| 2014/0217127 A1 | 8/2014 | Ikushima |
| 2016/0193624 A1 | 7/2016 | Ikushima |

FOREIGN PATENT DOCUMENTS

| | | |
|---|---|---|
| JP | 63-169779 A | 7/1988 |
| JP | 03-153977 A | 7/1991 |
| JP | H04-078383 | 3/1992 |
| JP | H0478383 A | 3/1992 |
| JP | 07-301354 A | 1/1995 |
| JP | 2001-063047 | 3/2001 |
| JP | 2011-173029 A | 2/2010 |
| JP | 2011-213094 | 10/2011 |
| JP | 2015-051399 A | 3/2015 |

* cited by examiner

DISPLACEMENT AMPLIFYING MECHANISM AND LIQUID EJECTING APPARATUS USING THE SAME

BACKGROUND

1. Technical Field

The present invention relates to an displacement amplifying mechanism and a liquid ejecting apparatus using the same.

2. Related Art

In the related art, an displacement amplifying mechanism for mechanically enlarging and transmitting an amount of displacement of an actuator such as a piezoelectric element has been proposed. For example, in an displacement amplifying mechanism of the following JP-A-7-301354, a large diameter piston is pushed by the actuator to generate pressure in a liquid, and a small diameter piston having an area facing the liquid is smaller than that of the large diameter piston is displaced by the pressure. According to the displacement amplifying mechanism of JP-A-7-301354, the amount of displacement of the small diameter piston is larger than the amount of displacement of the large diameter piston according to the principle of Pascal.

However, in the technique of JP-A-7-301354, in a case where the piezoelectric element is rapidly contracted and the large diameter piston is pulled back, the displacement of the small diameter piston cannot sufficiently follow the displacement of the large diameter piston and there is a possibility that the pressure of the liquid rapidly decreases and air bubbles are generated in the liquid. Once such air bubbles are generated in the liquid, the compliance of the movement of the small diameter piston with respect to the drive timing of the piezoelectric element decreases. As described above, in the displacement amplifying mechanism, there is still room for improvement in enhancing the responsiveness to the displacement of the actuator.

SUMMARY

The invention can be realized in the following aspects.

[1] According to a first aspect of the invention, there is provided an displacement amplifying mechanism that enlarges an amount of displacement of an actuator. An displacement amplifying mechanism of this aspect includes an accommodation chamber in which a liquid is sealed, a first wall portion that forms a wall surface of the accommodation chamber and applies a pressure to the liquid in accordance with displacement of the actuator, and a second wall portion that forms the wall surface of the accommodation chamber and is displaced in a first direction which is a direction away from the accommodation chamber in a state where an elastic force acting in a second direction approaching the accommodation chamber is generated by a pressure of the liquid when the first wall portion applies the pressure to the liquid, in which an area of the second wall portion in contact with the liquid is smaller than an area of the first wall portion in contact with the liquid.

In this case, the displacement of the second wall portion in the second direction is promoted when the first wall portion is displaced in the direction of returning to the position before displacement by the elastic force acting in the second direction generated when the second wall portion is displaced in the first direction. Therefore, the responsiveness of the second wall portion to the displacement of the first wall portion by the actuator is enhanced. Therefore, for example, when the first wall portion is displaced in a direction where the volume of the accommodation chamber is expanded after the second wall portion is displaced in the first direction, by delaying the displacement of the second wall portion in the second direction, the pressure in the accommodation chamber is lowered, and air bubbles are inhibited from being generated in the liquid.

[2] In the displacement amplifying mechanism, the second wall portion is formed of a diaphragm that is flexibly deformed.

In this case, the second wall portion can be easily formed of the diaphragm.

[3] In the displacement amplifying mechanism, the second wall portion is supported by an elastic member, and the elastic member is elastically deformed so as to generate an elastic force acting in the second direction when the first wall portion applies the pressure to the liquid to move a position of the second wall portion in the first direction.

In this case, the elastic force for displacing the second wall portion in the second direction can easily be generated by the elastic member.

[4] In the displacement amplifying mechanism, a compliance suppressing member having a compressibility lower than that of the liquid is disposed in the accommodation chamber.

[5] In the displacement amplifying mechanism, the compliance suppressing member is a filler and is disposed dispersedly in the accommodation chamber.

[6] In the displacement amplifying mechanism, the compliance suppressing member is a protrusion extending from the first wall portion toward the accommodation chamber.

In this case, since the compliance suppressing member or the filler inhibits the compression of the liquid in the accommodation chamber, it is possible to inhibit the driving force of the actuator from being absorbed by the compression of the liquid. Therefore, pressure can be efficiently transmitted from the first wall portion to the second wall portion.

[7] In the displacement amplifying mechanism, when the second wall portion is flexibly deformed in the first direction, a portion of the second wall portion protruding most in the first direction is defined as a deformation center portion, and a thickness of the second wall portion is smaller than a minimum length of a line segment passing through the deformation center portion and connecting both ends of the second wall portion in a state where the second wall portion is not flexibly deformed.

[8] According to a second aspect of the invention, there is provided a liquid ejecting apparatus. The liquid ejecting apparatus of this aspect includes a pressure chamber that communicates with a nozzle and contains an ejection liquid to be ejected from the nozzle, a flow path that is connected to the pressure chamber and through which the ejection liquid circulates, an actuator that changes a pressure of the pressure chamber by changing a volume of the pressure chamber, and an displacement amplifying mechanism that is disposed between the pressure chamber and the actuator, enlarges an amount of displacement of the actuator, and transmits the enlarged amount of displacement to the pressure chamber, in which the displacement amplifying mechanism includes an accommodation chamber in which a liquid is sealed, a first wall portion that forms a wall surface of the accommodation chamber and applies a pressure to the liquid in accordance with displacement of the actuator, and a second wall portion that forms the wall surface of the accommodation chamber and is displaced in a first direction which is a direction away from the accommodation chamber in a state where an elastic force acting in a second direction approaching the accommodation chamber is generated by a pressure of the liquid when the first wall applies the pressure to the liquid, and an area of the second wall portion in contact with the liquid is smaller than an area of the first wall portion in contact with the liquid.

In this case, since the amount of displacement of the actuator can be enlarged by the displacement amplifying mechanism, it is possible to efficiently increase the pressure for ejecting the ejection liquid. In addition, since the responsiveness of the displacement amplifying mechanism to the displacement of the actuator is enhanced, the accuracy of liquid ejection is enhanced.

[9] In the liquid ejecting apparatus, a wall surface of the second wall portion of the displacement amplifying mechanism opposite to the accommodation chamber forms a portion of a wall surface of the pressure chamber, and when the second wall portion is displaced by the actuator, the second wall portion generates a pressure for ejecting the ejection liquid in the pressure chamber from the nozzle and closes the flow path.

In this case, the pressure for ejecting the ejection liquid generated by the displacement of the second wall portion from the nozzle is inhibited from escaping to the flow path. Therefore, the ejection efficiency of the ejection liquid can be enhanced.

[10] In the liquid ejecting apparatus, the flow path includes a supply flow path that supplies the ejection liquid to the pressure chamber, and the liquid ejecting apparatus includes a supply portion that pressure-feeds the ejection liquid to the pressure chamber through the supply flow path.

In this case, the pressure inside the pressure chamber can be appropriately controlled by pressure-feeding the ejection liquid to the pressure chamber by the supply portion.

[11] In the liquid ejecting apparatus, the flow path further includes a discharge flow path that discharges the ejection liquid from the pressure chamber, and the liquid ejecting apparatus includes a circulation portion that circulates the ejection liquid discharged through the discharge flow path to the pressure chamber.

In this case, deterioration of the ejection liquid caused by the retention in the pressure chamber is inhibited. In addition, since the ejection liquid discharged from the pressure chamber through the discharge flow path is reused, the utilization efficiency of the ejection liquid can be enhanced.

[12] The liquid ejecting apparatus further includes a plurality of sets of the nozzle, the pressure chamber, the actuator, and the displacement amplifying mechanism.

In this case, it is possible to efficiently eject the ejection liquid from each of the plurality of nozzles.

[13] According to a third aspect of the invention, there is provided an displacement amplifying mechanism that enlarges an amount of displacement of an actuator. The displacement amplifying mechanism of this aspect includes an accommodation chamber in which an elastic material is accommodated, and a deformation portion that forms a wall surface of the accommodation chamber and is displaced in a first direction which is a direction away from the accommodation chamber in a state where an elastic force acting in a second direction approaching the accommodation chamber is generated by a pressure of the elastic material when the actuator applies a pressure to the elastic material, in which an area of the deformation portion in contact with the elastic material is smaller than an area of a region of the elastic material subjected to pressure from the actuator.

In this case, the amount of displacement of the deformation portion can be increased larger than the amount of displacement of the actuator by a simplified configuration using the elastic material having a property of transmitting pressure as a liquid. In this case, since the elastic material is supported by the partition wall portion, the compliance of the elastic material with respect to the displacement of the actuator is enhanced. In addition, even if the displacement is repeatedly increased or decreased by the actuator, the elastic material is inhibited from leaking into the pressure chamber by the partition wall portion. Additionally, even at the time of manufacturing, when the elastic material is used, it is easier to transport and install the elastic material, and it is possible to facilitate a manufacturing step, as compared with the case of using the liquid as the pressure transmission medium in the displacement amplifying mechanism.

[14] In the displacement amplifying mechanism, a filler having a compressibility lower than that of the elastic material is disposed dispersedly in the accommodation chamber.

In this case, since the reduction of the volume of the elastic material when pressed by the actuator is inhibited by the filler, the pressure transmission efficiency can be enhanced.

[15] In the displacement amplifying mechanism, the deformation portion is formed of a diaphragm that is flexibly deformed.

In this case, it is possible to enhance the compliance of the elastic material and the deformation portion against the displacement of the actuator when the actuator is displaced in the direction of decreasing the pressure of the pressure chamber after the liquid is ejected. Therefore, the accuracy of liquid ejection control can be enhanced.

[16] In the displacement amplifying mechanism, a Young's modulus of the deformation portion is larger than a Young's modulus of the elastic material.

In this case, the compliance of the elastic material and the deformation portion against the displacement of the actuator can be further enhanced.

[17] In the displacement amplifying mechanism, when the deformation portion is flexibly deformed in the first direction, a portion protruding most in the first direction on the deformation portion is defined as a deformation center portion, and a thickness of the deformation portion is smaller than a minimum length of a line segment passing through the deformation center portion and connecting both ends of the deformation portion in a state where the deformation portion is not flexibly deformed.

In this case, it is easy to flexibly deform the deformation portion, and the compliance of displacement of the deformation portion against the displacement of the elastic material can be enhanced.

[18] The displacement amplifying mechanism further includes a sealing wall portion which is disposed between the actuator and the elastic material, seals the accommodation chamber, and is flexibly deformed by displacement of the actuator.

In this case, the sealing wall portion inhibits the elastic material from leaking from the accommodation chamber toward the actuator.

[19] The displacement amplifying mechanism further includes an adjustment portion that pressurizes the elastic material.

In this case, the elastic material is pressurized in advance by the adjustment portion for pressurizing the elastic material and the responsiveness when pressure is applied from the actuator can be enhanced.

[20] According to a fourth aspect of the invention, there is provided a liquid ejecting apparatus. The liquid ejecting apparatus of this aspect includes a pressure chamber that communicates with a nozzle and contains an ejection liquid ejected from the nozzle, a flow path that is connected to the pressure chamber and through which the ejection liquid circulates, an actuator that changes a pressure of the pressure chamber by changing a volume of the pressure chamber, and an displacement amplifying mechanism that is disposed between the pressure chamber and the actuator, enlarges an amount of displacement of the actuator, and transmits the enlarged amount of displacement to the pressure chamber, in which the displacement amplifying mechanism includes an accommodation chamber in which an elastic material is accommodated, and a deformation portion that forms a wall surface of the accommodation chamber and is displaced in a first direction which is a direction away from the accommodation chamber in a state where an elastic force acting in a second direction approaching the accommodation chamber is generated by a pressure of the elastic material when the actuator applies a pressure to the elastic material, and an area of the deformation portion in contact with the elastic material is smaller than an area of a region of the elastic material subjected to pressure from the actuator.

In this case, the amount of displacement of the deformation portion can be increased larger than the amount of displacement of the actuator by a simplified configuration of the displacement amplifying mechanism using the elastic material having a property of transmitting pressure as a liquid. In this case, since the joint mechanism formed of the rigid body and the use place of the gear can be reduced, occurrence of mechanical wear in the liquid ejecting apparatus is inhibited. In addition, since the elastic material is supported by the partition wall portion, the compliance of the elastic material with respect to the displacement of the actuator is enhanced. In addition, even if the displacement is repeatedly increased or decreased by the actuator, the elastic material is inhibited from leaking into the pressure chamber by the partition wall portion. Additionally, even at the time of manufacturing the liquid ejecting apparatus, when the elastic material is used, it is easier to transport and install the elastic material, and it is possible to facilitate a manufacturing step, as compared with the case of using the liquid as the pressure transmission medium in the displacement amplifying mechanism.

[21] In the liquid ejecting apparatus, a wall surface of the deformation portion of the displacement amplifying mechanism opposite to the accommodation chamber forms a portion of a wall surface of the pressure chamber, and when the deformation portion is displaced by the actuator, the deformation portion generates a pressure for ejecting the ejection liquid in the pressure chamber from the nozzle and closes the flow path.

In this case, it is possible to inhibit the ejection pressure from being released to the outside of the pressure chamber through the flow path while generating the ejection pressure by the flexure deformation of the deformation portion. Therefore, the liquid ejection efficiency in the liquid ejecting apparatus can be enhanced.

[22] In the liquid ejecting apparatus, the flow path includes a supply flow path that supplies the ejection liquid to the pressure chamber, and the liquid ejecting apparatus includes a supply portion that pressure-feeds the ejection liquid to the pressure chamber through the supply flow path.

[23] In the liquid ejecting apparatus, the flow path further includes a discharge flow path that discharges the ejection liquid from the pressure chamber, and the liquid ejecting apparatus includes a circulation portion that circulates the ejection liquid discharged through the discharge flow path to the pressure chamber.

In this case, it is possible to inhibit the deterioration of the ejection performance caused by the retention of the liquid in the pressure chamber.

[24] The liquid ejecting apparatus further includes a plurality of sets of the nozzle, the pressure chamber, the actuator, and the displacement amplifying mechanism.

In this case, it is possible to eject liquid from each of the plurality of nozzles.

The invention can be realized in various forms other than the displacement amplifying mechanism and the liquid ejecting apparatus provided therewith. For example, the invention can be realized in the form of a method of expanding and transmitting the amount of displacement of the actuator, a method of controlling the amount of displacement of the actuator, various types of apparatus having the displacement amplifying mechanism other than the liquid ejecting apparatus, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
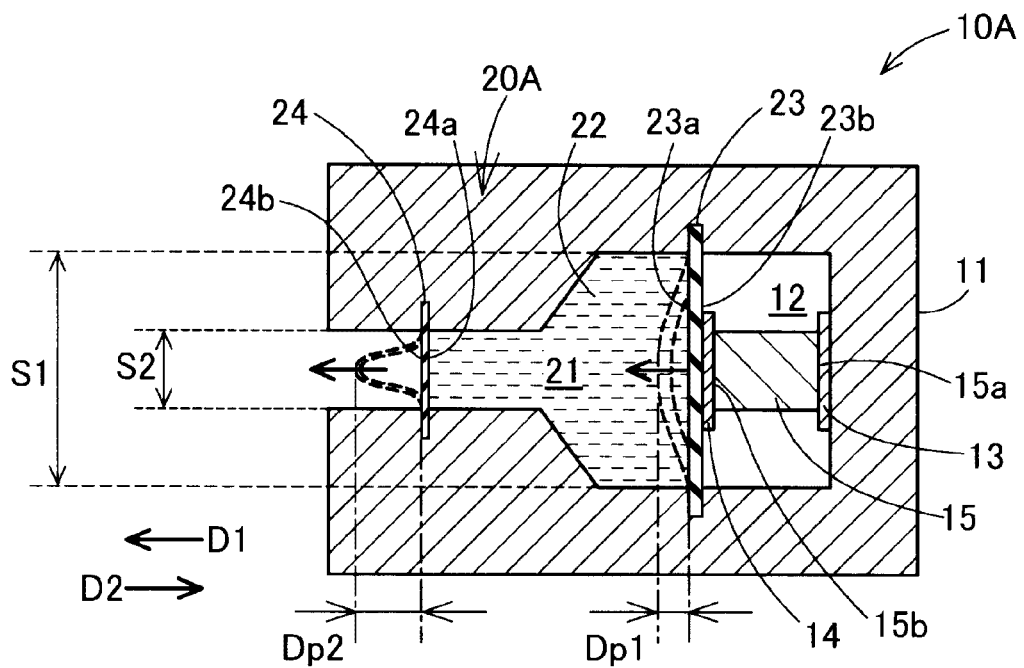
FIG. 1 is a schematic diagram showing a configuration of a displacement generator provided with an displacement amplifying mechanism according to a first embodiment.

FIG. 1 is a schematic diagram showing a configuration of a displacement generator 10A provided with an displacement amplifying mechanism 20A according to a first embodiment. The displacement generator 10A is provided with a housing 11 and an actuator 15, in addition to the displacement amplifying mechanism 20A. In the displacement generator 10A, the displacement generated by the actuator 15 is enlarged by the displacement amplifying mechanism 20A and is transmitted to an external load (not shown) connected to the displacement generator 10A. Inside the housing 11, there are provided a drive chamber 12 in which the actuator 15 is accommodated and an accommodation chamber 21 which is one of the constituent elements of the displacement amplifying mechanism 20A.

The actuator 15 generates displacement by expansion and contraction motion. In the first embodiment, the actuator 15 is formed of a piezoelectric element (piezo element) that expands and contracts in accordance with an applied voltage and generates displacement. A first end portion 15a in an expansion and contraction direction of the actuator 15 is fixed to the housing 11 via a fixing portion 13. By the expansion and contraction deformation of the actuator 15, a position of a second end portion 15b opposite to the first end portion 15a moves. An amount of displacement of the actuator 15 is an amount of movement of the second end portion 15b due to the expansion and contraction deformation of the actuator 15.

The displacement amplifying mechanism 20A of the first embodiment is configured to include the accommodation chamber 21, a liquid 22, a first wall portion 23, and a second wall portion 24. The accommodation chamber 21 is a hollow portion provided inside the housing 11 as described above and is sealed by the first wall portion 23 and the second wall portion 24. In the accommodation chamber 21, the liquid 22 is sealed.

The type of the liquid 22 is not particularly limited. The liquid 22 may be any liquid having fluidity. The liquid 22 may be, for example, water, oil, liquid metal, fluorinated inert liquid, and liquid resin, and may be a gel-like fluid such as slime. It is desirable that the accommodation chamber 21 is filled with the liquid 22 in a pressurized state in order to enhance pressure transmission efficiency described later. In addition, it is desirable that the liquid 22 is previously subjected to deforming treatment so as to inhibit generation of air bubbles due to cavitation when the pressure changes. In the displacement amplifying mechanism 20A, for example, an indicator portion for confirming the pressure state of the accommodation chamber 21 may be provided by constituting a portion of the wall portion of the accommodation chamber 21 with a member flexibly deformed according to the pressure of the liquid 22.

The first wall portion 23 is a wall portion that air-tightly separates the accommodation chamber 21 from the drive chamber 12. An outer peripheral end of the first wall portion 23 is fixed to the housing 11. A first wall surface 23a of the first wall portion 23 faces the liquid 22 of the accommodation chamber 21 and configures to include a portion of the wall surface of the accommodation chamber 21. A second wall surface 23b on a side opposite to the first wall surface 23a is connected to the second end portion 15b of the actuator 15 via a connection portion 14. The first wall portion 23 functions as a diaphragm flexibly deformed in a thickness direction according to the displacement of the actuator 15. In the first embodiment, the first wall portion 23 is formed of a film-shaped member made of rubber. The first wall portion 23 may not be formed of a member made of rubber. The first wall portion 23 may be formed of another resin member, or may be formed of a metal plate.

The second wall portion 24 is a wall portion that air-tightly separates the accommodation chamber 21 from the outside. An outer peripheral end of the second wall portion 24 is fixed to the housing 11. A first wall surface 24a of the second wall portion 24 faces the liquid 22 of the accommodation chamber 21 and configures to include a portion of the wall surface of the accommodation chamber 21. A second wall surface 24b on a side opposite to the first wall surface 24a is connected to the above-described external load (not shown). The second wall portion 24 functions as a diaphragm flexibly deformed in the thickness direction according to a change in the pressure of the accommodation chamber 21. The second wall portion 24 is formed of a member that generates an elastic force as a restoring force when flexibly deformed. In the first embodiment, the second wall portion 24 is formed of a film-shaped member made of rubber. The second wall portion 24 may not be formed of a member made of rubber, may be formed of another resin member, or may be formed of a metal.

When the pressure of the liquid 22 in the accommodation chamber 21 is enhanced by displacing the first wall portion 23, the second wall portion 24 is displaced in the first direction D1, which is a direction away from the accommodation chamber 21, in a state where an elastic force acting in the second direction D2, which is a direction approaching the accommodation chamber 21, is generated by the pressure of the liquid 22. The first direction D1 is a direction along the thickness direction of the second wall portion 24 and is a direction toward the second wall portion 24 from the accommodation chamber 21. The second direction D2 is a direction toward a direction opposite to the first direction D1. In the first embodiment, the elastic force acting in the second direction D2 caused by the displacement of the second wall portion 24 is generated as the restoring force against the flexure deformation of the second wall portion 24.

In the displacement amplifying mechanism 20A, an area S2 where the first wall surface 24a of the second wall portion 24 faces the liquid 22 of the accommodation chamber 21 is smaller than an area S1 where the first wall surface 23a of the first wall portion 23 faces the liquid 22 of the accommodation chamber 21. The area S1 of the first wall portion 23 is an area of a region where the region where the first wall surface 23a faces the liquid 22 is projected in the displacement direction on the virtual plane orthogonal to the displacement direction of the first wall portion 23. Similarly, the area S2 of the second wall portion 24 is an area of a region where the region where the first wall surface 24a faces the liquid 22 is projected in the displacement direction on the virtual plane orthogonal to the displacement direction of the second wall portion 24.

In the displacement amplifying mechanism 20A, as described above, a difference is provided between the area S1 of the first wall portion 23 and the area S2 of the second wall portion 24. Therefore, according to the principle of Pascal, the amount of displacement Dp2 of the second wall portion 24 is enlarged more than the amount of displacement Dp1 of the first wall portion 23 according to the difference between the areas S1 and S2. In addition, according to the displacement amplifying mechanism 20A, when the actuator 15 expands or contracts, the elastic force in the second direction D2 is generated in the second wall portion 24. Therefore, the displacement of the second wall portion 24 in the second direction D2 when the actuator 15 contracts is assisted by the elastic force thereof, so that the delay of the displacement of the first wall portion 23 is inhibited. Therefore, even in a case where the actuator 15 is contracted at a high speed, the pressure in the accommodation chamber 21 is rapidly lowered due to the response delay of the second wall portion 24, and air bubbles are inhibited from being generated in the liquid 22.

Figure 2:
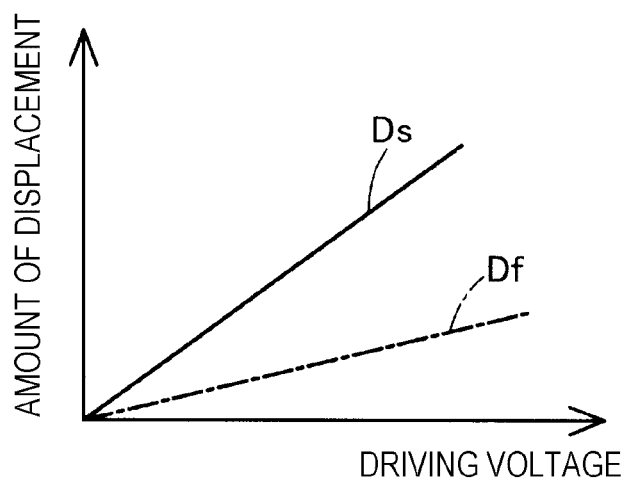
FIG. 2 is a first explanatory diagram showing an operation characteristic of an displacement amplifying mechanism of the first embodiment.
Figure 3:
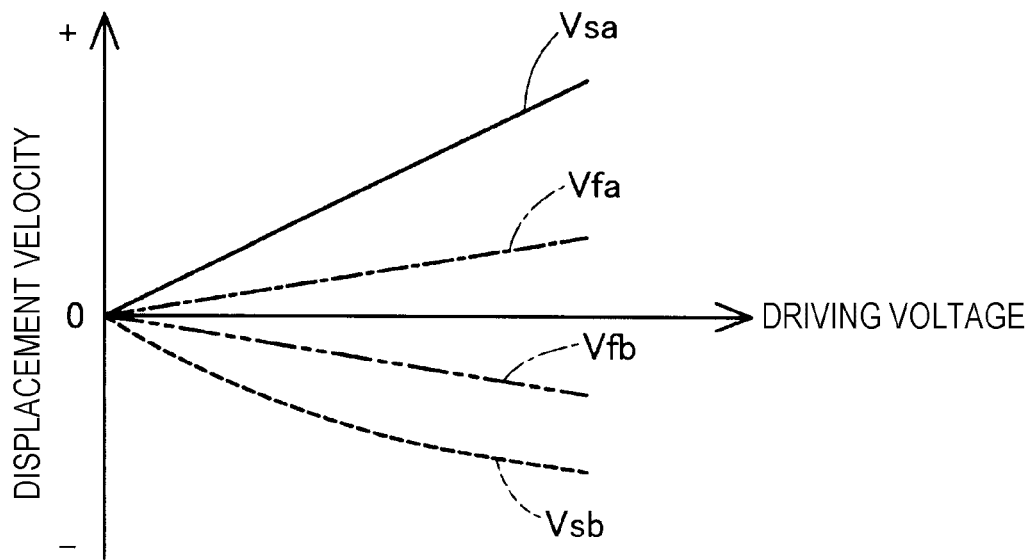
FIG. 3 is a second explanatory diagram showing the operation characteristic of the displacement amplifying mechanism of the first embodiment.

FIGS. 2 and 3 are explanatory diagrams showing an operation characteristic of the displacement amplifying mechanism 20A verified by experiment of the inventor of the invention. FIG. 2 shows graphs Df and Ds showing changes in amounts of displacement of the first wall portion 23 and the second wall portion 24 with respect to the driving voltage applied to the actuator 15. The one dot chain line graph Df shows the amount of displacement of the first wall portion 23, and the solid line graph Ds shows the amount of displacement of the second wall portion 24. In the displacement amplifying mechanism 20A, it is confirmed that the amount of displacement of each of the first wall portion 23 and the second wall portion 24 linearly increases with respect to increase of the driving voltage. In addition, it is confirmed that the amount of displacement of the second wall portion 24 is larger than the amount of displacement of the first wall portion 23 in accordance with the difference between the areas S1 and S2 (FIG. 1) with respect to the same driving voltage.

FIG. 3 shows graphs Df and Ds showing changes in displacement velocity of the first wall portion 23 and the second wall portion 24 with respect to the driving voltage applied to the actuator 15. In the graph of FIG. 3, the displacement velocity when displaced in the first direction D1 (FIG. 1) is positive (+) and the displacement velocity when displaced in the second direction D2 (FIG. 1) is negative (−). The one dot chain line graph Vfa and the two dot chain line graph Vfb indicate the displacement velocity of the first wall portion 23. The solid line graph Vsa and the broken line graph Vsb indicate the displacement velocity of the second wall portion 24. In the displacement amplifying mechanism 20A, it is confirmed that the displacement velocity of the second wall portion 24 when displaced in the first direction D1 is increased more than the displacement velocity of the first wall portion 23 in accordance with the difference between the areas S1 and S2, similarly to the amount of displacement. In addition, it is confirmed that the displacement velocity of the second wall portion 24 when displaced in the second direction D2 is increased more than the displacement velocity of the first wall portion 23 at substantially the same rate as when displaced in the first direction D1.

As described above, according to the displacement amplifying mechanism 20A in the first embodiment, it is possible to easily enlarge the amount of displacement of the actuator 15 by using the Pascal principle. In addition, responsiveness of the second wall portion 24 to the displacement of the actuator 15 is enhanced by the elastic force acting in the second direction D2 generated when the second wall portion 24 is displaced in the first direction D1. Additionally, according to the displacement amplifying mechanism 20A of the first embodiment and the displacement generator 10A provided therewith, various operational effects described in the above embodiment can be achieved.

2. Second Embodiment

Figure 4:
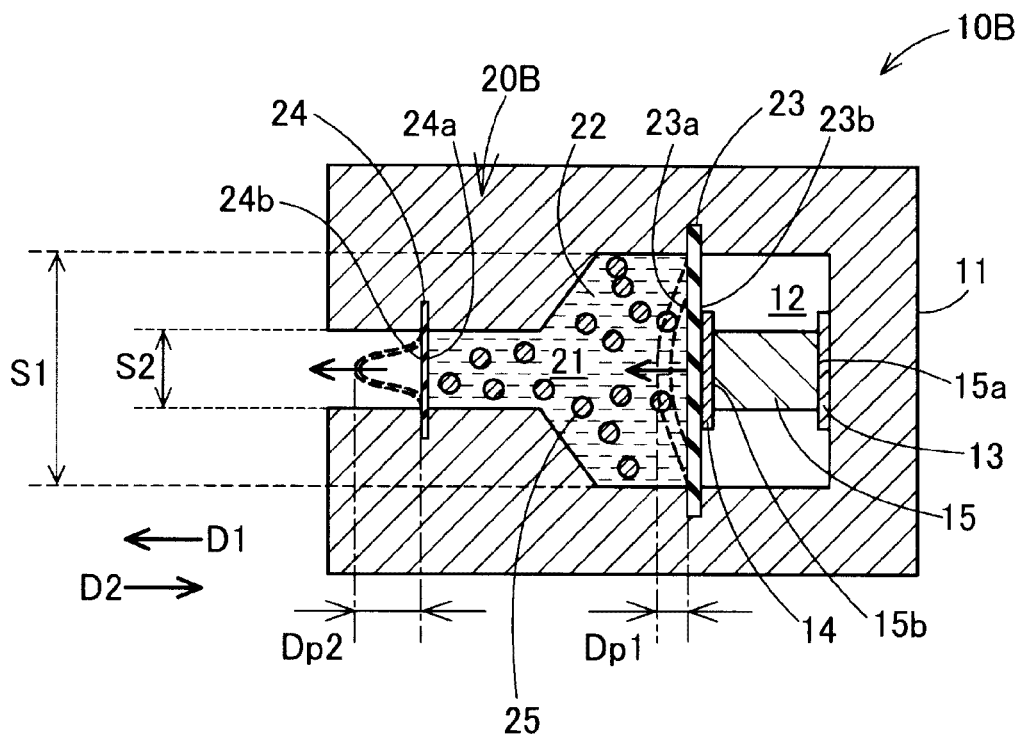
FIG. 4 is a schematic diagram showing a configuration of an displacement amplifying mechanism according to a second embodiment.

With reference to FIG. 4, the configuration of an displacement amplifying mechanism 20B in a second embodiment will be described. FIG. 4 is a schematic diagram showing a configuration of an enlarging generation device 10B provided with the displacement amplifying mechanism 20B according to the second embodiment. The configuration of the displacement generator 10B of the second embodiment is substantially the same as that of the displacement generator 10A of the first embodiment except that the displacement amplifying mechanism 20B of the second embodiment is provided instead of the displacement amplifying mechanism 20A of the first embodiment. The configuration of the displacement amplifying mechanism 20B of the second embodiment is substantially the same as that of the displacement amplifying mechanism 20A of the first embodiment except that a filler 25 is dispersed in the liquid 22.

The filler 25 is formed of a member in which a material having a compressibility lower than that of the liquid 22 is granulated. The filler 25 may be formed of, for example, metal, resin, ceramics, glass, or the like. According to the displacement amplifying mechanism 20B of the second embodiment, the filler 25 inhibits the pressure applied from the actuator 15 from being absorbed by the compression of the volume of the liquid 22. Therefore, the transmission efficiency of the pressure from the first wall portion 23 to the second wall portion 24 via the accommodation chamber 21 is enhanced, and the responsiveness of the displacement amplifying mechanism 20B to the displacement of the actuator 15 is enhanced. Additionally, according to the displacement amplifying mechanism 20B of the second embodiment and the displacement generator 10B provided therewith, the various operational effects described in the first embodiment and the second embodiment can be achieved.

3. Third Embodiment

Figure 5:
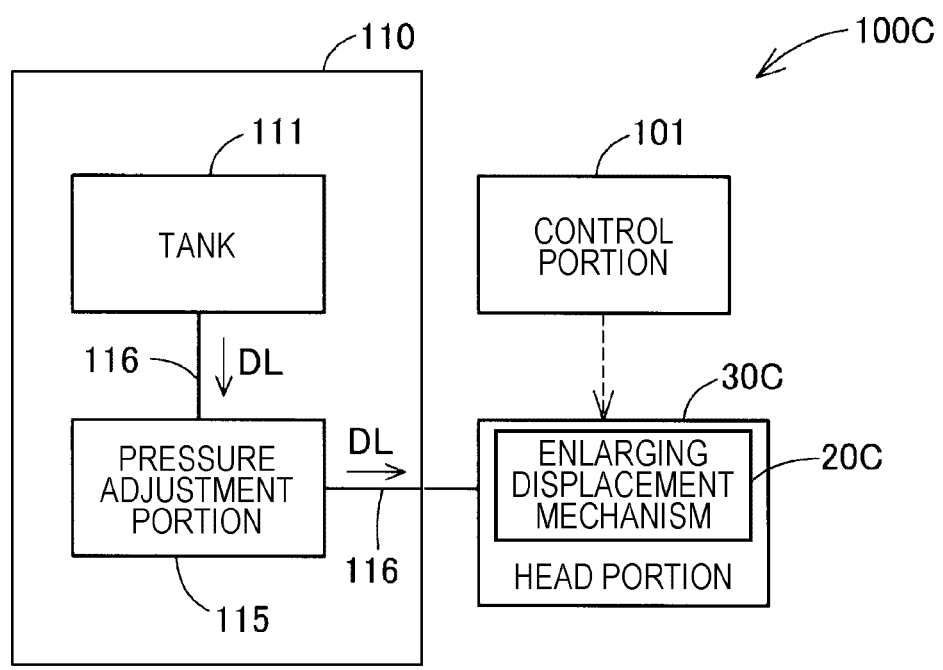
FIG. 5 is a schematic block diagram showing an overall configuration of a liquid ejecting apparatus according to a third embodiment.

FIG. 5 is a schematic block diagram showing an overall configuration of a liquid ejecting apparatus 100C according to a third embodiment. The liquid ejecting apparatus 100C is provided with a head portion 30C provided with an displacement amplifying mechanism 20C of the third embodiment, a control portion 101, and a supply portion 110.

The head portion 30C ejects an ejection liquid DL using the displacement amplifying mechanism 20C of the third embodiment. The ejection liquid DL is, for example, ink having a predetermined viscosity. The operation of the head portion 30C is controlled by the control portion 101. The configuration of the head portion 30C and the configuration of the displacement amplifying mechanism 20C of the third embodiment will be described later.

The control portion 101 is configured as a computer provided with a CPU and a memory, and realizes various functions for controlling the liquid ejecting apparatus 100C by the CPU reading and executing the control program and command stored in the memory. The control program may be recorded on various non-transitory tangible recording media. The control portion 101 may be configured to include a circuit.

The supply portion 110 supplies the ejection liquid DL to the head portion 30C. The supply portion 110 is configured to include a tank 111, a pressure adjustment portion 115, and a supply path 116.

The ejection liquid DL is contained in tank 111. The ejection liquid DL in the tank 111 is supplied to the head portion 30C through the supply path 116 connected to the head portion 30C.

The pressure adjustment portion 115 is provided in the supply path 116, and adjusts the pressure of the ejection liquid DL supplied to the head portion 30C through the supply path 116 to a predetermined pressure. The pressure adjustment portion 115 is configured to include a pump that sucks the ejection liquid DL from the tank 111, a valve that opens and closes so that the pressure on the head portion 30C side becomes a predetermined pressure, and the like (not shown).

Figure 6:
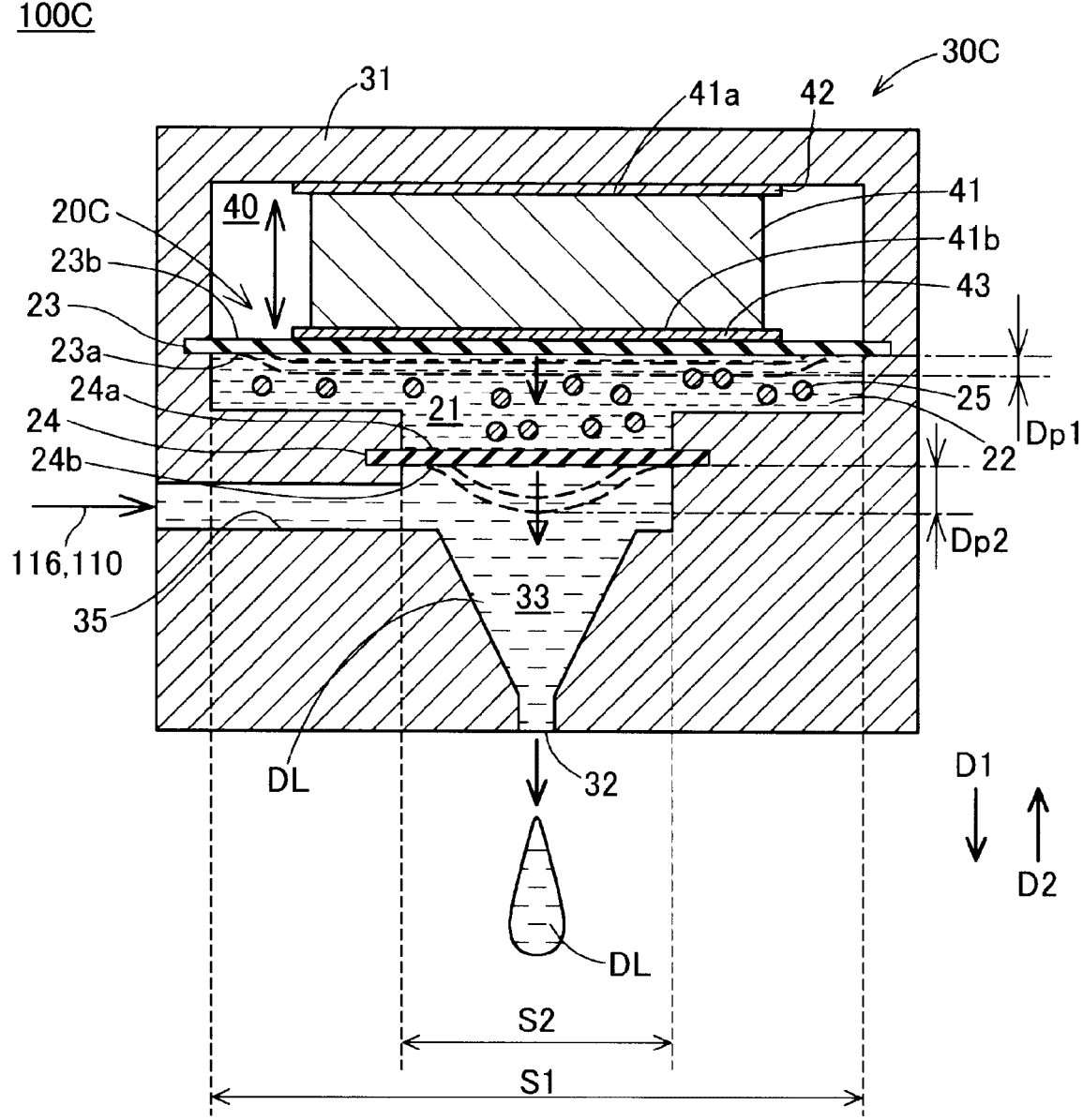
FIG. 6 is a schematic cross-sectional view schematically showing an internal configuration of a head portion according to the third embodiment.

FIG. 6 is a schematic cross-sectional view schematically showing an internal configuration of a head portion 30C according to the third embodiment. The head portion 30C is provided with a metallic housing 31. The head portion 30C is provided with a nozzle 32, a pressure chamber 33, a supply flow path 35, a drive chamber 40, and an actuator 41 inside the housing 31, in addition to the displacement amplifying mechanism 20C of the third embodiment.

The nozzle 32 is provided as a through-hole that communicates with the pressure chamber 33 and is open to the outside of the housing 31. In the third embodiment, since the head portion 30C ejects the ejection liquid DL in the direction of gravity, the nozzle 32 is open in the direction of gravity.

The pressure chamber 33 accommodates the ejection liquid DL ejected from the nozzle 32. The pressure chamber 33 is connected to the supply path 116 of the supply portion 110 via the supply flow path 35 which is a flow path through which the ejection liquid DL flows. The ejection liquid DL is pressure-fed from the supply portion 110 to the pressure chamber 33 through the supply flow path 35. The pressure in the pressure chamber 33 when the ejection liquid DL is not ejected from the nozzle 32 is adjusted to a pressure equal to or lower than the meniscus withstand pressure of the nozzle 32 by the pressure adjustment portion 115 (FIG. 5) of the supply portion 110.

The drive chamber 40 is provided above the pressure chamber 33 in the direction of gravity with the displacement amplifying mechanism 20C interposed therebetween. The drive chamber 40 accommodates the actuator 41. The actuator 41 changes the volume of the pressure chamber 33 via the displacement amplifying mechanism 20C and causes the pressure chamber 33 to generate pressure for ejecting the ejection liquid DL from the nozzle 32 (details will be described later). In the third embodiment, similarly to the actuator 15 described in the first embodiment, the actuator 41 is formed of a piezo element that expands and contracts. A first end portion 41a in the expansion and contraction direction of the actuator 41 is fixed to the housing 31 via a fixing portion 42.

The displacement amplifying mechanism 20C has the same configuration as the displacement amplifying mechanism 20B of the second embodiment. The displacement amplifying mechanism 20C is provided with the accommodation chamber 21 filled with the liquid 22, and the first wall portion 23 and the second wall portion 24 configured as a diaphragm flexibly deformed in the thickness direction.

The accommodation chamber 21 is configured as an airtight hollow space between the drive chamber 40 and the pressure chamber 33. The filler 25 similar to that described in the second embodiment is dispersed in the liquid 22 of the accommodation chamber 21.

The first wall portion 23 air-tightly separates the drive chamber 40 and the accommodation chamber 21 from each other. The outer peripheral end of the first wall portion 23 is fixed to the housing 31. The first wall surface 23a of the first wall portion 23 forms a portion of the wall surface of the accommodation chamber 21 and faces the liquid 22. The second wall surface 23b of the first wall portion 23 is connected to a second end portion 41b in the expansion and contraction direction of the actuator 41 via a connection portion 43.

The second wall portion 24 air-tightly separates the pressure chamber 33 and the accommodation chamber 21 from each other. The outer peripheral end of the second wall portion 24 is fixed to the housing 31. The first wall surface 24a of the second wall portion 24 forms a portion of the wall surface of the accommodation chamber 21 and faces the liquid 22. The second wall surface 24b of the second wall portion 24 forms a portion of the wall surface of the pressure chamber 33 and faces the ejection liquid DL. It is desirable that the second wall portion 24 is disposed so that a central portion of the second wall surface 24b faces the nozzle 32.

In the head portion 30C, the actuator 41 is instantaneously extended, when the first wall portion 23 is displaced as shown by a broken line, the second wall portion 24 is displaced in the first direction D1 as indicated by a broken line by the pressure received from the liquid 22 of the accommodation chamber 21. As a result, the pressure in the pressure chamber 33 is increased to be the meniscus withstand pressure or higher, and the ejection liquid DL is ejected from the nozzle 32.

Here, the area S2 where the first wall surface 24a of the second wall portion 24 faces the liquid 22 of the accommodation chamber 21 is smaller than the area S1 where the first wall surface 23a of the first wall portion 23 faces the liquid 22 of the accommodation chamber 21. Therefore, similarly to the description in the first embodiment, the amount of displacement Dp2 of the second wall portion 24 is larger than the amount of displacement Dp1 of the first wall portion 23. Therefore, in the head portion 30C, it is possible to easily generate a larger ejection pressure in the pressure chamber 33 by the displacement amplifying mechanism 20C having a simple configuration. In addition, in the head portion 30C, even if a small actuator 41 having a small amount of expansion and contraction deformation is adopted, the amount of displacement of the second wall portion 24 can be compensated by the displacement amplifying mechanism 20C. Therefore, by using the displacement amplifying mechanism 20C, it is possible to downsize the actuator 41 and to downsize the head portion 30C.

In addition, in the displacement amplifying mechanism 20C, as described in the first embodiment, the second wall portion 24 is displaced in the first direction D1 in a state where an elastic force acting in the second direction D2 is generated. Therefore, the compliance of the displacement of the second wall portion 24 in the second direction D2 when the actuator 41 is displaced in the contracting direction is enhanced by the elastic force. As a result, even if the actuator 41 contracts momentarily, the pressure in the accommodation chamber 21 is lowered, and air bubbles are inhibited from being generated in the liquid 22. Therefore, it is possible to stably drive the head portion 30C. In the liquid ejecting apparatus 100C, since there are cases where the actuator 41 is repeatedly expanded or contracted at a high speed, the merit obtained by such an effect of inhibiting the generation of air bubbles is great.

In addition, according to the head portion 30C, the response delay of the second wall portion 24 is inhibited as described above, so that the occurrence timing of the negative pressure in the pressure chamber 33 can be inhibited from being delayed from the aimed timing. Therefore, a negative pressure can be generated in the pressure chamber 33 at an appropriate timing after the ejection of the ejection liquid DL from the nozzle 32 is started, so that it is possible to inhibit unnecessary tail of the ejection liquid DL ejected from the nozzle 32 and unnecessary mist generation due to ejection. Therefore, the accuracy of the ejection amount of the ejection liquid DL is enhanced, and deterioration of the flight state of the liquid droplets is inhibited.

As described above, according to the liquid ejecting apparatus 100C of the third embodiment, by provided with the displacement amplifying mechanism 20C to which the principle of Pascal is applied, the ejection performance of the ejection liquid DL can be enhanced. In addition, the actuator 41 can be downsized, and the head portion 30C can be downsized. Additionally, according to the liquid ejecting apparatus 100C of the third embodiment, various operational effects described in the first embodiment, the second embodiment, and the third embodiment can be achieved.

4. Fourth Embodiment

Figure 7:
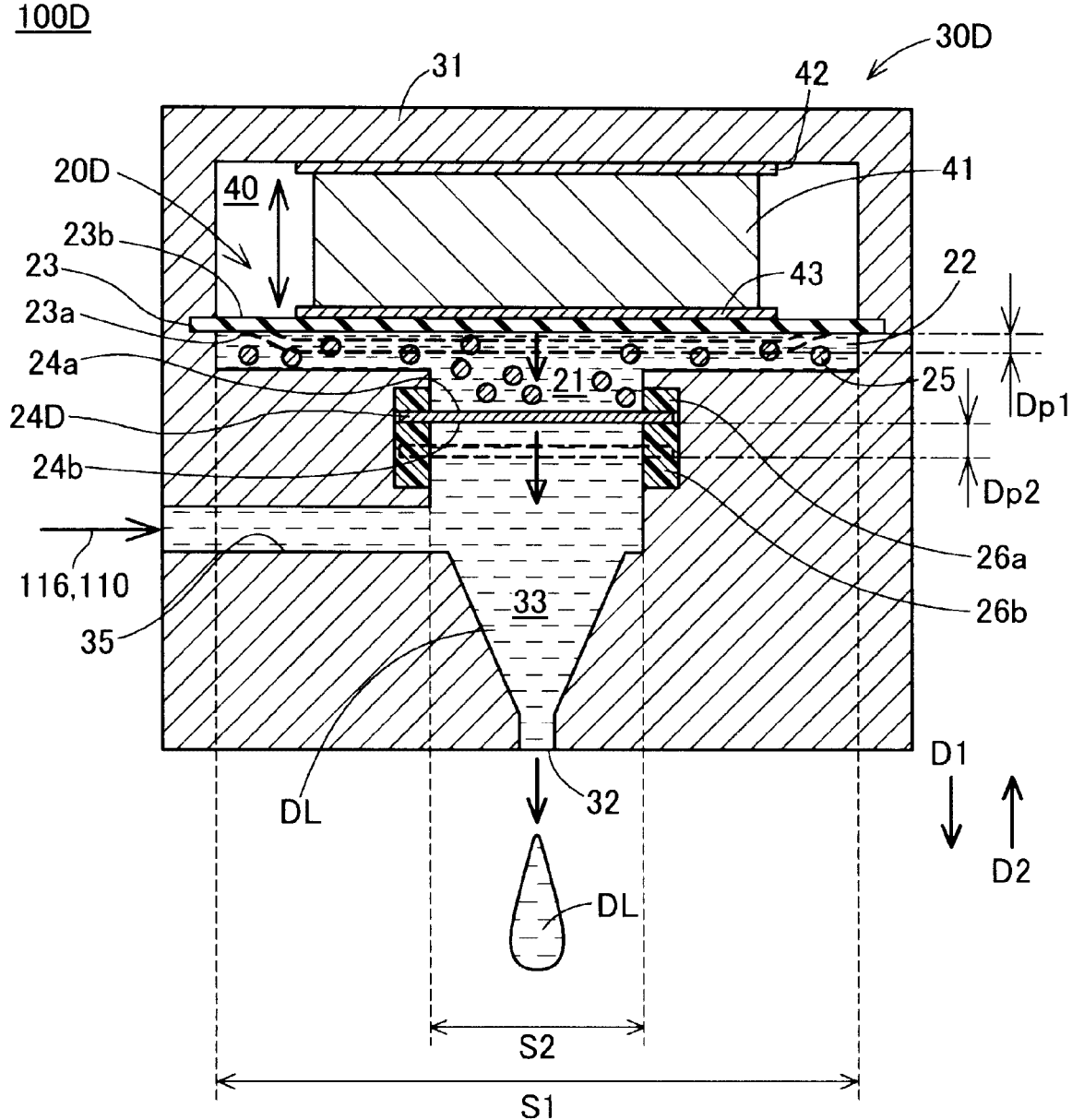
FIG. 7 is a schematic cross-sectional view schematically showing an internal configuration of a head portion according to a fourth embodiment.

With reference to FIG. 7, the configuration of an displacement amplifying mechanism 20D and a liquid ejecting apparatus 100D provided therewith in a fourth embodiment will be described. FIG. 7 is a schematic cross-sectional view showing an internal configuration of a head portion 30D according to the fourth embodiment. The configuration of the liquid ejecting apparatus 100D of the fourth embodiment is substantially the same as that of the liquid ejecting apparatus 100C of the third embodiment except that the head portion 30D of the fourth embodiment is provided instead of the head portion 30C of the third embodiment. The configuration of the head portion 30D of the fourth embodiment is substantially the same as that of the head portion 30C of the third embodiment except that the displacement amplifying mechanism 20D of the fourth embodiment in which a portion of the configuration is different from the displacement amplifying mechanism 20C of the third embodiment is provided instead of the displacement amplifying mechanism 20C. The configuration of the displacement amplifying mechanism 20D of the fourth embodiment is different from that of the displacement amplifying mechanism 20C of the third embodiment in that a second wall portion 24D and a first elastic member 26a and a second elastic member 26b (also referred to as elastic members 26a and 26b) that support the second wall portion 24D, are provided instead of the second wall portion 24.

The second wall portion 24D of the fourth embodiment is formed of, for example, a metal plate. It is desirable that the second wall portion 24D has rigidity enough to inhibit the occurrence of flexure deformation in the thickness direction due to the pressure received via the liquid 22 in the accommodation chamber 21 when the actuator 41 is extended. The second wall portion 24D is not limited to a metal plate, and may be formed of other members. The second wall portion 24D may be formed of a resin plate, for example. Ribs may be formed on the first wall surface 24a and the second wall surface 24b of the second wall portion 24D to inhibit the flexure deformation.

The outer peripheral end portion of the second wall portion 24D is supported by the two elastic members 26a and 26b, so that the second wall portion 24D is fixed to the housing 31 in a state where the second wall portion 24D can be displaced in the thickness direction. Each of the two elastic members 26a and 26b has a frame-like shape that surrounds the central portion of the second wall portion 24D. The outer peripheral end portion of the second wall portion 24D is interposed in the thickness direction of the second wall portion 24D by the first elastic member 26a and the second elastic member 26b.

The first elastic member 26a forms a portion of the wall portion of the accommodation chamber 21, and supports the second wall portion 24D from the first wall surface 24a side. The first elastic member 26a functions as a seal portion for inhibiting leakage of the liquid 22 from the accommodation chamber 21. The second elastic member 26b forms a portion of the wall portion of the pressure chamber 33 and supports the second wall portion 24D from the second wall surface 24b side. The second elastic member 26b functions as a seal portion for preventing leakage of the ejection liquid DL from the pressure chamber 33.

The area S2 where the first wall surface 24a of the second wall portion 24D faces the liquid 22 in the accommodation chamber 21 is smaller than the area S1 where the first wall surface 23a of the first wall portion 23 faces the liquid 22 in the accommodation chamber 21. A region of the first wall surface 24a of the second wall portion 24D facing the liquid 22 of the accommodation chamber 21 is a region surrounded by the first elastic member 26a.

When the actuator 41 extends and the first wall portion 23 is displaced in the direction toward the accommodation chamber 21 as indicated by the broken line, the second wall portion 24D receives pressure from the liquid 22 in the accommodation chamber 21. As a result, the first elastic member 26a extends in the thickness direction of the second wall portion 24D, the second elastic member 26b contracts in the thickness direction of the second wall portion 24D, and the second wall portion 24D is displaced in the first direction D1 as indicated by a broken line. As described above, in the displacement amplifying mechanism 20D of the fourth embodiment, when the first wall portion 23 is displaced and applies pressure to the liquid 22, the elastic members 26a and 26b elastically deform so as to generate an elastic force acting in the second direction D2 to move the position of the second wall portion 24D in the first direction D1.

According to the displacement amplifying mechanism 20D of the fourth embodiment, as in the above-described embodiments, the displacement amount Dp2 of the second wall portion 24D is expanded more than the amount of displacement Dp1 of the first wall portion 23 according to the difference between the areas S1 and S2. In addition, since the second wall portion 24D is displaced in the first direction D1 in a state where an elastic force is generated in the second direction D2 by the elastic members 26a and 26b, the occurrence of response delay of the second wall portion 24D with respect to the contraction of the actuator 41 is suppressed.

In the displacement amplifying mechanism 20D of the fourth embodiment, since the flexure deformation of the second wall portion 24D when the second wall portion 24D is displaced is suppressed, the pressure transmitted from the liquid 22 is inhibited from being absorbed by such flexure deformation of the second wall portion 24D. Therefore, according to the head portion 30D of the fourth embodiment, the pressure generated by the actuator 41 is efficiently transmitted to the pressure chamber 33. Therefore, the ejection performance of the ejection liquid DL by the head portion 30D is further enhanced.

In the displacement amplifying mechanism 20D of the fourth embodiment, a configuration in which the first elastic member 26a and the second elastic member 26b are connected to each other on the outer periphery of the second wall portion 24D may be adopted. In addition, in the displacement amplifying mechanism 20D of the fourth embodiment, any one of the two elastic members 26a and 26b may be omitted. In a case where the second elastic member 26b is omitted, it is desirable that the second wall portion 24D is adhered to the first elastic member 26a so as to prevent the second wall portion 24D from falling off, a leakage of the liquid 22 from the accommodation chamber 21, and a leakage of the ejection liquid DL from the pressure chamber 33.

As described above, according to the displacement amplifying mechanism 20D of the fourth embodiment, the elastic deformation of the elastic members 26a and 26b supporting the second wall portion 24D can suppress the occurrence of the response delay of the second wall portion 24D when causing the actuator 41 to contract. Additionally, according to the displacement amplifying mechanism 20D of the fourth embodiment and the liquid ejecting apparatus 100D provided therewith, the various operational effects described in each of the above embodiments can be achieved.

5. Fifth Embodiment

Figure 8:
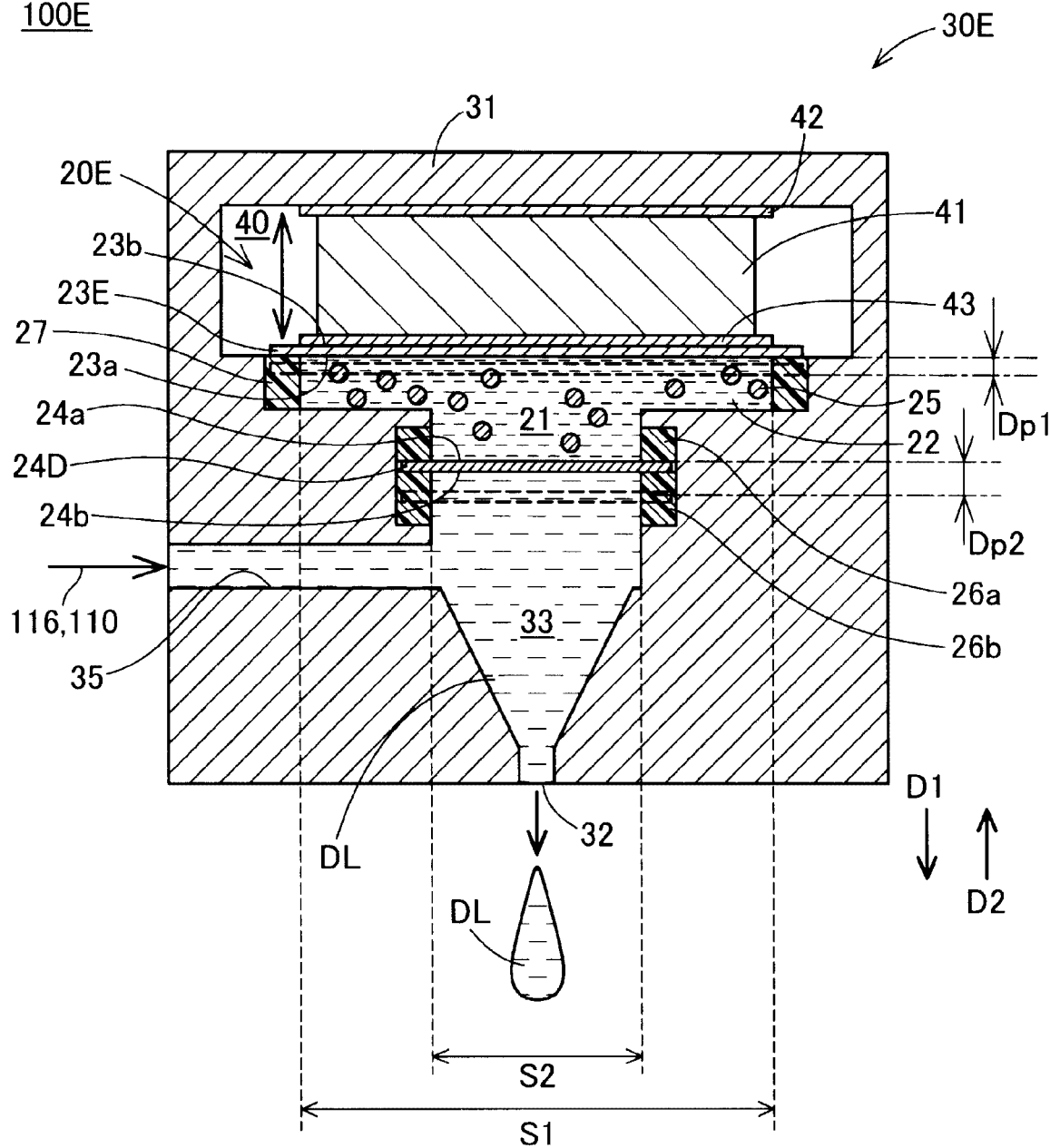
FIG. 8 is a schematic cross-sectional view schematically showing an internal configuration of a head portion according to a fifth embodiment.

With reference to FIG. 8, the configuration of an displacement amplifying mechanism 20E and a liquid ejecting apparatus 100E provided therewith in a fifth embodiment will be described. FIG. 8 is a schematic cross-sectional view showing an internal configuration of a head portion 30E according to the fifth embodiment. The configuration of the liquid ejecting apparatus 100E of the fifth embodiment is substantially the same as that of the liquid ejecting apparatus 100D of the fourth embodiment except that the head portion 30E of the fifth embodiment is provided instead of the head portion 30D of the fourth embodiment. The configuration of the head portion 30E of the fifth embodiment is substantially the same as that of the head portion 30D of the fourth embodiment except that the displacement amplifying mechanism 20E of the fifth embodiment in which a portion of the configuration is different from the displacement amplifying mechanism 20D of the fourth embodiment is provided instead of the displacement amplifying mechanism 20D of the fourth embodiment. The configuration of the displacement amplifying mechanism 20E of the fifth embodiment is different from that of the displacement amplifying mechanism 20D of the fourth embodiment in that a first wall portion 23E and an elastic member 27 that support the first wall portion 23E, are provided instead of the first wall portion 23.

The first wall portion 23E of the fifth embodiment is formed of, for example, a metal plate. It is desirable that the first wall portion 23E has rigidity enough to inhibit the occurrence of flexure deformation in the thickness direction when the actuator 41 is extended. The first wall portion 23E is not limited to a metal plate, and may be formed of other members. The first wall portion 23E may be formed of a resin plate, for example. Ribs may be formed on the first wall surface 23a and the second wall surface 23b of the first wall portion 23E to inhibit the flexure deformation.

The first wall portion 23E is fixed to the housing 31 in a state of being displaceable in the thickness direction via the elastic member 27. The elastic member 27 has a frame shape that surrounds the central portion of the first wall portion 23E. The elastic member 27 supports the outer peripheral end portion of the first wall portion 23E from the first wall surface 23a side of the first wall portion 23E so as to generate a reaction force against the actuator 41. The elastic member 27 forms a portion of the wall portion of the accommodation chamber 21 and functions as a seal portion for preventing leakage of liquid from the accommodation chamber 21. When the actuator 41 extends, since the elastic member 27 is compressed, the first wall portion 23E is displaced toward the accommodation chamber 21 in a state where the flexure deformation is suppressed as shown by a broken line.

According to the displacement amplifying mechanism 20E of the fifth embodiment, the propulsive force of the actuator 41 is suppressed from being absorbed by the flexural deformation of the first wall portion 23E. In addition, the compliance of the first wall portion 23E against the contraction of the actuator 41 can be enhanced by the elastic force of the elastic member 27. Additionally, according to the displacement amplifying mechanism 20E of the fifth embodiment and the liquid ejecting apparatus 100E provided therewith of the fifth embodiment, the various operational effects described in each of the above embodiments can be achieved.

6. Sixth Embodiment

Figure 9:
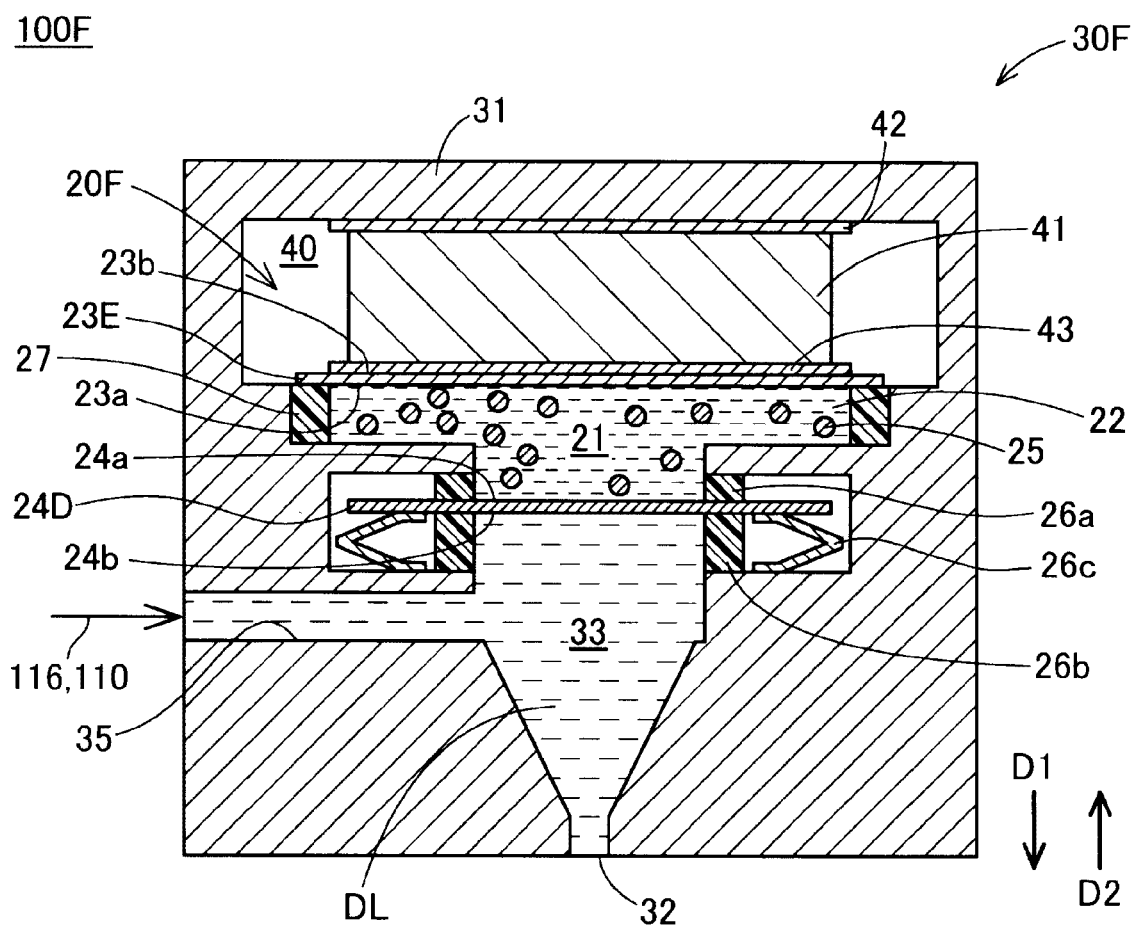
FIG. 9 is a schematic cross-sectional view schematically showing an internal configuration of a head portion according to a sixth embodiment.

With reference to FIG. 9, the configuration of an displacement amplifying mechanism 20F and a liquid ejecting apparatus 100F provided therewith in a sixth embodiment will be described. FIG. 9 is a schematic cross-sectional view showing an internal configuration of a head portion 30F according to a sixth embodiment. The configuration of the liquid ejecting apparatus 100F of the sixth embodiment is substantially the same as that of the liquid ejecting apparatus 100E of the fifth embodiment except that the head portion 30F of the sixth embodiment is provided instead of the head portion 30E of the fifth embodiment. The configuration of the head portion 30F of the sixth embodiment is different from that of the head portion 30E of the fifth embodiment in that a third elastic member 26c is added. The configuration of the head portion 30F of the sixth embodiment is substantially the same as that of the head portion 30E of the fifth embodiment except for the points described below.

A third elastic member 26c is added to the displacement amplifying mechanism 20F of the sixth embodiment provided in the head portion 30F of the sixth embodiment. The third elastic member 26C applies an elastic force in the second direction D2 to the outer peripheral end portion of the second wall portion 24D and is disposed outside the frame shape of the second elastic member 26b. The third elastic member 26c is formed of, for example, a disc spring disposed so as to surround the second elastic member 26b. The third elastic member 26c may be formed of a coil spring.

A space for disposing the three elastic members 26a, 26b, and 26c is provided on the housing 31 of the head portion 30F of the sixth embodiment so as to surround the outer periphery of the second wall portion 24D. Since the third elastic member 26c is disposed in a space sealed by the first elastic member 26a and the second elastic member 26b, deterioration due to contact with the liquid 22 or the ejection liquid DL is suppressed.

According to the displacement amplifying mechanism 20F of the sixth embodiment, the compliance of the second wall portion 24D when the actuator 41 contracts can be enhanced by the elastic force of the third elastic member 26c. Additionally, according to the displacement amplifying mechanism 20F of the sixth embodiment and the liquid ejecting apparatus 100F provided therewith of the sixth embodiment, the various operational effects described in each of the above embodiments can be achieved.

7. Seventh Embodiment

Figure 10:
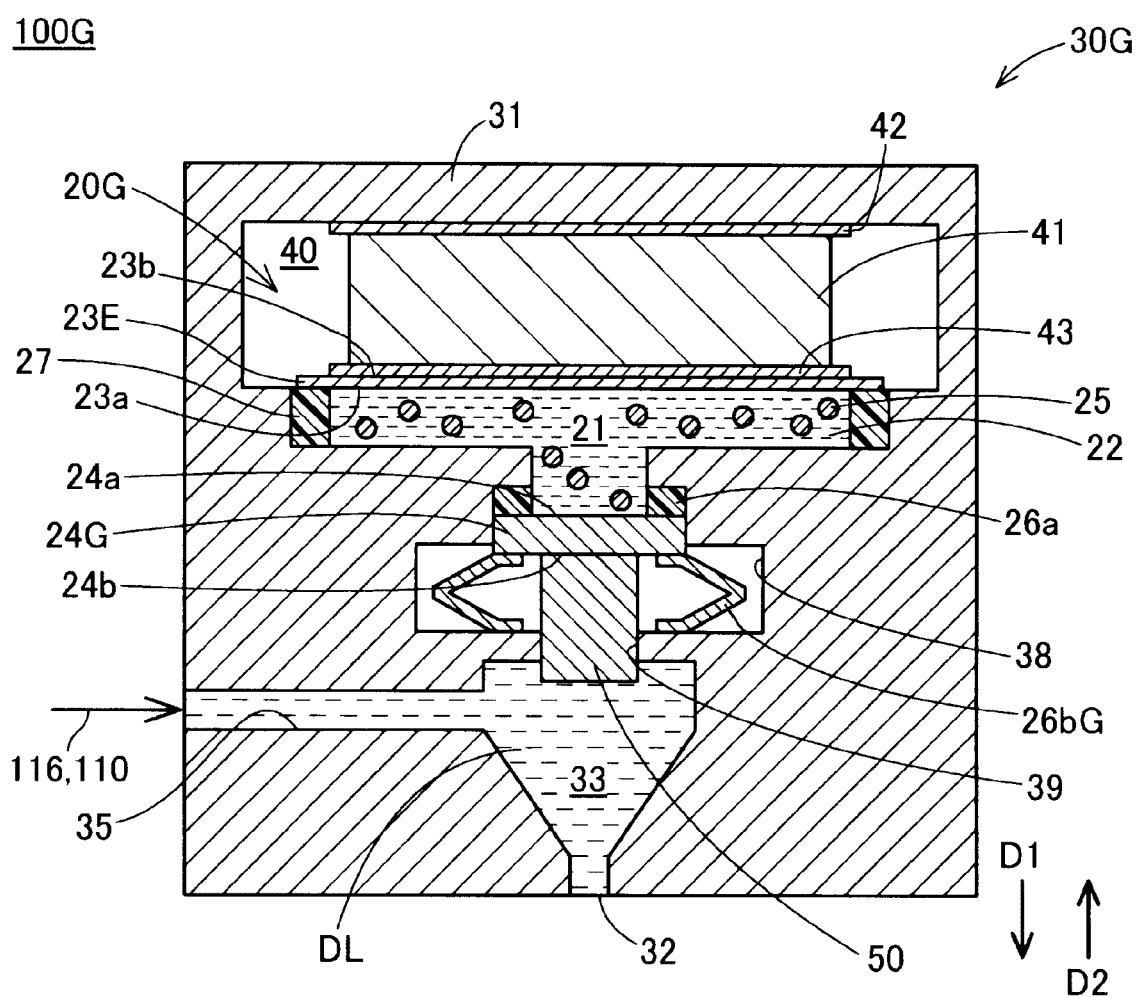
FIG. 10 is a schematic cross-sectional view schematically showing an internal configuration of a head portion according to a seventh embodiment.

With reference to FIG. 10, the configuration of an displacement amplifying mechanism 20G and a liquid ejecting apparatus 100G provided therewith in a seventh embodiment will be described. FIG. 10 is a schematic cross-sectional view showing an internal configuration of a head portion 30G according to a seventh embodiment. The configuration of the liquid ejecting apparatus 100G of the seventh embodiment is substantially the same as that of the liquid ejecting apparatus 100E of the fifth embodiment except that the head portion 30G of the seventh embodiment is provided instead of the head portion 30E of the fifth embodiment.

The configuration of the head portion 30G of the seventh embodiment is different from that of the head portion 30E of the fifth embodiment in that a second wall portion 24G corresponding to the second wall portion 24D does not form a portion of the wall surface of the pressure chamber 33. The configuration of the head portion 30G of the seventh embodiment is substantially the same as that of the head portion 30E of the fifth embodiment except for the points described below.

In the housing 31 of the head portion 30G of the seventh embodiment, an intermediate chamber 38 is provided between the accommodation chamber 21 and the pressure chamber 33. The second wall surface 24b of the second wall portion 24G provided in the displacement amplifying mechanism 20G of the seventh embodiment forms a portion of the wall surface of the intermediate chamber 38. A piston 50 for ejecting the ejection liquid DL of the pressure chamber 33 from the nozzle 32 by a piston motion is connected to a central portion of the second wall surface 24b.

The rear end portion of the piston 50 is connected to the second wall surface 24b so as to protrude in a direction orthogonal to the second wall surface 24b. The tip end portion of the piston 50 is disposed in the pressure chamber 33. In order to enhance the ejection efficiency of the ejection liquid DL from the nozzle 32, it is desirable that the tip end portion of the piston 50 is disposed to face the nozzle 32.

In a through-hole 39 through which the piston 50 provided between the intermediate chamber 38 and the pressure chamber 33 is inserted, a seal portion that is in airtight contact with the outer periphery of the piston 50 and inhibits leakage of the ejection liquid DL to the intermediate chamber 38 is provided (not shown). The piston 50 reciprocates up and down while rubbing the seal portion.

A second elastic member 26bG of the displacement amplifying mechanism 20G of the seventh embodiment is disposed so as to surround the outer periphery of the piston 50 in the intermediate chamber 38. The second elastic member 26bG supports the second wall portion 24G from below so as to apply an elastic force to the second wall portion 24G in the second direction D2. In the seventh embodiment, the second elastic member 26bG is formed of the disc spring. The second elastic member 26bG may be formed of the coil spring.

In the head portion 30G, the tip end portion of the piston 50 is instantaneously displaced in the first direction D1 and the second direction D2 in the pressure chamber 33 in response to the instantaneous expansion and contraction of the actuator 41, so that the ejection liquid DL is ejected from nozzle 32. The amount of displacement of the piston 50 is enlarged larger than the amount of displacement of the actuator 41 by the displacement amplifying mechanism 20G in accordance with the difference in area where the first wall portion 23E and the second wall portion 24G are in contact with the liquid 22 of the accommodation chamber 21. In addition, when the actuator 41 contracts, the movement of the piston 50 in the second direction D2 is assisted by the elastic force of the first elastic member 26a and the second elastic member 26bG. Therefore, the response delay of the piston 50 with respect to the drive of the actuator 41 is inhibited.

In the head portion 30G of the seventh embodiment, the ejection liquid DL can be ejected from the nozzle 32 by the instantaneous sharp displacement of the piston 50 having a small diameter. According to the head portion 30G, it is possible to efficiently eject the high-viscosity ejection liquid DL. In the displacement amplifying mechanism 20G of the seventh embodiment, since the intermediate chamber 38 is provided between the accommodation chamber 21 and the pressure chamber 33, entry of the ejection liquid DL into the accommodation chamber 21 and entry of the liquid 22 into the pressure chamber 33 are inhibited. In addition, by disposing the second elastic member 26bG in the intermediate chamber 38, it is inhibited that the second elastic member 26bG is deteriorated by being exposed to the liquid 22 or the ejection liquid DL. Additionally, according to the displacement amplifying mechanism 20G of the seventh embodiment and the liquid ejecting apparatus 100G provided therewith of the seventh embodiment, the various operational effects described in each of the above embodiments can be achieved.

8. Eighth Embodiment

Figure 11:
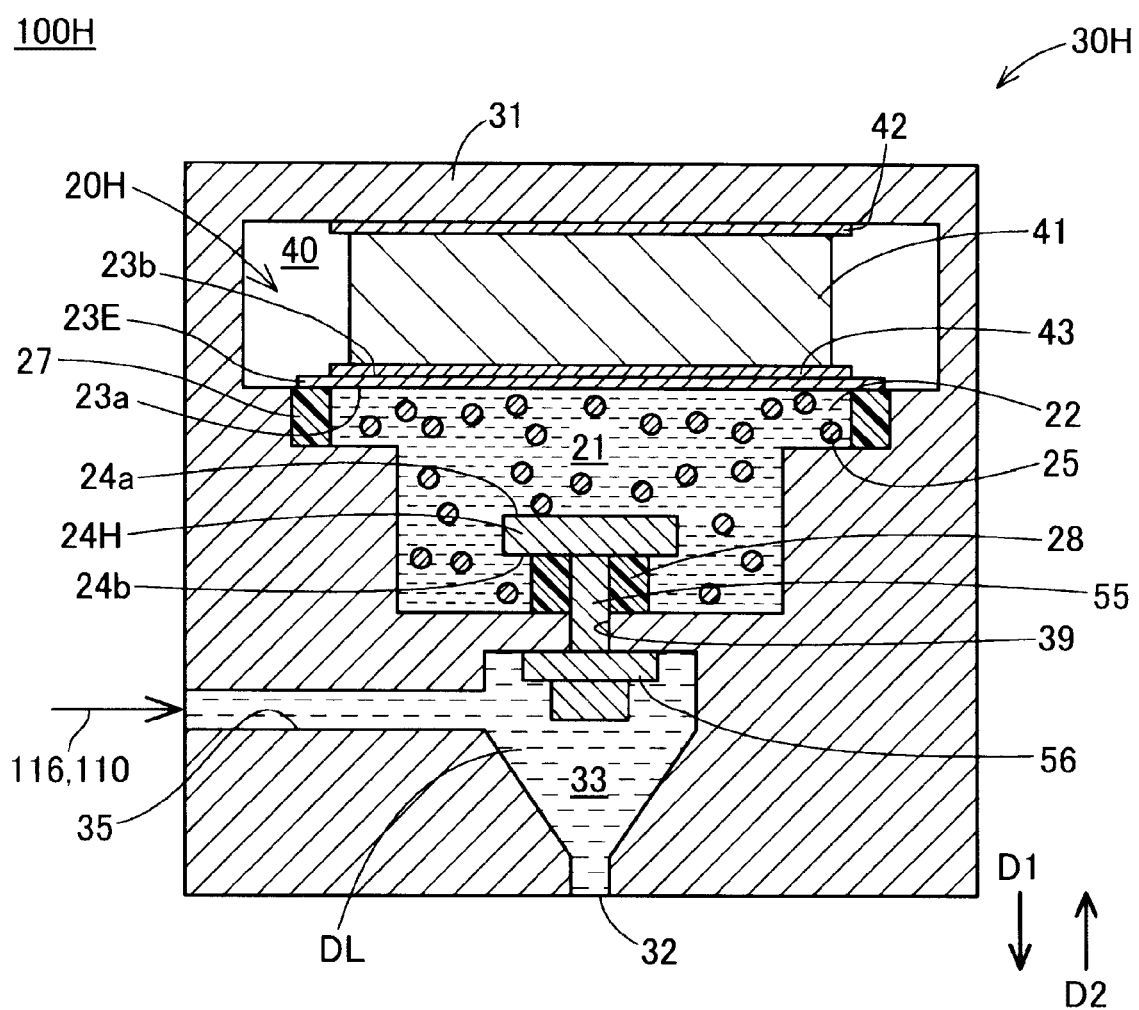
FIG. 11 is a schematic cross-sectional view schematically showing an internal configuration of a head portion according to an eighth embodiment.

With reference to FIG. 11, the configuration of an displacement amplifying mechanism 20H and a liquid ejecting apparatus 100H provided therewith in an eighth embodiment will be described. FIG. 11 is a schematic cross-sectional view showing an internal configuration of a head portion 30H according to an eighth embodiment. The configuration of the liquid ejecting apparatus 100H of the eighth embodiment is substantially the same as that of the liquid ejecting apparatus 100G of the seventh embodiment except that the head portion 30H of the eighth embodiment is provided instead of the head portion 30G of the seventh embodiment. The configuration of the head portion 30H of the eighth embodiment is different from that of the head portion 30G of the seventh embodiment in that a piston 55 having a shape different from that of the piston 50 is provided and a configuration for applying an elastic force to the piston 55 is changed. The configuration of the head portion 30H of the eighth embodiment is substantially the same as that of the head portion 30G of the seventh embodiment except for the points described below.

The displacement amplifying mechanism 20H of the eighth embodiment has a configuration in which the first elastic member 26a is omitted and the intermediate chamber 38 and the accommodation chamber 21 described in the seventh embodiment are integrated. The displacement amplifying mechanism 20H is provided with a second wall portion 24H disposed in the accommodation chamber 21 instead of the second wall portion 24G of the seventh embodiment. The piston 55 is connected to the central portion of the second wall surface 24b of the second wall portion 24H instead of the piston 50 described in the seventh embodiment. The second wall portion 24H functions as a wall portion of the accommodation chamber 21 that closes the through-hole 39 through which the piston 55 is inserted, and can be interpreted as constituting a portion of the wall surface of the accommodation chamber 21. The area S2 of the region of the first wall surface 24a of the second wall portion 24H facing the liquid 22 is smaller than the area S1 of the region of the first wall surface 23a of the first wall portion 23E facing the liquid 22.

The second wall portion 24H is supported from the lower side by an elastic member 28 disposed so as to surround the periphery of the piston 55 in the accommodation chamber 21. In the seventh embodiment, the elastic member 28 is formed of resin rubber and also functions as a seal portion for inhibiting leakage of the liquid 22 from the accommodation chamber 21. The elastic member 28 may be formed of a disc spring or a coil spring. In this case, it is desirable that the liquid 22 is sealed by the seal portion provided in the through-hole 39.

An overhang portion 56 that protrudes in a direction intersecting the central axis of the piston 55 is provided at the tip end portion of the piston 55 of the eighth embodiment. The overhang portion 56 protrudes into the pressure chamber 33 so as to have a width larger than the opening diameter of the through-hole 39. When the piston 55 moves in the second direction D2, the overhang portion 56 contacts the upper surface of the pressure chamber 33 so as to close the through-hole 39. The overhang portion 56 functions as a stopper portion that defines a movement range of the piston 55 in the second direction D2. In addition, by displacing the overhang portion 56 having a width larger than that of the piston 55, it is possible to apply a larger pressure to the pressure chamber 33.

In a state where the overhang portion 56 is displaced in the first direction D1 from the upper surface of the pressure chamber 33, it is desirable that the elastic member 28 supporting the second wall portion 24H is compressed and be in a state of imparting elastic force in the second direction D2 to the second wall portion 24H. As a result, the sealing property between the accommodation chamber 21 and the pressure chamber 33 is enhanced.

The second wall portion 24H of the displacement amplifying mechanism 20H is displaced within the accommodation chamber 21 in a state of receiving the elastic force from the elastic member 28. When the actuator 41 extends, the second wall portion 24H is displaced in the first direction D1 in a state where an elastic force in the second direction D2 due to compression of the elastic member 28 is generated by the pressure received from the liquid 22 in the first wall surface 24a. When the second wall portion 24H is displaced in the first direction D1, the ejection liquid DL is ejected from the nozzle 32 by the displacement of the overhang portion 56 of the piston 55. When the actuator 41 contracts, the second wall portion 24H is displaced in the second direction D2 while being assisted by the elastic force of the elastic member 28.

According to the displacement amplifying mechanism 20H of the eighth embodiment, the second wall portion 24H can be displaced in the first direction D1 in a state where an elastic force acting in the second direction D2 is generated with a simpler configuration than the displacement amplifying mechanism 20G of the seventh embodiment. In addition, according to the head portion 30H of the eighth embodiment, a larger pressure is applied by displacement of the overhang portion 56 having a width larger than that of the piston, so that the ejection amount of the ejection liquid DL ejected from the nozzle 32 can be increased. Additionally, according to the displacement amplifying mechanism 20H of the eighth embodiment and the liquid ejecting apparatus 100H provided therewith, the various operational effects described in each of the above embodiments can be achieved.

9. Ninth Embodiment

Figure 12:
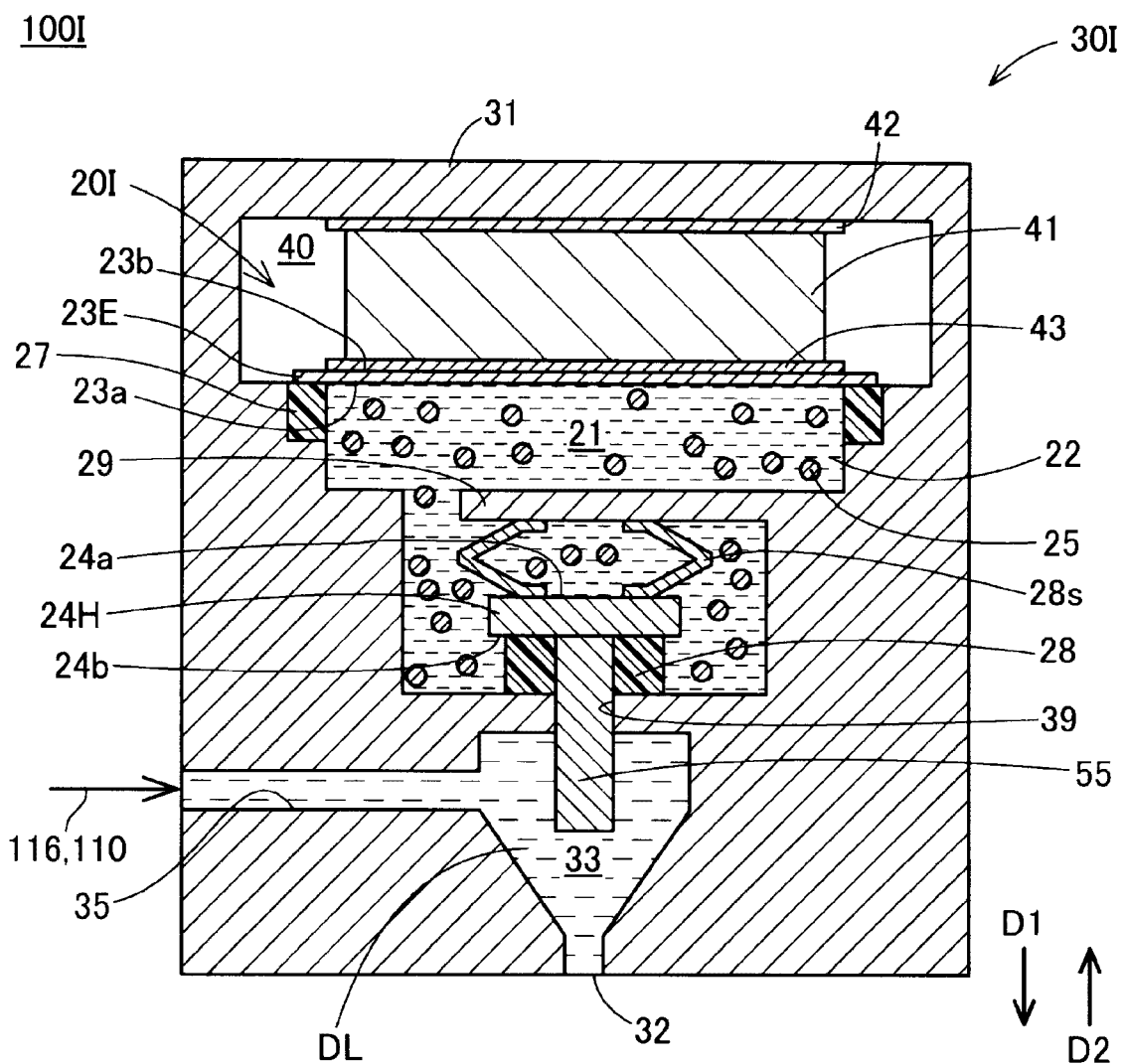
FIG. 12 is a schematic cross-sectional view schematically showing an internal configuration of a head portion according to a ninth embodiment.

With reference to FIG. 12, the configuration of an displacement amplifying mechanism 20I and a liquid ejecting apparatus 100I provided therewith in a ninth embodiment will be described. FIG. 12 is a schematic cross-sectional view showing an internal configuration of a head portion 30I according to a ninth embodiment. The configuration of the liquid ejecting apparatus 100I of the ninth embodiment is substantially the same as that of the liquid ejecting apparatus 100H of the eighth embodiment except that the head portion 30I of the ninth embodiment is provided instead of the head portion 30H of the eighth embodiment. The configuration of the head portion 30I of the ninth embodiment is different from that of the head portion 30H of the eighth embodiment in that an additional elastic member 28s and a support wall portion 29 are added, and the overhang portion 56 is omitted from the piston 55. The configuration of the head portion 30I of the ninth embodiment is substantially the same as that of the head portion 30H of the eighth embodiment except for the points described below.

In the displacement amplifying mechanism 20I of the ninth embodiment, in the initial state where the actuator 41 is not extended, the additional elastic member 28s that applies an elastic force to the second wall portion 24H in the first direction D1 is disposed above the second wall portion 24H. In the accommodation chamber 21 of the ninth embodiment, the support wall portion 29 for receiving the additional elastic member 28s from above is provided above the second wall portion 24H. The additional elastic member 28s is disposed in a compressed state while being interposed between the second wall portion 24H and the support wall portion 29. In the ninth embodiment, the additional elastic member 28s is formed of the disc spring. The additional elastic member 28s may not be formed of the disc spring. The additional elastic member 28s may be formed of, for example, the spring coil.

According to the displacement amplifying mechanism 20I of the ninth embodiment, even if the overhang portion 56 is omitted, since the elastic member 28 is initially compressed by the elastic force of the additional elastic member 28s, the state where the sealing property of the accommodation chamber 21 is enhanced by the elastic member 28 is maintained. In addition, according to the head portion 30I of the ninth embodiment, since the overhang portion 56 is omitted, the resistance received by the piston 55 from the ejection liquid DL in the pressure chamber 33 is reduced. Therefore, it is possible to move the piston 55 efficiently and at high speed. Additionally, according to the displacement amplifying mechanism 20I of the ninth embodiment and the liquid ejecting apparatus 100I provided therewith, the various operational effects described in each of the above embodiments can be achieved.

10. Tenth Embodiment

Figure 13:
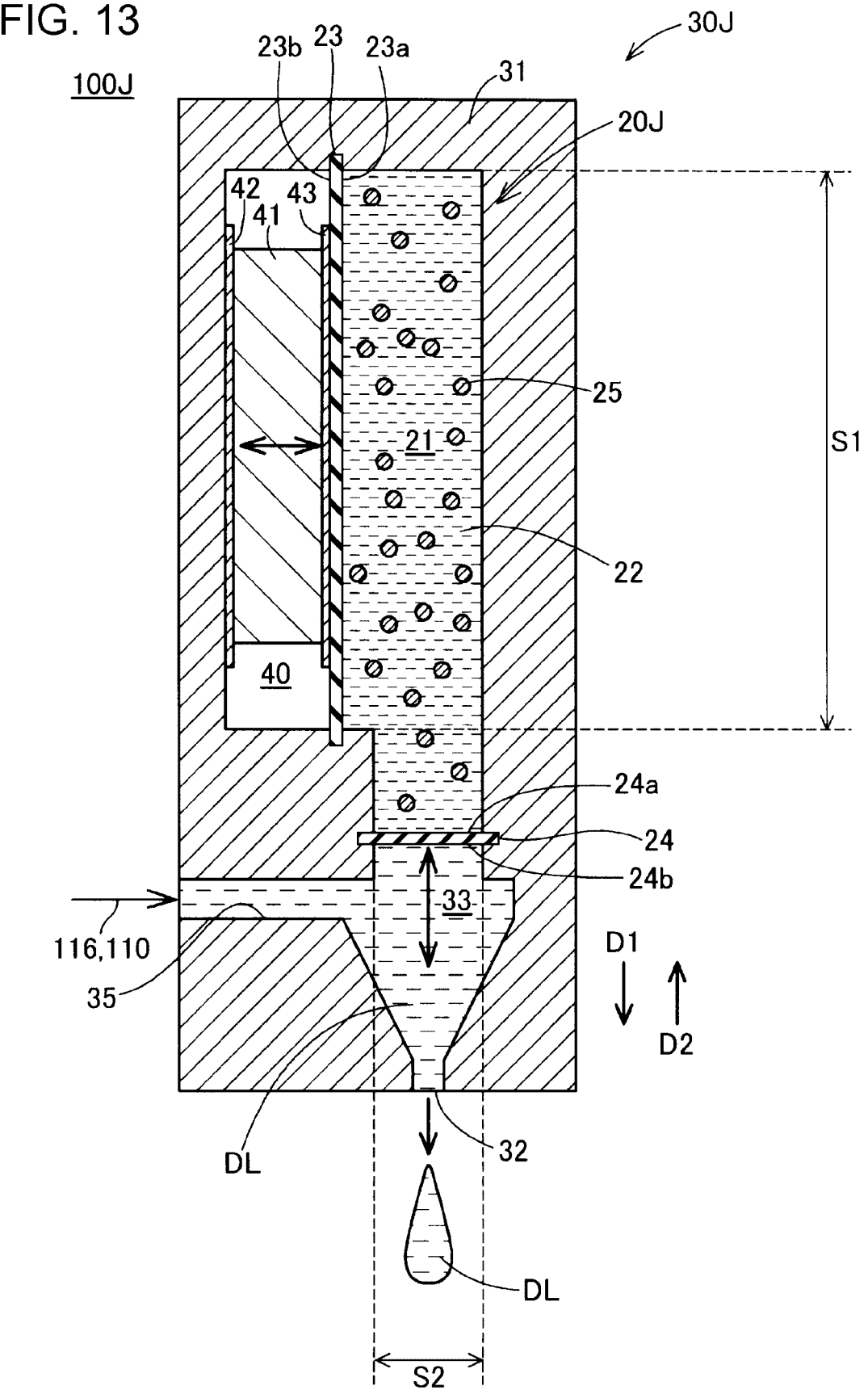
FIG. 13 is a schematic cross-sectional view schematically showing an internal configuration of a head portion according to a tenth embodiment.

With reference to FIG. 13, the configuration of an displacement amplifying mechanism 20J and a liquid ejecting apparatus 100J provided therewith in a tenth embodiment will be described. FIG. 13 is a schematic cross-sectional view showing an internal configuration of a head portion 30J according to a tenth embodiment. The configuration of the liquid ejecting apparatus 100J of the tenth embodiment is substantially the same as that of the liquid ejecting apparatus 100C of the third embodiment except that the head portion 30J of the tenth embodiment is provided instead of the head portion 30C of the third embodiment. The configuration of the head portion 30J of the tenth embodiment is different from that of the head portion 30C of the third embodiment mainly in that the expansion and contraction direction of the actuator 41 and the displacement direction of the first wall portion 23 are changed. The configuration of the head portion 30J of the tenth embodiment is substantially the same as that of the head portion 30C of the third embodiment except for the points described below.

In the head portion 30J of the tenth embodiment, the actuator 41 is disposed such that the expansion and contraction direction thereof is substantially orthogonal to the direction from the accommodation chamber 21 to the pressure chamber 33 (that is, in the direction of gravity). In addition, in the displacement amplifying mechanism 20J according to the tenth embodiment, the first wall portion 23 is disposed along the direction of gravity so that the displacement direction thereof is substantially orthogonal to the displacement direction of the second wall portion 24. The displacement amplifying mechanism 20J has a width along the direction of gravity larger than a width along the horizontal direction.

According to the displacement amplifying mechanism 20J of the tenth embodiment, the area S1 of the region facing the liquid 22 can be made larger than the area S2 of the region of the second wall portion 24 facing the liquid 22 by increasing the width of the first wall portion 23 in the direction of gravity. Therefore, the displacement amplifying mechanism 20J can be configured compact in the horizontal direction. Therefore, in a case where the plurality of nozzles 32 are disposed in the horizontal direction, expansion of the interval between the nozzles 32 can be inhibited by the displacement amplifying mechanism 20J. Additionally, according to the displacement amplifying mechanism 20J of the tenth embodiment and the liquid ejecting apparatus 100J provided therewith, the various operational effects described in each of the above embodiments can be achieved.

11. Eleventh Embodiment

Figure 14:
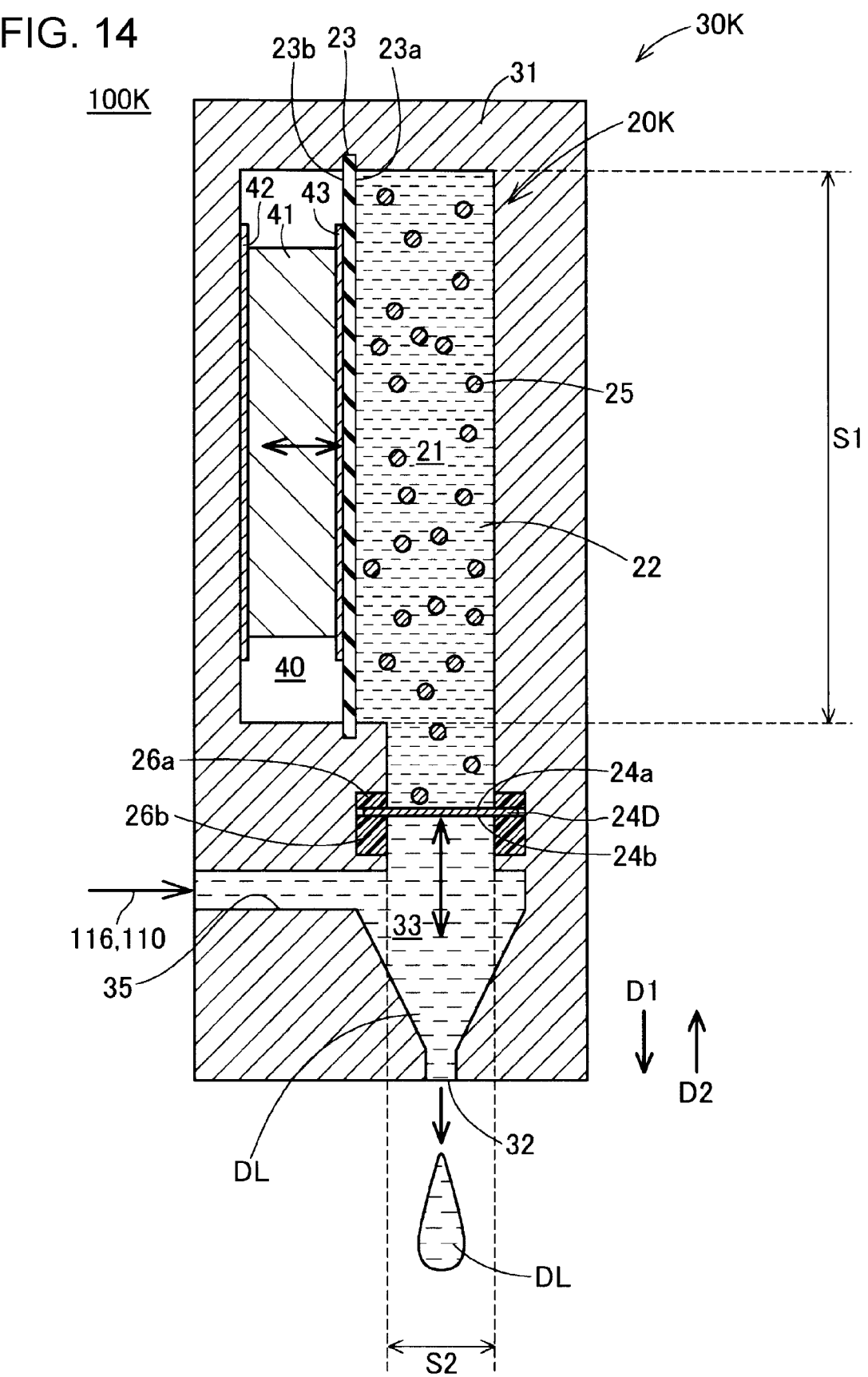
FIG. 14 is a schematic cross-sectional view schematically showing an internal configuration of a head portion according to an eleventh embodiment.

With reference to FIG. 14, the configuration of an displacement amplifying mechanism 20K and a liquid ejecting apparatus 100K provided therewith in a eleventh embodiment will be described. FIG. 14 is a schematic cross-sectional view showing an internal configuration of a head portion 30K according to an eleventh embodiment. The configuration of the liquid ejecting apparatus 100K of the eleventh embodiment is substantially the same as that of the liquid ejecting apparatus 100J of the tenth embodiment except that the head portion 30K of the eleventh embodiment is provided instead of the head portion 30J of the tenth embodiment. The configuration of the head portion 30K of the eleventh embodiment is substantially the same as that of the head portion 30J of the tenth embodiment except that the displacement amplifying mechanism 20K of the eleventh embodiment to which the configurations of the second wall portion 24D and the elastic members 26a and 26b (FIG. 7) described in the fourth embodiment are applied, is provided. In the displacement amplifying mechanism 20K of the eleventh embodiment and the liquid ejecting apparatus 100K provided therewith, various operational effects described in each of the above embodiments can be achieved.

12. Twelfth Embodiment

Figure 15:
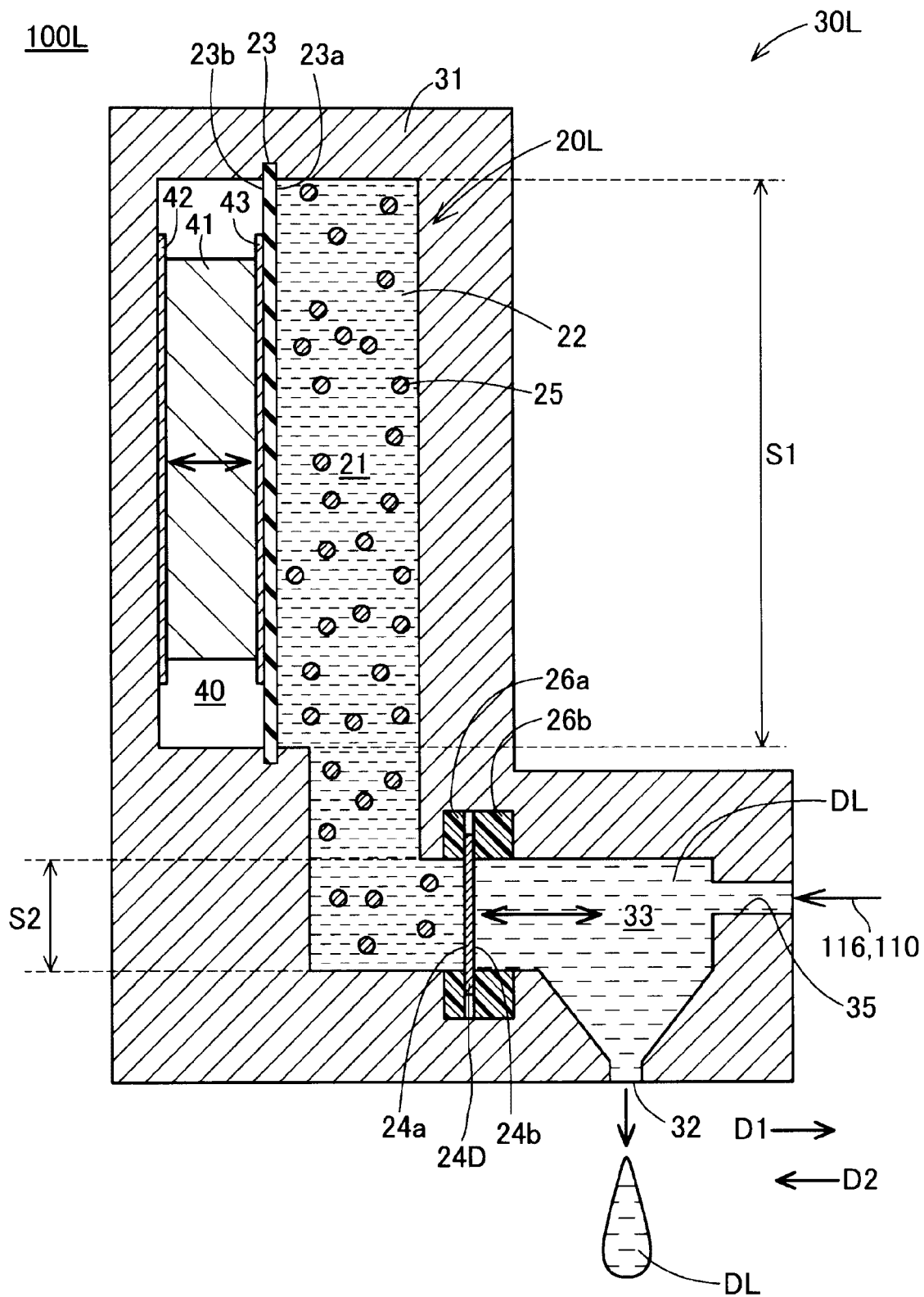
FIG. 15 is a schematic cross-sectional view schematically showing an internal configuration of a head portion according to a twelfth embodiment.

With reference to FIG. 15, the configuration of an displacement amplifying mechanism 20L and a liquid ejecting apparatus 100L provided therewith in a twelfth embodiment will be described. FIG. 15 is a schematic cross-sectional view showing an internal configuration of a head portion 30L according to a twelfth embodiment. The configuration of the liquid ejecting apparatus 100L of the twelfth embodiment is substantially the same as that of the liquid ejecting apparatus 100K of the eleventh embodiment except that the head portion 30L of the twelfth embodiment is provided instead of the head portion 30K of the eleventh embodiment. The configuration of the head portion 30L of the twelfth embodiment is substantially the same as that of the head portion 30K of the eleventh embodiment except that the second wall portion 24D is disposed so as to be disposed along the direction of gravity similar to the first wall portion 23, and forms a side wall surface of the pressure chamber 33. The second wall portion 24D is provided at a position offset downward in the direction of gravity from the first wall portion 23. According to the head portion 30L of the twelfth embodiment, it is possible to eject the ejection liquid DL in a direction different from the displacement direction of the second wall portion 24D. In addition, according to the displacement amplifying mechanism 20L of the twelfth embodiment and the liquid ejecting apparatus 100L provided therewith, various operational effects described in each of the above embodiments can be achieved.

13. Thirteenth Embodiment

Figure 16:
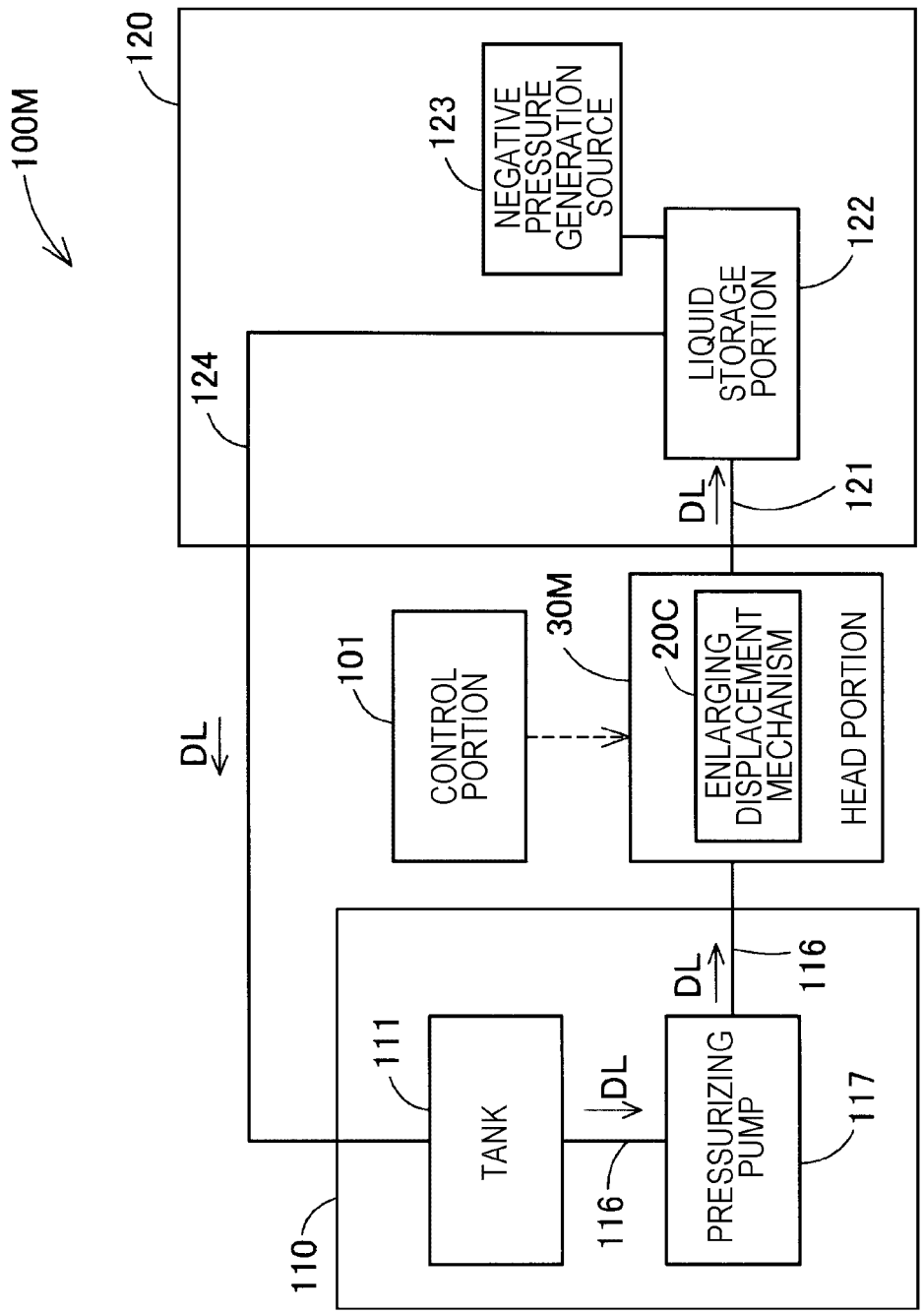
FIG. 16 is a schematic block diagram showing an overall configuration of a liquid ejecting apparatus according to a thirteenth embodiment.

FIG. 16 is a schematic block diagram showing an overall configuration of a liquid ejecting apparatus 100M according to a thirteenth embodiment. The configuration of the liquid ejecting apparatus 100M of the thirteenth embodiment is substantially the same as that of the liquid ejecting apparatus 100C (FIG. 5) of the third embodiment except for the points described below. The supply portion 110 of the liquid ejecting apparatus 100M is provided with a pressurizing pump 117 instead of the pressure adjustment portion 115 and is provided with the head portion 30M of the thirteenth embodiment instead of the head portion 30C of the third embodiment. In addition, the liquid ejecting apparatus 100M is provided with a circulation portion 120. The circulation portion 120 is provided with a discharge path 121, a liquid storage portion 122, a negative pressure generation source 123, and a circulation path 124.

The pressurizing pump 117 pressure-feeds the ejection liquid DL in the tank 111 to the head portion 30M via the supply path 116. The configuration of the head portion 30M will be described later. The discharge path 121 connects the head portion 30M and the liquid storage portion 122. The ejection liquid DL that has not been ejected by the head portion 30M is discharged to the liquid storage portion 122 through the discharge path 121. The negative pressure generation source 123 is connected to the liquid storage portion 122. The negative pressure generation source 123 sucks the ejection liquid DL from the head portion 30M through the discharge path 121 by setting the inside of the liquid storage portion 122 to a negative pressure. The negative pressure generation source 123 is formed of various pumps.

In the liquid ejecting apparatus 100M, the pressure in the pressure chamber 33 of the head portion 30M (shown in FIG. 17 to be referred to later) is adjusted by pressurization by the pressurizing pump 117 and depressurization by the negative pressure generation source 123. In the liquid ejecting apparatus 100M, any one of the pressurizing pump 117 and the negative pressure generation source 123 may be omitted. In a case where the pressurizing pump 117 is omitted, it can be interpreted that the negative pressure generation source 123 functions as a constituent element of the supply portion 110 that generates pressure for pressure-feeding the ejection liquid DL from the tank 111 to the head portion 30M.

The circulation path 124 is a flow path for circulating the ejection liquid DL ejected from the head portion 30M through the discharge path 121 to the pressure chamber 33 of the head portion 30M. The circulation path 124 connects the liquid storage portion 122 and the tank 111. The ejection liquid DL stored in the liquid storage portion 122 through the discharge path 121 is returned to the tank 111 through the circulation path 124 and again supplied to the pressure chamber 33 of the head portion 30M through the supply path 116. The circulation path 124 may be provided with a pump for sucking liquid from the liquid storage portion 122.

In the liquid ejecting apparatus 100M, since the circulation path 124 is provided, it is possible to reuse the ejection liquid DL flowing out from the head portion 30M. Therefore, wasteful consumption of the ejection liquid DL can be inhibited, and the use efficiency of the ejection liquid DL can be enhanced. An adjustment mechanism for adjusting various states such as the concentration, viscosity, temperature, and the like of the ejection liquid DL to be recycled may be provided in the liquid storage portion 122 and the tank 111. In addition, a filter portion for removing air bubbles and foreign matter contained in the ejection liquid DL may be provided in the discharge path 121 and the circulation path 124.

Figure 17:
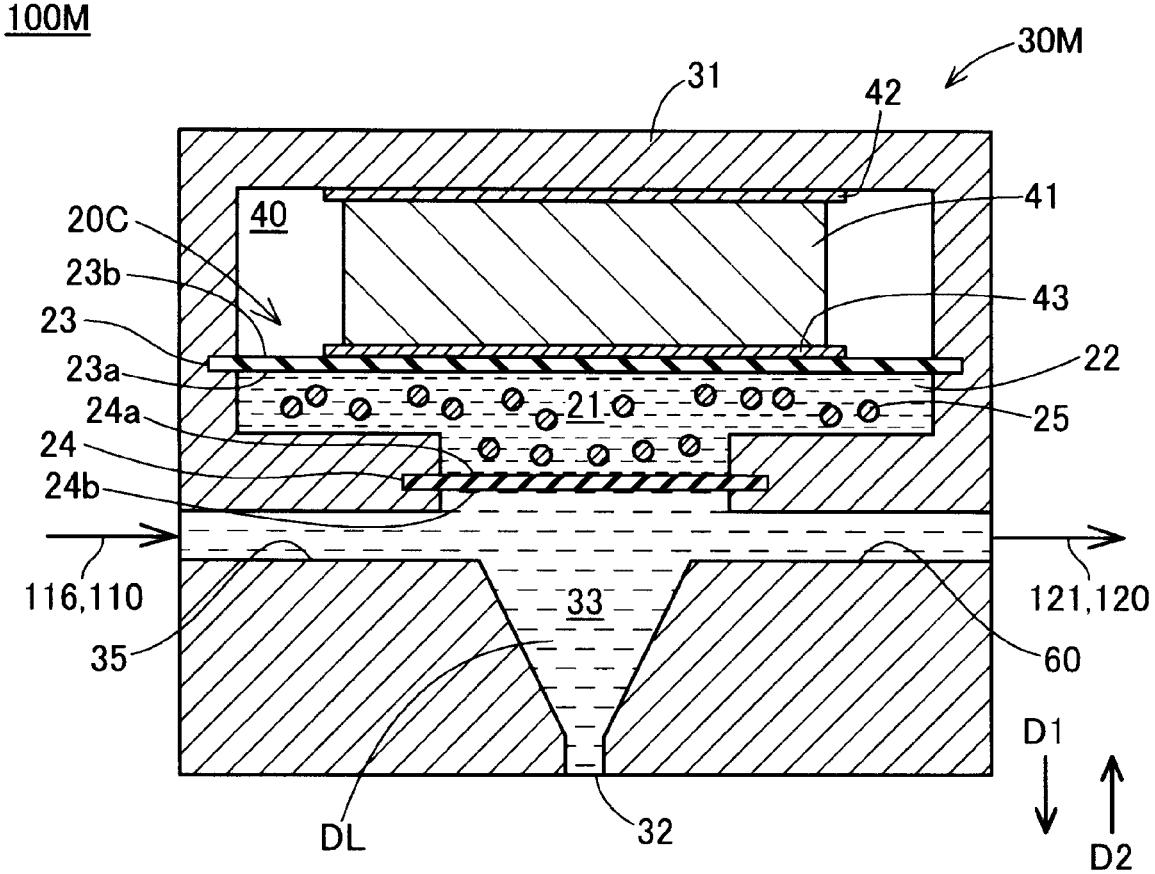
FIG. 17 is a schematic cross-sectional view showing an internal configuration of a head portion according to the thirteenth embodiment.

FIG. 17 is a schematic cross-sectional view showing an internal configuration of a head portion 30M according to the thirteenth embodiment. The configuration of the head portion 30M of the thirteenth embodiment is different from that of the head portion 30C of the third embodiment in that a discharge flow path 60 is added. The configuration of the head portion 30M of the thirteenth embodiment is substantially the same as that of the head portion 30C of the third embodiment except for the points described below, and is provided with the displacement amplifying mechanism 20C described in the third embodiment.

The discharge flow path 60 is one of the flow paths through which the ejection liquid DL flows. The discharge flow path 60 is provided in the housing 31 and is connected to the pressure chamber 33. The ejection liquid DL in the pressure chamber 33 flows out to the discharge path 121 through the discharge flow path 60.

In the head portion 30M of the liquid ejecting apparatus 100M, a flow of the ejection liquid DL flowing from the supply flow path 35 to the discharge flow path 60 can be generated in the pressure chamber 33. Therefore, deterioration of the ejection liquid DL caused by the retention of the ejection liquid DL in the head portion 30M, such as accumulation of sedimentary components in the ejection liquid DL in the head portion 30M and concentration change due to evaporation of solvent components of the ejection liquid DL, is inhibited. Therefore, the occurrence of ejection failure due to deterioration of the ejection liquid DL in the pressure chamber 33 is inhibited. In addition, in the liquid ejecting apparatus 100M, even if air bubbles are generated in the pressure chamber 33, the air bubbles can be discharged from the discharge flow path 60 together with the ejection liquid DL. Therefore, occurrence of ejection failure due to air bubbles in the pressure chamber 33 is inhibited. Additionally, according to the liquid ejecting apparatus 100M of the thirteenth embodiment provided with the displacement amplifying mechanism 20C, the various operational effects described in each of the above embodiments can be achieved.

14. Fourteenth Embodiment

Figure 18:
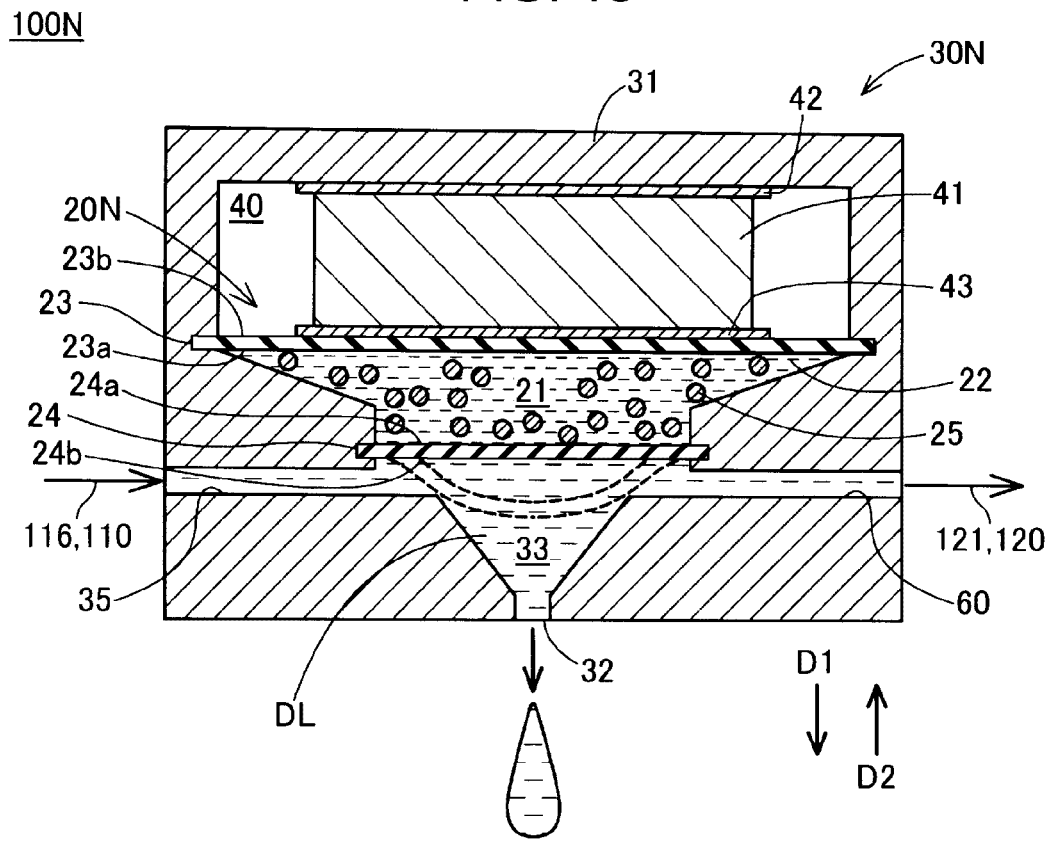
FIG. 18 is a schematic cross-sectional view showing an internal configuration of a head portion according to a fourteenth embodiment.

With reference to FIG. 18, the configuration of a liquid ejecting apparatus 100N in a fourteenth embodiment will be described. FIG. 18 is a schematic cross-sectional view showing an internal configuration of a head portion 30N according to a fourteenth embodiment. The configuration of the liquid ejecting apparatus 100N of the fourteenth embodiment is substantially the same as that of the liquid ejecting apparatus 100M of the thirteenth embodiment except that the head portion 30N of the fourteenth embodiment is provided instead of the head portion 30M of the thirteenth embodiment. The configuration of the head portion 30N of the fourteenth embodiment is different from that of the head portion 30M of the thirteenth embodiment in that the supply flow path 35 and the discharge flow path 60, which are flow paths connected to the pressure chamber 33, are closed with respect to the pressure chamber 33 when the second wall portion 24 of the displacement amplifying mechanism 20N is displaced. The configuration of the head portion 30N of the fourteenth embodiment is substantially the same as that of the head portion 30M of the thirteenth embodiment except for the points described below.

In the head portion 30N of the fourteenth embodiment, when the actuator 41 extends, the second wall portion 24 is bent toward the nozzle 32 so that a second wall surface 24b comes into contact with the opening end portions of the supply flow path 35 and the discharge flow path 60, and the supply flow path 35 and the discharge flow path 60 are substantially closed with respect to the pressure chamber 33. As a result, the connection between each of the supply flow path 35 and the discharge flow path 60 and the pressure chamber 33 is blocked, and it is possible to inhibit the pressure generated in the pressure chamber 33 in order to eject the ejection liquid DL from the nozzle 32 from being released to at least one of the supply flow path 35 and the discharge flow path 60. Therefore, it is possible to increase the ejection efficiency of the ejection liquid DL in the head portion 30N. In addition, if the second wall portion 24 is in a state where the inflow of the ejection liquid DL from the supply flow path to the nozzle 32 is blocked, leakage of the ejection liquid DL from the nozzle 32 is inhibited even if the pressure of the ejection liquid DL supplied to the supply flow path 35 through the supply path 116 is increased by the pressurizing pump 117 (FIG. 16). Therefore, by increasing the pressure of the ejection liquid DL in the supply flow path 35, it is possible to shorten the filling time of the ejection liquid DL into the pressure chamber 33 after the supply flow path 35 is opened. Additionally, according to the liquid ejecting apparatus 100N of the fourteenth embodiment provided with the displacement amplifying mechanism 20C, the various operational effects described in each of the above embodiments can be achieved.

15. Fifteenth Embodiment

Figure 19:
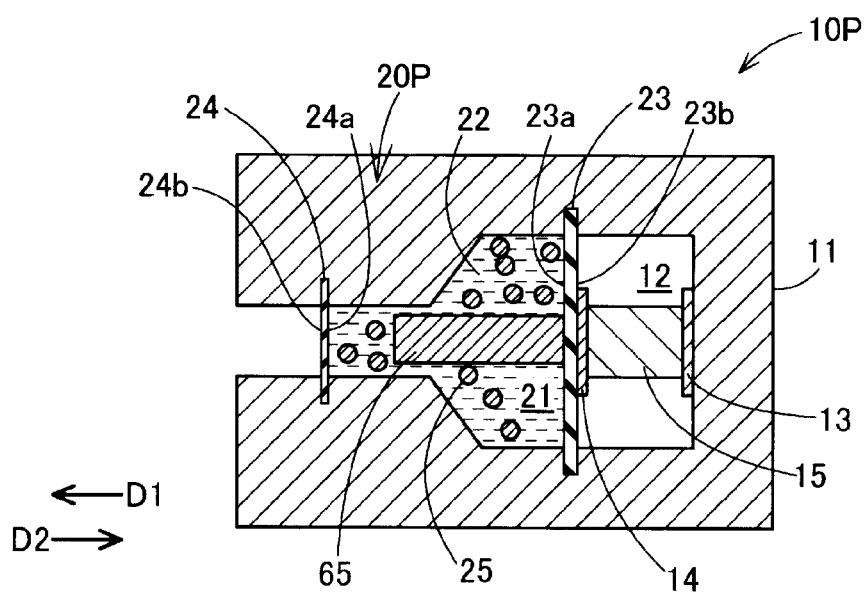
FIG. 19 is a schematic diagram showing a configuration of a displacement generator provided with an displacement amplifying mechanism of a fifteenth embodiment.

FIG. 19 is a schematic diagram showing a configuration of a displacement generator 10P provided with an displacement amplifying mechanism 20P of a fifteenth embodiment. The configuration of the displacement generator 10P of the fifteenth embodiment is substantially the same as that of the displacement generator 10B of the second embodiment except that the displacement amplifying mechanism 20P of the fifteenth embodiment is provided instead of the displacement amplifying mechanism 20B of the second embodiment. The configuration of the displacement amplifying mechanism 20P of the fifteenth embodiment is substantially the same as that of the displacement amplifying mechanism 20B of the second embodiment except that a protrusion 65 is provided on the first wall surface 23a of the first wall portion 23.

In the displacement amplifying mechanism 20P of the fifteenth embodiment, the protrusion 65 is provided on the first wall surface 23a of the first wall portion 23 so as to protrude in the displacement direction of the first wall portion 23. In the fifteenth embodiment, the protrusion 65 has a cylindrical shape extending toward the second wall portion 24. The shape of the protrusion 65 is not limited to the cylindrical shape. For example, the protrusion 65 may have a rectangular parallelepiped shape. In addition, a plurality of protrusions 65 may be provided on the first wall portion 23.

In the displacement amplifying mechanism 20P, the space volume capable of accommodating the liquid 22 in the accommodation chamber 21 is reduced by the volume of the protrusion 65 thereof and the amount of the liquid 22 filled in the accommodation chamber 21 is reduced. Therefore, the pressure generated by expansion and contraction of the actuator 41 is inhibited from being absorbed by compression of the volume of the liquid 22 without being transmitted to the second wall portion 24. Therefore, the driving force of the actuator 41 can be efficiently transmitted to the second wall portion 24. Additionally, according to the displacement generator 10P of the fifteenth embodiment, the various operational effects described in the first embodiment, the second embodiment, and the fifteenth embodiment can be achieved. The protrusion 65 of the fifteenth embodiment may be applied to the displacement amplifying mechanism 20A of the first embodiment and to the displacement amplifying mechanisms 20C to 20N of the third embodiment and subsequent embodiments.

16. Sixteenth Embodiment

Figure 20:
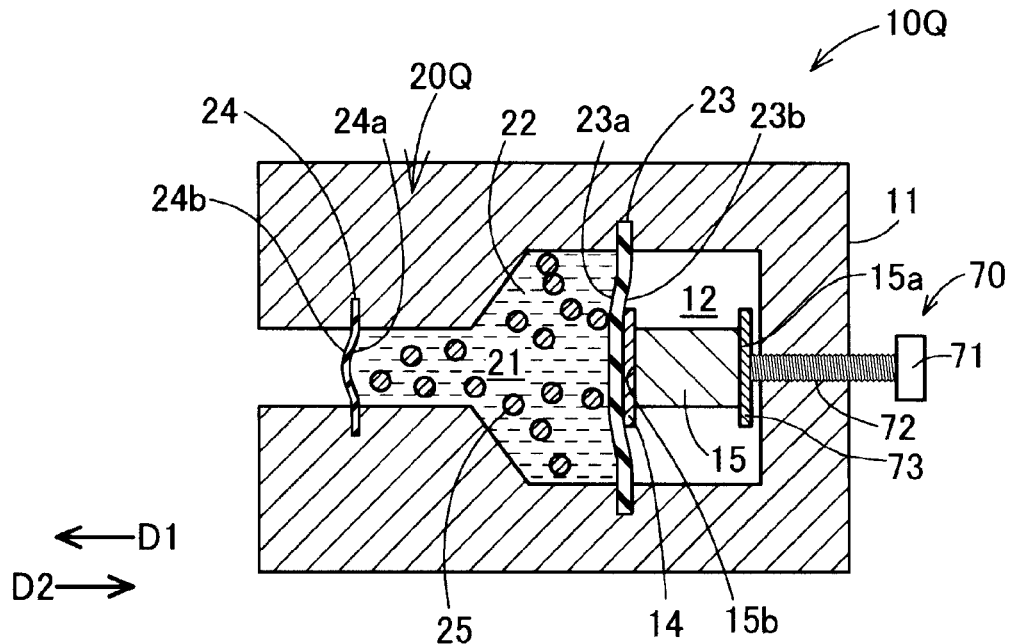
FIG. 20 is a schematic diagram showing a configuration of a displacement generator provided with an displacement amplifying mechanism of a sixteenth embodiment.

With reference to FIG. 20, the configuration of an displacement amplifying mechanism 20Q in a sixteenth embodiment will be described. FIG. 20 is a schematic diagram showing a configuration of a displacement generator 10Q provided with the displacement amplifying mechanism 20Q of the sixteenth embodiment. The configuration of the displacement generator 10Q of the sixteenth embodiment is substantially the same as that of the displacement generator 10B of the second embodiment except that the displacement amplifying mechanism 20Q of the sixteenth embodiment is provided instead of the displacement amplifying mechanism 20B of the second embodiment. The configuration of the displacement amplifying mechanism 20Q of the sixteenth embodiment is substantially the same as that of the displacement amplifying mechanism 20B of the second embodiment except that an adjustment portion 70 is provided.

The displacement amplifying mechanism 20Q of the sixteenth embodiment is provided with the adjustment portion 70 for adjusting the displacement characteristics thereof. The adjustment portion 70 is configured to include an adjustment screw 71, a screw hole 72 provided in the housing 11, and a pressing plate 73. The adjustment screw 71 is inserted into the screw hole 72 penetrating to the drive chamber 12. The adjustment screw 71 is attached to the screw hole 72 so that the tip end portion presses the first end portion 15a of the actuator 15 via the pressing plate 73 disposed in the drive chamber 12.

In the displacement amplifying mechanism 20Q, the position of the actuator 15 can be moved toward the accommodation chamber 21 by rotating the adjustment screw 71 of the adjustment portion 70 to increase the length of the adjustment screw 71 protruding into the drive chamber 12. If the position of the actuator 15 is changed by the adjustment screw 71, the amount of displacement of the first wall portion 23 in the direction toward the accommodation chamber 21 and the amount of displacement of the second wall portion 24 in the direction away from the accommodation chamber 21 change in the initial state where the actuator 15 is not extended. Therefore, in the displacement amplifying mechanism 20Q, the amount of displacement of the first wall portion 23 and the second wall portion 24 in the initial state can be adjusted by the rotation of the adjustment screw 71 of the adjustment portion 70. Thereby, it is possible to adjust the displacement characteristics of the displacement amplifying mechanism 20Q. Additionally, according to the displacement generator 10Q of the sixteenth embodiment, the various operational effects described in the first embodiment, the second embodiment, and the sixteenth embodiment can be achieved. The adjustment portion 70 of the sixteenth embodiment may be applied to the displacement amplifying mechanism 20A of the first embodiment and to the displacement amplifying mechanisms 20C to 20P of the third embodiment and subsequent embodiments.

17. Seventeenth Embodiment

Figure 21:
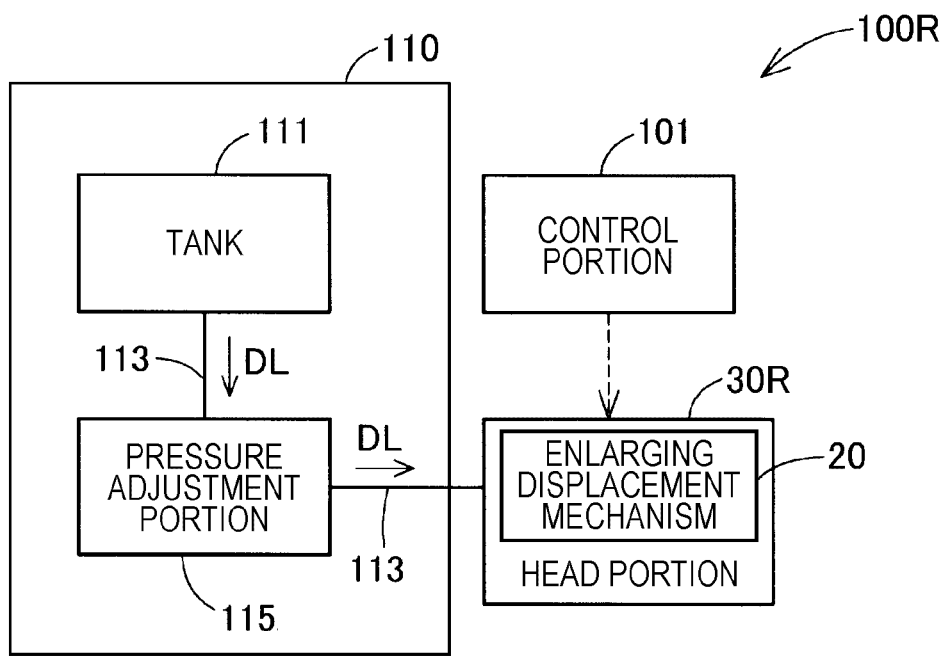
FIG. 21 is a schematic block diagram showing a configuration of a liquid ejecting apparatus according to a seventeenth embodiment.

FIG. 21 is a schematic block diagram showing a configuration of a liquid ejecting apparatus 100R according to a seventeenth embodiment. The liquid ejecting apparatus 100R is provided with the head portion 30R provided with the displacement amplifying mechanism 20, the control portion 101, and the supply portion 110.

The head portion 30R ejects the liquid DL using the displacement amplifying mechanism 20. The liquid DL is, for example, ink having a predetermined viscosity. The operation of the head portion 30R is controlled by the control portion 101. The configuration of the head portion 30R and the displacement amplifying mechanism 20 provided therein, and the operation of the head portion 30R will be described later.

The control portion 101 is configured as a computer provided with a CPU and a memory, and realizes various functions for controlling the liquid ejecting apparatus 100R by the CPU reading and executing control programs and instructions stored in the memory. The control program may be recorded on various non-transitory tangible recording media. The control portion 101 may be formed of a circuit.

The supply portion 110 supplies the liquid DL to the head portion 30R. The supply portion 110 configured to include the tank 111, the supply path 113, and the pressure adjustment portion 115. The tank 111 accommodates the liquid DL. The liquid DL in the tank 111 is supplied to the head portion 30R through the supply path 113 connected to the head portion 30R.

The pressure adjustment portion 115 is provided in the middle of the supply path 113, and adjusts the pressure of the liquid DL supplied to the head portion 30R through the supply path 113 to a predetermined pressure. The pressure adjustment portion 115 is configured to include a pump that sucks the liquid DL from the tank 111, a valve that opens and closes so that the pressure on the head portion 30R side becomes a predetermined pressure (not shown).

Figure 22:
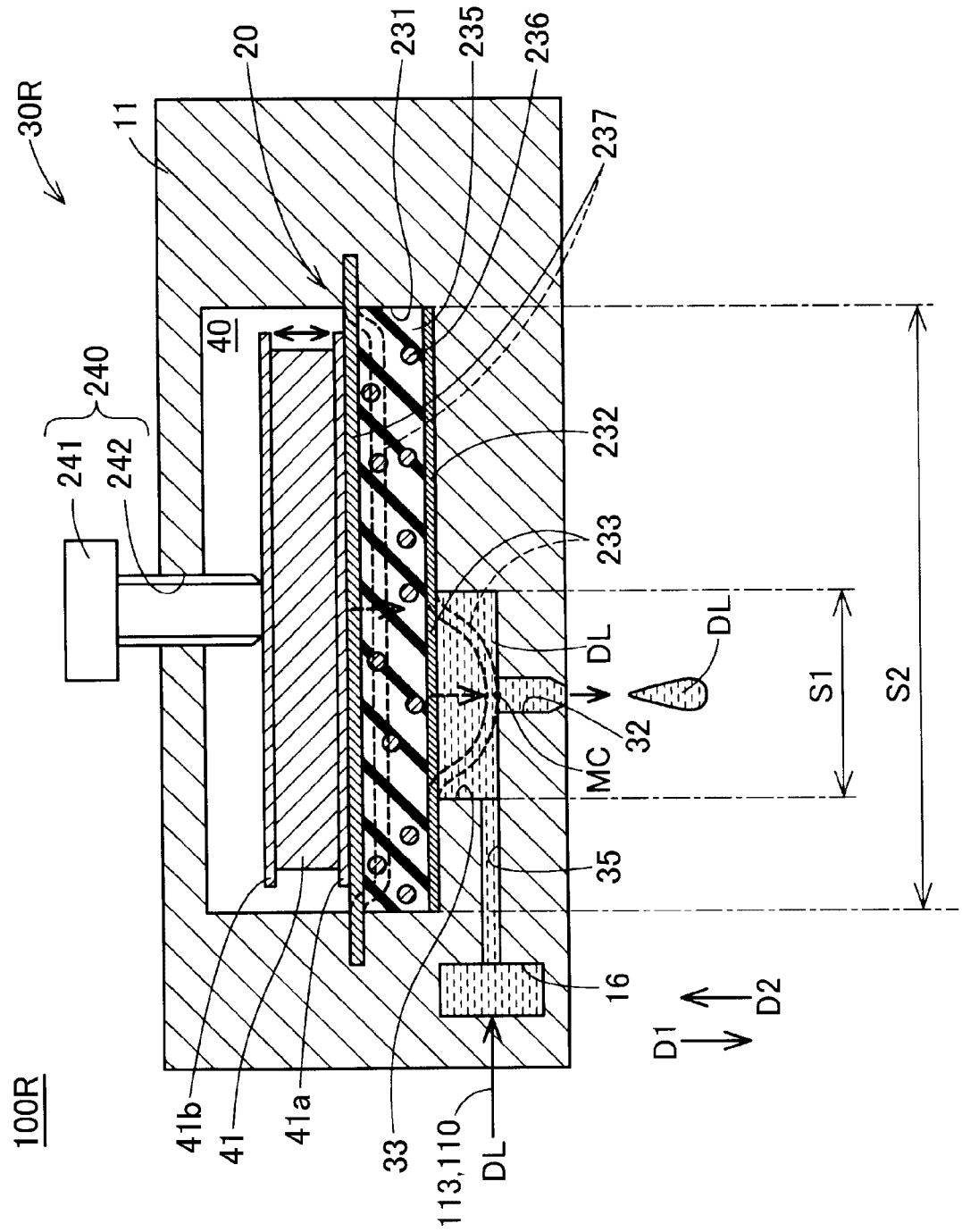
FIG. 22 is a schematic diagram showing a configuration of a head portion according to the seventeenth embodiment provided with an displacement amplifying mechanism.

FIG. 22 is a schematic cross-sectional view showing a configuration of a head portion 30R provided with a liquid ejecting apparatus 100R according to the seventeenth embodiment. The head portion 30R of the seventeenth embodiment is provided with the metallic housing 11. The head portion 30R has a plurality of sets of nozzle 32, pressure chamber 33, supply flow path 35, actuator 41, and displacement amplifying mechanism 20 as an ejection mechanism for ejecting the liquid DL in the housing 11. In the head portion 30R, such a plurality of sets of ejection mechanism are disposed in the depth direction of the page of FIG. 22. In FIG. 22, a predetermined one of the plurality of ejection mechanisms is shown.

The nozzle 32 ejects the liquid DL. The nozzle 32 is provided as a through-hole which communicates with the pressure chamber 33 and extends from the pressure chamber 33 toward the outside of the housing 11. In the seventeenth embodiment, since the head portion 30R ejects the liquid DL in the direction of gravity, the nozzle 32 is open in the direction of gravity. The nozzle 32 may be provided so as to be open in a direction other than the direction of gravity. For example, the nozzle 32 may be open in a direction obliquely intersecting in the direction of gravity or in a horizontal direction.

The pressure chamber 33 accommodates the liquid DL ejected from the nozzle 32. The supply flow path 35 through which the liquid DL flows is connected to the pressure chamber 33. In the seventeenth embodiment, each of the plurality of supply flow paths 35 provided in the housing 11 is branched from a single common supply flow path 16 connected to the supply path 113 (FIG. 21) of the supply portion 110 and connected to a corresponding one of the plurality of pressure chambers 33 in the housing 11. The liquid DL is supplied from the supply portion 110 (FIG. 21) to the pressure chamber 33 through the supply flow path 35. The pressure in the pressure chamber 33 is usually adjusted to a pressure of a meniscus withstand pressure or lower of the nozzle 32 by the pressure adjustment portion 115 (FIG. 21) of the supply portion 110.

The actuator 41 changes the volume of the pressure chamber 33 to generate a displacement for generating the ejection pressure in the pressure chamber 33 for ejecting the liquid DL from the nozzle 32. In the seventeenth embodiment, the actuator 41 is formed of a piezoelectric element (piezo element) which expands and contracts according to the applied voltage. The actuator 41 is accommodated in the drive chamber 40 provided above the direction of gravity of the pressure chamber 33 with the displacement amplifying mechanism 20 interposed therebetween and disposed so as to expand and contract in a direction from the drive chamber 40 to the pressure chamber 33.

The first end portion 41a in the expansion and contraction direction of the actuator 41 is connected to the displacement amplifying mechanism 20. The second end portion 41b on the side opposite to the first end portion 41a of the actuator 41 is connected to the adjustment portion 240. The adjustment portion 240 will be described later. The amount of displacement of the actuator 41 is controlled by the control portion 101 (FIG. 21).

The displacement amplifying mechanism 20 is disposed between the actuator 41 and the pressure chamber 33, expands the amount of displacement of the actuator 41, and transmits the enlarged amount of displacement to the pressure chamber 33. The displacement amplifying mechanism 20 is provided with an accommodation chamber 231, a partition wall portion 232, an elastic material 235, and a sealing wall portion 237. The accommodation chamber 231 is a space in the housing 11 provided between the pressure chamber 33 and the drive chamber 40.

The partition wall portion 232 is disposed so as to separate the accommodation chamber 231 from the pressure chamber 33. In the seventeenth embodiment, the partition wall portion 232 is disposed so as to cover the entire bottom surface of the accommodation chamber 231. The partition wall portion 232 may be disposed so as to cover only a portion of the bottom surface of the accommodation chamber 231.

Here, the partition wall portion 232 forms a portion of the wall surface of the pressure chamber 33, and a region where the flexure deformation in the thickness direction is permitted is referred to as "deformation portion 233". In the seventeenth embodiment, the deformation portion 233 forms the upper wall surface of the pressure chamber 33, and faces the nozzle 32. A peripheral portion of the deformation portion 233 is fixed to the housing 11. In FIG. 22, the state of the deformation portion 233 when flexibly deformed toward the pressure chamber 33 side is schematically shown by a broken line. It is desirable that the deformation portion 233 has a substantially uniform thickness so as to inhibit occurrence of stress concentration when flexibly deformed.

Here, in the displacement amplifying mechanism 20, when a uniform pressure is applied to the surface of the deformation portion 233 via the elastic material 235 in the first direction D1 from the accommodation chamber 231 toward the pressure chamber 33, a position where the deformation portion 233 most protrudes toward the pressure chamber 33 side is referred to as "deformation center portion MC of deformation portion 233". In addition, in the deformation portion 233 in a flat state where the flexure deformation does not occur, the minimum length of the length of the line segment passing through the deformation center portion MC and connecting both ends of the deformation portion 233 is referred to as "minimum width of deformation portion 233". At this time, it is desirable that the thickness of the deformation portion 233 when in the flat state is smaller than the minimum width of the deformation portion 233. As a result, the deformation portion 233 can be likely to flexibly deform, and the compliance of the displacement of the deformation portion 233 with respect to the displacement of the elastic material 235 can be enhanced.

In a case where the outer peripheral shape of the deformation portion 233 is a circular shape, the deformation center portion MC of the deformation portion 233 may be interpreted as a center of the circular shape. In this case, the minimum width of the deformation portion 233 can be interpreted as the diameter of the circular shape. In addition, in a case where the outer peripheral shape of the deformation portion 233 is a square shape or a rectangular shape, the deformation center portion MC of the deformation portion 233 may be interpreted as a center of the square shape or the rectangular shape. In this case, the minimum width of the deformation portion 233 can be interpreted as the length of one side of the square shape or the length of the short side of the rectangular shape.

In the seventeenth embodiment, when the deformation portion 233 is flexibly deformed in the first direction D1 from the accommodation chamber 231 toward the pressure chamber 33, the deformation portion 233 is flexibly deformed in the second direction D2 opposite to the first direction D1 in a state where an elastic force as a restoring force is generated. The deformation portion 233 is formed of, for example, a metal diaphragm. The deformation portion 233 is not limited to the metal diaphragm and may be formed of rubber or another resin diaphragm. The region other than the deformation portion 233 of the partition wall portion 232 may be formed of the same material as the deformation portion 233 and may be formed of a different material.

It is desirable that the deformation portion 233 has a Young's modulus larger than that of the elastic material 235 in order to enhance the compliance to the displacement repeated by the actuator 41. In addition, it is desirable that the deformation portion 233 has a repulsion elastic modulus larger than that of the elastic material 235.

It is desirable that the deformation portion 233 is formed of a material having a high gas barrier property in order to inhibit the liquid DL in the pressure chamber 33 from vaporizing and entering into the accommodation chamber 231. In addition, since the surface of the deformation portion 233 is exposed to the liquid DL of the pressure chamber 33, it is desirable that the surface treatment is performed so as to have chemical resistance and heat resistance. Alternatively, the deformation portion 233 may be formed of a material having high chemical resistance and heat resistance.

The elastic material 235 is accommodated in the accommodation chamber 231. The elastic material 235 is elastically deformed by the displacement of the actuator 41. The elastic material 235 exhibits the fluidity exhibited when deformed by receiving pressure from the outside and is formed of a material that exhibits a fluid property such as liquid that can transmit pressure in all directions. The higher the fluidity exhibited when the elastic material 235 is deformed by receiving pressure from the outside, the more desirable. The elastic material 235 is formed of various rubber materials including, for example, silicon rubber. The elastic material 235 may be molded by, for example, vacuum casting.

It is desirable that the accommodation chamber 231 is filled with the elastic material 235 so that a gap is not substantially formed on the side wall surface of the accommodation chamber 231. As a result, when the elastic material 235 is pressed from the actuator 41, deformation in a direction intersecting the direction where the elastic material 235 is pressed from the actuator 41 (in the horizontal direction in the embodiment) is inhibited by the side wall surface of the accommodation chamber 231. It is desirable that the elastic material 235 is bonded to the deformation portion 233 of the partition wall portion 232 by an adhesive, welding, fusing, or the like in order to enhance the compliance of the displacement amplifying mechanism 20 with respect to the displacement of the actuator 41.

In the seventeenth embodiment, the filler 236, which is a material in the form of fine particles, is dispersed in the elastic material 235. The filler 236 is formed of a material having a smaller compressibility than that of the elastic material 235. "Compressibility" is a value representing the rate of change in volume before and after application of an external force. The smaller the compressibility is, the smaller the degree of reduction in the volume is when the external force is applied. The filler 236 may be formed of a material having higher hardness than that of the elastic material 235. The filler 236 may be formed of, for example, metal, resin, ceramic, glass, or the like. The function of the filler 236 will be described later.

The sealing wall portion 237 is disposed so as to seal the accommodation chamber 231 between the actuator 41 and the elastic material 235. The sealing wall portion 237 is connected to the first end portion 41a of the actuator 41, and is flexibly deformed according to the displacement of the actuator 41. In FIG. 22, the state of the sealing wall portion 237 when flexibly deformed toward the elastic material 235 is schematically shown by a broken line. The sealing wall portion 237 may be formed of, for example, a resin film or a rubber-like film member. The sealing wall portion 237 may be formed of a metal plate functioning as a diaphragm.

It is desirable that the sealing wall portion 237 is bonded to the first end portion 41a of the actuator 41 by an adhesive, welding, fusing, or the like in order to enhance the compliance with respect to the displacement of the actuator 41. In addition, it is desirable that the sealing wall portion 237 has a Young's modulus larger than that of the elastic material 235 in order to enhance the compliance to the displacement repeated by the actuator 41. It is desirable that the sealing wall portion 237 has a repulsion elastic modulus larger than that of the elastic material 235.

In the displacement amplifying mechanism 20, the area S1 of the deformation portion 233 is smaller than the area S2 of the region where the elastic material 235 receives pressure from the actuator 41 via the sealing wall portion 237 (hereinafter also referred to as "pressurized region"). The area S1 of the deformation portion 233 is the area of the region where the formation region of the deformation portion 233 is projected in the displacement direction on the virtual plane orthogonal to the displacement direction of the deformation portion 233. The formation region of the deformation portion 233 is a region where the flexure deformation is permitted in the partition wall portion 232, and can also be interpreted as a formation region of an opening portion communicating with the pressure chamber 33 and being open on the wall surface of the accommodation chamber 231. The area S2 of the pressurized region corresponds to the area of the region where the region where the elastic material 235 is deformed by the displacement of the actuator 41 is projected in the displacement direction on the virtual plane orthogonal to the displacement direction of the actuator 41. In the seventeenth embodiment, the area S2 of the pressurized region can also be interpreted as the area of the region where the region where the sealing wall portion 237 is flexibly deformed by the displacement of the actuator 41 is projected in the displacement direction on the virtual plane orthogonal to the displacement direction of the actuator 41.

In the displacement amplifying mechanism 20, as described above, a difference is provided between the area S1 of the deformation portion 233 and the area S2 of the pressurized region by the actuator 41. When subjected to pressure by the displacement of the actuator 41, the elastic material 235 shows a fluid behavior and is deformed so as to flow. Due to the fluidity developed in the elastic material 235, the pressure generated by the displacement of the actuator 41 is transmitted to the deformation portion 233. At this time, the amount of displacement of the deformation portion 233 is enlarged more than the amount of displacement of the actuator 41 depending on the difference between the areas S1 and S2 according to the principle of Pascal.

The displacement amplifying mechanism 20 of the head portion 30R is further provided with the adjustment portion 240. The adjustment portion 240 is connected to the second end portion 41b of the actuator 41 as described above. The adjustment portion 240 is configure to include the adjustment screw 241 and the screw hole 242 provided in the housing 11. The screw hole 242 penetrates the housing 11 toward the second end portion 41b of the actuator 41. The adjustment screw 241 is attached to the screw hole 242 so that the tip end portion thereof presses the second end portion 41b of the actuator 41. In the displacement amplifying mechanism 20, by rotating the adjustment screw 241, the installation position of the actuator 41 in the drive chamber 40 can be adjusted. As a result, it is possible to adjust the initial pressure that the elastic material 235 receives from the actuator 41 in the initial state when the actuator 41 is not driven.

In the liquid ejecting apparatus 100R, when ejecting the liquid DL from the nozzle 32, the control portion 101 (FIG. 21) operates the head portion 30R, for example, as follows. The control portion 101 instantaneously extends the actuator 41 and presses the elastic material 235 to elastically deform. As a result, the deformation portion 233 of the partition wall portion 232 is flexibly deformed in the first direction D1 from the accommodation chamber 231 toward the pressure chamber 33 and the volume of the pressure chamber 33 is reduced so that the ejection pressure larger than the meniscus withstand pressure of the nozzle 32 is generated in the pressure chamber 33, and the ejection of the liquid DL from the nozzle 32 is started.

In order to obtain a higher ejection pressure, as shown in FIG. 22, it is desirable that the deformation portion 233 is configured to flexibly deform until the opening end portion of the nozzle 32 in the pressure chamber 33 is substantially closed. The "substantially closed state" includes not only a state where the deformation portion 233 comes into contact with the entire opening end portion of the nozzle 32 to completely close the nozzle 32 but also a state where the deformation portion 233 approaches the opening end portion of the nozzle 32 and the inflow of the liquid DL into the nozzle 32 is inhibited.

The control portion 101 instantaneously contracts the actuator 41 after the ejection of the liquid DL from the nozzle 32 is started, rapidly reduces the pressure applied to the elastic material 235 and bends, and is flexibly deformed the deformation portion 233 in the second direction D2 from the pressure chamber 33 toward the accommodation chamber 231. As a result, the volume of the pressure chamber 33 is increased and a negative pressure that pulls the liquid DL flowing out to the nozzle 32 back to the pressure chamber 33 is generated in the pressure chamber 33. Due to the negative pressure, separation of the liquid DL ejected from the nozzle 32 from the liquid DL in the nozzle 32 is promoted, so that it is inhibited that the liquid droplets of the liquid DL ejected from the nozzle 32 from being tailed.

As described above, in the head portion 30R, the amount of displacement of the deformation portion 233 is enlarged by the displacement amplifying mechanism 20 to be larger than the amount of displacement of the actuator 41. Therefore, the pressure inside the pressure chamber 33 can be instantaneously enhanced in a shorter period of time. Therefore, it is possible to efficiently increase the velocity and volume of the liquid droplets of the liquid DL that fly from the nozzle 32.

According to the displacement amplifying mechanism 20, since the elastic material 235 is supported by the partition wall portion 232, the compliance of the elastic material 235 with respect to the displacement of the actuator 41 is enhanced. In particular, in the seventeenth embodiment, as described above, when the actuator 41 extends, an elastic force as a restoring force is generated in the deformation portion 233 in a direction opposite to the direction where the actuator 41 extends. Therefore, due to the elastic force, restoration of the elastic material 235 and the deformation portion 233 when the actuator 41 contracts is promoted, and the compliance of the elastic material 235 and the deformation portion 233 to the actuator 41 is further enhanced, so that it is possible to more reliably separate liquid droplets from the liquid DL of the nozzle 32. Therefore, it is possible to inhibit the liquid droplets of the liquid DL from being unnecessarily tailed and mist from being unnecessarily generated as the liquid droplets are ejected, and deterioration of the flight state of the liquid droplets is inhibited.

In the head portion 30R, as described above, the adjustment portion 240 can adjust the initial pressure received by the elastic material 235 from the actuator 41 in the initial state when the actuator 41 is not driven. The initial pressure applied to the elastic material 235 affects the response characteristic of the displacement amplifying mechanism 20 to the actuator 41. Therefore, by adjusting the adjustment portion 240, it is possible to adjust the ejection characteristic of the liquid DL in the head portion 30R.

In the seventeenth embodiment, the actuator 41 is pushed toward the accommodation chamber 231 by the adjustment screw 241 of the adjustment portion 240, and the elastic material 235 is pressurized. Since the elastic material 235 is pressurized, the compression amount of the elastic material 235 at the moment when the actuator 41 is extended can be reduced. Therefore, it is possible to inhibit the pressure generated by the displacement of the actuator 41 from being absorbed by the compression of the elastic material 235 only by the amount that the elastic material 235 is pressurized. Therefore, the responsiveness to the displacement of the actuator 41 is enhanced, and the pressure transmission efficiency in the displacement amplifying mechanism 20 is enhanced.

As described above, in the liquid ejecting apparatus 100R of the seventeenth embodiment, the ejection performance of the liquid DL is enhanced while inhibiting the complication and enlargement of the apparatus by the displacement amplifying mechanism 20 having a simple configuration using the principle of Pascal. According to the displacement amplifying mechanism 20 provided in the liquid ejecting apparatus 100R of the seventeenth embodiment, occurrence of mechanical wear can be inhibited when the displacement of the actuator 41 is repeated as compared with a mechanical structure in which pressure is transmitted by a rigid joint mechanism utilizing a lever or a gear or the like. In addition, it is possible to reduce the size and weight of the liquid ejecting apparatus 100R.

In the liquid ejecting apparatus 100R of the seventeenth embodiment, since the elastic material 235 is supported by the partition wall portion 232, even if the displacement of the actuator 41 is increased or decreased repeatedly, the elastic material 235 is inhibited from moving to the pressure chamber 33. In addition, in the displacement amplifying mechanism 20, the elastic material 235 is used as a pressure transmission medium. Therefore, even if the actuator 41 is displaced at a high speed, it is possible to inhibit air bubbles (cavitation) in the pressure transmission medium. Therefore, performance deterioration of the displacement amplifying mechanism 20 due to cavitation is inhibited, and the head portion 30R can be stably driven. In addition, according to the displacement amplifying mechanism 20, since the elastic material 235 is used as the pressure transmission medium, the occurrence of evaporation and leakage of the pressure transmission medium is inhibited.

According to the liquid ejecting apparatus 100R of the seventeenth embodiment, a manufacturing step thereof is facilitated as described below, and the manufacturing cost can be reduced. The elastic material 235 is used as the pressure transmission medium of the displacement amplifying mechanism 20, so that it is easier to transport and install the elastic material 235 in the manufacturing step, as compared with a case where the liquid is used as the pressure transmission medium. In addition, it is possible to inhibit a portion of the elastic material 235 from accidentally entering the pressure chamber 33 by the partition wall portion 232 when the displacement amplifying mechanism 20 is assembled.

In the liquid ejecting apparatus 100R of the seventeenth embodiment, the deformation portion 233 of the partition wall portion 232 is configured as a diaphragm, and when the actuator 41 extends, the deformation portion 233 is flexibly deformed in a state where an elastic force as a restoring force is generated. Therefore, the compliance of the elastic material 235 and the deformation portion 233 with respect to the displacement of the actuator 41 when the actuator 41 is contracted is enhanced, and the accuracy of the ejection control of the liquid DL is enhanced.

In the liquid ejecting apparatus 100R of the seventeenth embodiment, the filler 236 is dispersed inside the elastic material 235 and the filler 236 inhibits the pressure applied from the actuator 41 from being absorbed by the compression of the volume of the elastic material 235. Therefore, the transmission efficiency of pressure in the displacement amplifying mechanism 20 is enhanced, and the responsiveness of the displacement amplifying mechanism 20 to the displacement of the actuator 41 is enhanced. Therefore, the ejection efficiency of the liquid DL in the liquid ejecting apparatus 100R and the ejection control accuracy of the liquid DL are enhanced.

In the liquid ejecting apparatus 100R of the seventeenth embodiment, since the accommodation chamber 231 is sealed by the sealing wall portion 237, leakage of the elastic material 235 of the accommodation chamber 231 toward the actuator 41 is inhibited. In the liquid ejecting apparatus 100R of the seventeenth embodiment, since it is possible to eject liquid droplets from each of the plurality of nozzles 32 of the head portion 30R, it is efficient. Additionally, according to the liquid ejecting apparatus 100R of the seventeenth embodiment, the various operational effects described in the seventeenth embodiment can be achieved.

18. Eighteenth Embodiment

Figure 23:
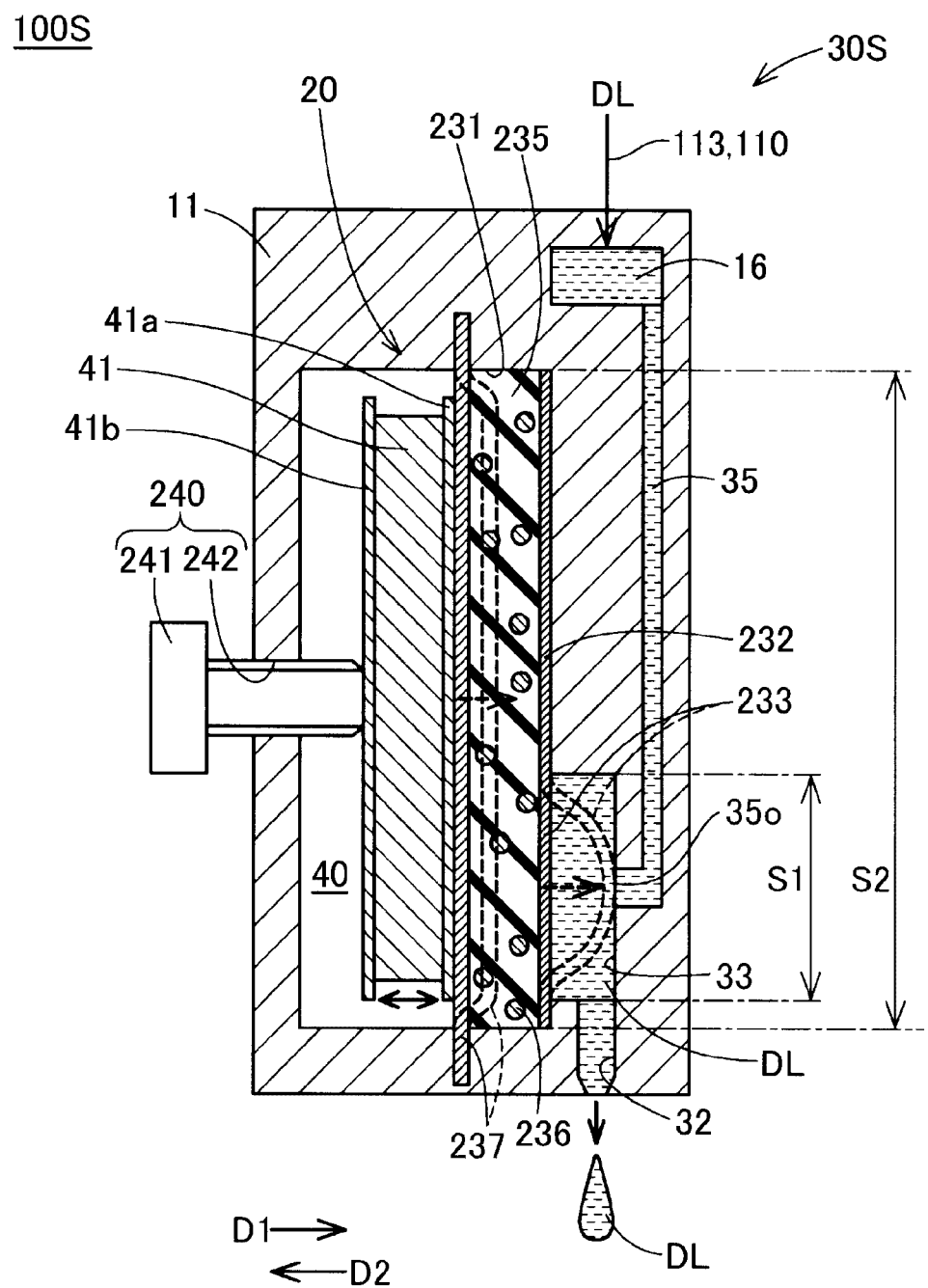
FIG. 23 is a schematic diagram showing a configuration of a head portion according to an eighteenth embodiment.

FIG. 23 is a schematic cross-sectional view showing a configuration of a head portion 30S provided with a liquid ejecting apparatus 100S according to an eighteenth embodiment. The configuration of the liquid ejecting apparatus 100S of the eighteenth embodiment is substantially the same as that of the liquid ejecting apparatus 100R of the seventeenth embodiment (FIG. 21) except that the head portion 30S of the eighteenth embodiment is provided instead of the head portion 30R of the seventeenth embodiment. The configuration of the head portion 30S of the eighteenth embodiment is substantially the same as that of the head portion 30R of the seventeenth embodiment (FIG. 22) basically except for the points described below.

In the head portion 30S of the eighteenth embodiment, the drive chamber 40 and the accommodation chamber 231 are disposed in the horizontal direction, and the partition wall portion 232 and the sealing wall portion 237 are disposed along the direction of gravity (FIG. 23). The actuator 41 is installed so as to expand and contract in the horizontal direction within the drive chamber 40, and the sealing wall portion 237 and the partition wall portion 232 are flexibly deformed in the horizontal direction. In the eighteenth embodiment, the first direction D1 and the second direction D2 are directions along the horizontal direction.

In the head portion 30S of the eighteenth embodiment, the nozzle 32 is open at the bottom surface of the pressure chamber 33, and ejects the liquid DL along the direction of gravity similar to the head portion 30R of the seventeenth embodiment. In addition, the supply flow path 35 is also connected to the pressure chamber 33 in the horizontal direction similar to the head portion 30R of the seventeenth embodiment. However, in the head portion 30S of the eighteenth embodiment, the flow path port 35o which is the opening end portion of the supply flow path 35 and is open on the wall surface of the pressure chamber 33 is provided at a position facing the deformation portion 233 in the displacement direction of the deformation portion 233.

In the head portion 30S of the eighteenth embodiment, when the actuator 41 is extended in order to eject the liquid DL from the nozzle 32, the deformation portion 233 is flexibly deformed towards the flow path port 35o, so that the flow path port 35o is substantially closed. As a result, the ejection pressure generated in the pressure chamber 33 is inhibited from being released to the supply flow path 35 through the flow path port 35o. Therefore, the ejection efficiency of the liquid DL in the liquid ejecting apparatus 100S is enhanced.

The flow path port 35o may not be completely closed by the deformation portion 233. The flow path port 35o may be closed to such a degree that the inflow amount of the liquid DL from the supply flow path 35 to the pressure chamber 33 rapidly decreases at the flexure deformation timing of the deformation portion 233. In the head portion 30S of the eighteenth embodiment, it is desirable that the partition wall portion 232 (at least deformation portion 233) is formed of, for example, a rubber material such as silicon rubber. As a result, the amount of deformation of the deformation portion 233 due to the flexure deformation is easily increased. In addition, it is possible to enhance the sealing property of the deformation portion 233 to the flow path port 35o.

According to the liquid ejecting apparatus 100S of the eighteenth embodiment, the width of the accommodation chamber 231 in the direction along the ejection direction of the liquid DL is increased, so that it is possible to make the area S2 larger than the area S1 while inhibiting the increase of the size in the direction intersecting the ejection direction. Therefore, it is possible to increase the arrangement density of the nozzles 32 in the head portion 30S by narrowing the arrangement interval of the nozzles 32 in the direction intersecting the ejection direction. In addition, according to the liquid ejecting apparatus 100S of the eighteenth embodiment, as described above, the ejection pressure for ejecting the liquid DL is inhibited from being released to the supply flow path 35 by the closing of the flow path port 35o by the deformation portion 233, so that the ejection efficiency of the liquid DL is enhanced. Additionally, according to the liquid ejecting apparatus 100S of the eighteenth embodiment, the various operational effects described in the eighteenth embodiment and the seventeenth embodiment can be achieved.

19. Nineteenth Embodiment

Figure 24:
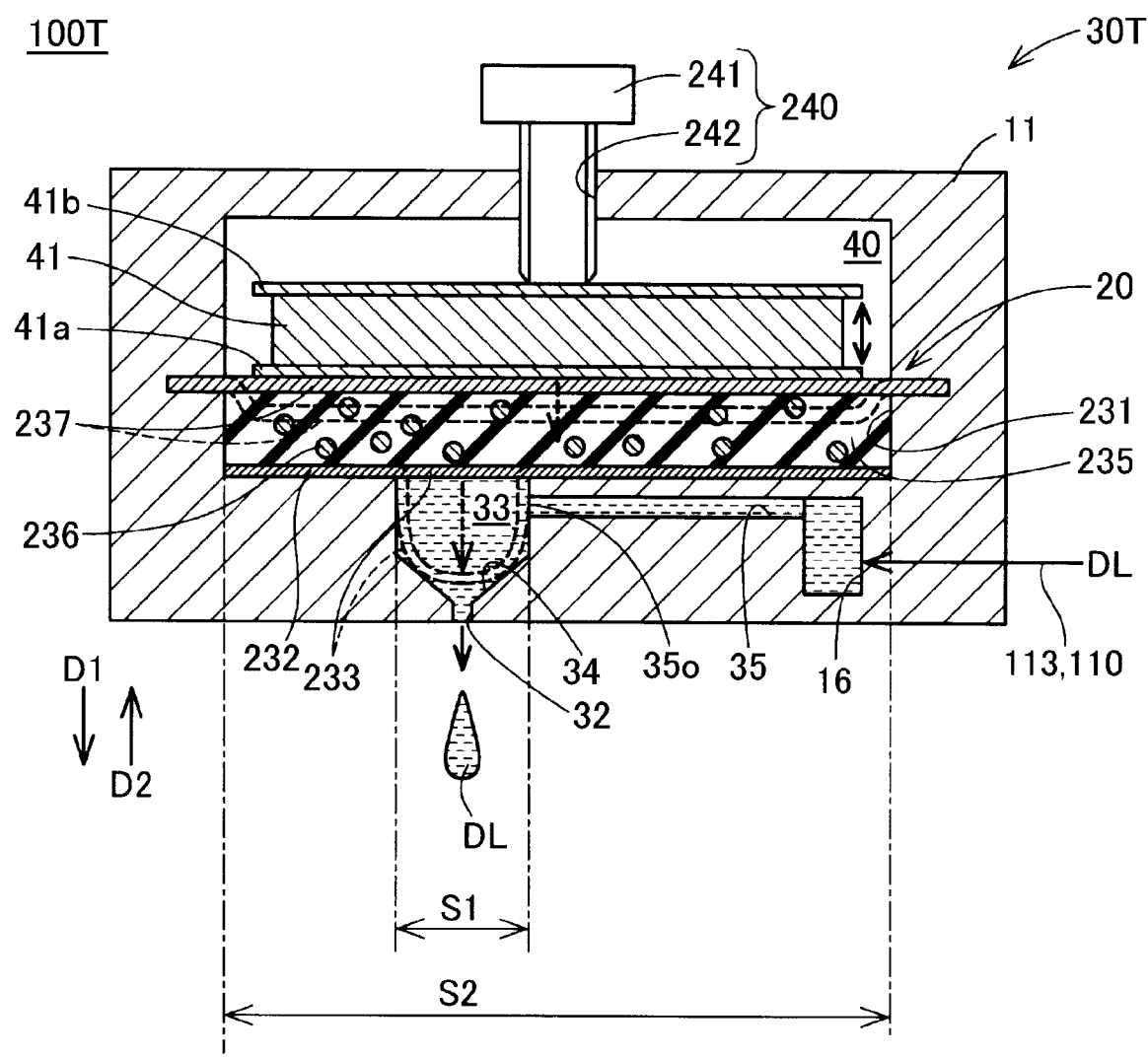
FIG. 24 is a schematic diagram showing a configuration of a head portion according to a nineteenth embodiment.

FIG. 24 is a schematic cross-sectional view showing a configuration of a head portion 30T provided with a liquid ejecting apparatus 100T according to a nineteenth embodiment. The configuration of the liquid ejecting apparatus 100T of the nineteenth embodiment is substantially the same as that of the liquid ejecting apparatus 100R of the seventeenth embodiment (FIG. 21) except that the head portion 30T of the nineteenth embodiment is provided instead of the head portion 30R of the seventeenth embodiment. The configuration of the head portion 30T of the nineteenth embodiment is substantially the same as that of the head portion 30R of the seventeenth embodiment (FIG. 22) basically except for the points described below.

In the head portion 30T of the nineteenth embodiment, an inclined wall surface 34 is provided at the bottom portion of the pressure chamber 33. The inclined wall surface 34 surrounds the opening end portion of the nozzle 32, faces in the direction of the deformation portion 233, and is inclined downward toward the nozzle 32. More specifically, the inclined wall surface 34 is configured as an inner wall surface of a tapered portion that decreases in diameter toward the nozzle 32.

In the head portion 30T of the nineteenth embodiment, when the actuator 41 extends, the deformation portion 233 is flexibly deformed in a direction from the accommodation chamber 231 to the pressure chamber 33 so as to contact the inclined wall surface 34, thereby causing the nozzle 32 into a substantially closed state. As a result, it is possible to further increase the ejection pressure for ejecting the liquid DL. In addition, in the head portion 30T of the nineteenth embodiment, the deformation portion 233 is guided by the inclined wall surface 34 to be flexibly deformed in a direction to close the nozzle 32. Therefore, the movement of the flexure deformation by the deformation portion 233 in the ejection step of the liquid DL is stabilized and smoothened, so that the stability of the ejection of the liquid DL from the nozzle 32 is enhanced.

In the head portion 30T of the nineteenth embodiment, the opening end portion of the supply flow path 35 and the flow path port 35o opened on the wall surface of the pressure chamber 33 are provided at positions facing the side surface of the deformation portion 233 flexibly deformed so as to protrude toward the nozzle 32. As a result, when the actuator 41 is extended so as to eject the liquid DL from the nozzle 32, the flow path port 35o is substantially closed by the deformation portion 233. Therefore, similarly to the case described in the eighteenth embodiment, the ejection pressure generated in the pressure chamber 33 is inhibited from being released into the supply flow path 35 through the flow path port 35o, so that the ejection efficiency of the liquid DL in the liquid ejecting apparatus 100T is enhanced.

The flow path port 35o may be provided on the side of the deformation portion 233 from a position in contact with the inclined wall surface 34 when the deformation portion 233 is flexibly deformed. It is desirable that the flow path port 35o is provided at a position closer to the partition wall portion 232 from the inclined wall surface 34.

In the head portion 30T of the nineteenth embodiment, it is desirable that the partition wall portion 232 (at least deformation portion 233) is formed of a rubber material such as silicon rubber, for example, similar to the head portion 30S of the eighteenth embodiment. As a result, it is easy to increase the amount of deformation of the deformation portion 233 due to the flexure deformation. In addition, it is possible to enhance the sealing property of the deformation portion 233 to the flow path port 35o.

As described above, according to the liquid ejecting apparatus 100T of the nineteenth embodiment, the flexure deformation of the deformation portion 233 can be stabilized and smoothed by the inclined wall surface 34 and the stability of the ejection of the liquid DL from the nozzle 32 can be enhanced. In addition, by closing the flow path port 35o by the deformation portion 233, the ejection pressure for ejecting the liquid DL is inhibited from being released to the supply flow path 35, so that the ejection efficiency of the liquid DL is enhanced. Additionally, according to the liquid ejecting apparatus 100T of the nineteenth embodiment, the various operational effects similar to those described in the nineteenth embodiment and in each of the above embodiments can be achieved.

20. Twentieth Embodiment

Figure 25:
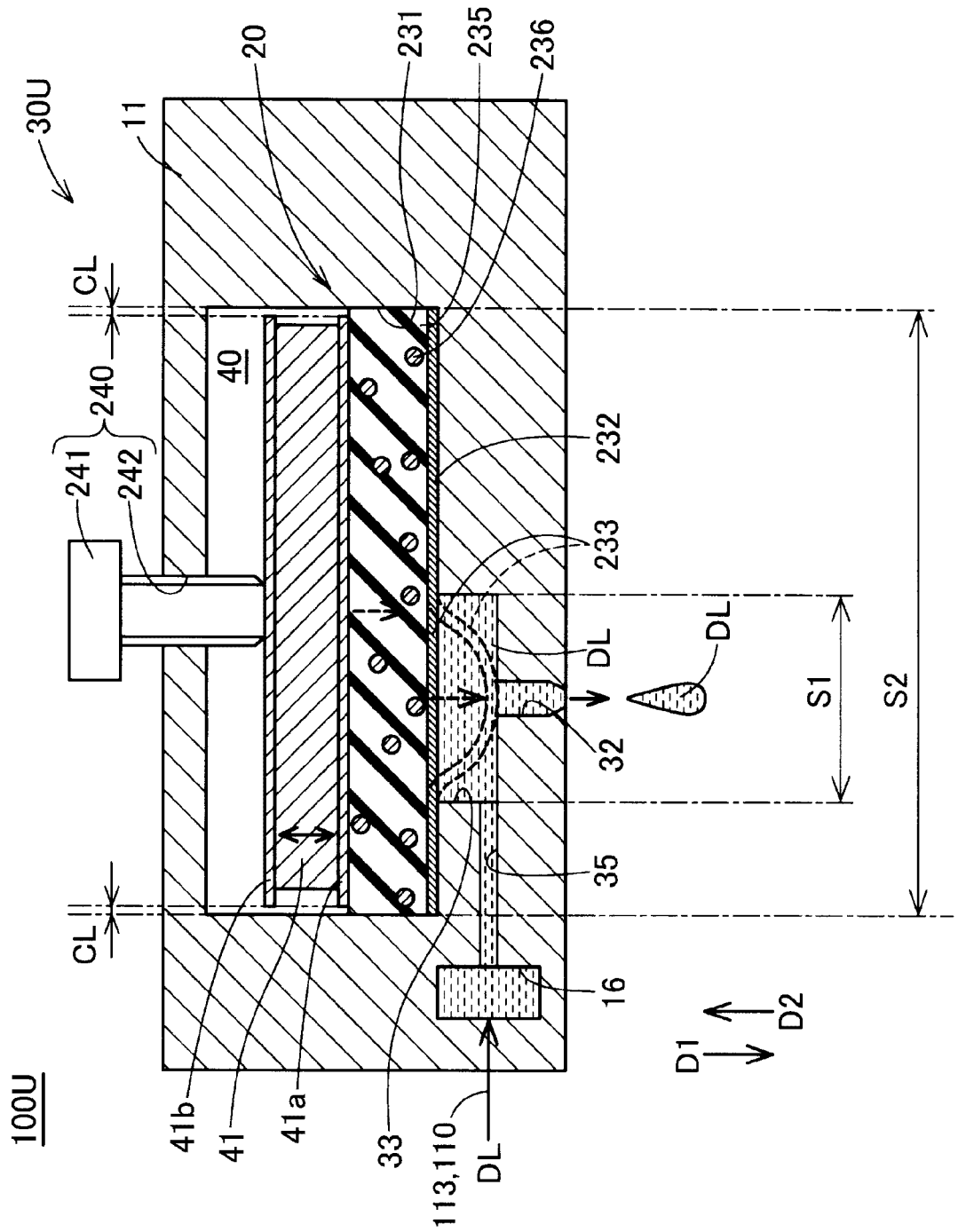
FIG. 25 is a schematic diagram showing a configuration of a head portion according to a twentieth embodiment.

FIG. 25 is a schematic cross-sectional view showing a configuration of a head portion 30U provided with a liquid ejecting apparatus 100U according to a twentieth embodiment. The configuration of the liquid ejecting apparatus 100U of the twentieth embodiment is substantially the same as that of the liquid ejecting apparatus 100R of the seventeenth embodiment (FIG. 21) except that the head portion 30U of the twentieth embodiment is provided instead of the head portion 30R of the seventeenth embodiment. The configuration of the head portion 30U of the twentieth embodiment is substantially the same as that of the head portion 30R of the seventeenth embodiment (FIG. 22) basically except for the points described below.

In the head portion 30U according to the twentieth embodiment, the sealing wall portion 237 is omitted, and the actuator 41 is in direct contact with the elastic material 235. A minute gap CL is formed between the actuator 41 and the wall surface of the accommodation chamber 231 accommodating the elastic material 235 so as not to hinder the expansion and contraction of the actuator 41. It is desirable that the width of the gap CL is such that a flow path resistance is obtained to such an extent that the elastic material 235 pressed by the actuator 41 does not leak to the actuator 41 side.

According to the liquid ejecting apparatus 100U in the twentieth embodiment, by omitting the sealing wall portion 237, the pressure applied to the elastic material 235 due to extension of the actuator 41 and the expansion and contraction speed of the actuator 41 are inhibited from being reduced. Additionally, according to the liquid ejecting apparatus 100U of the twentieth embodiment, the various operational effects similar to those described in the twentieth embodiment and in each of the above embodiments can be achieved.

21. Twenty-First Embodiment

Figure 26:
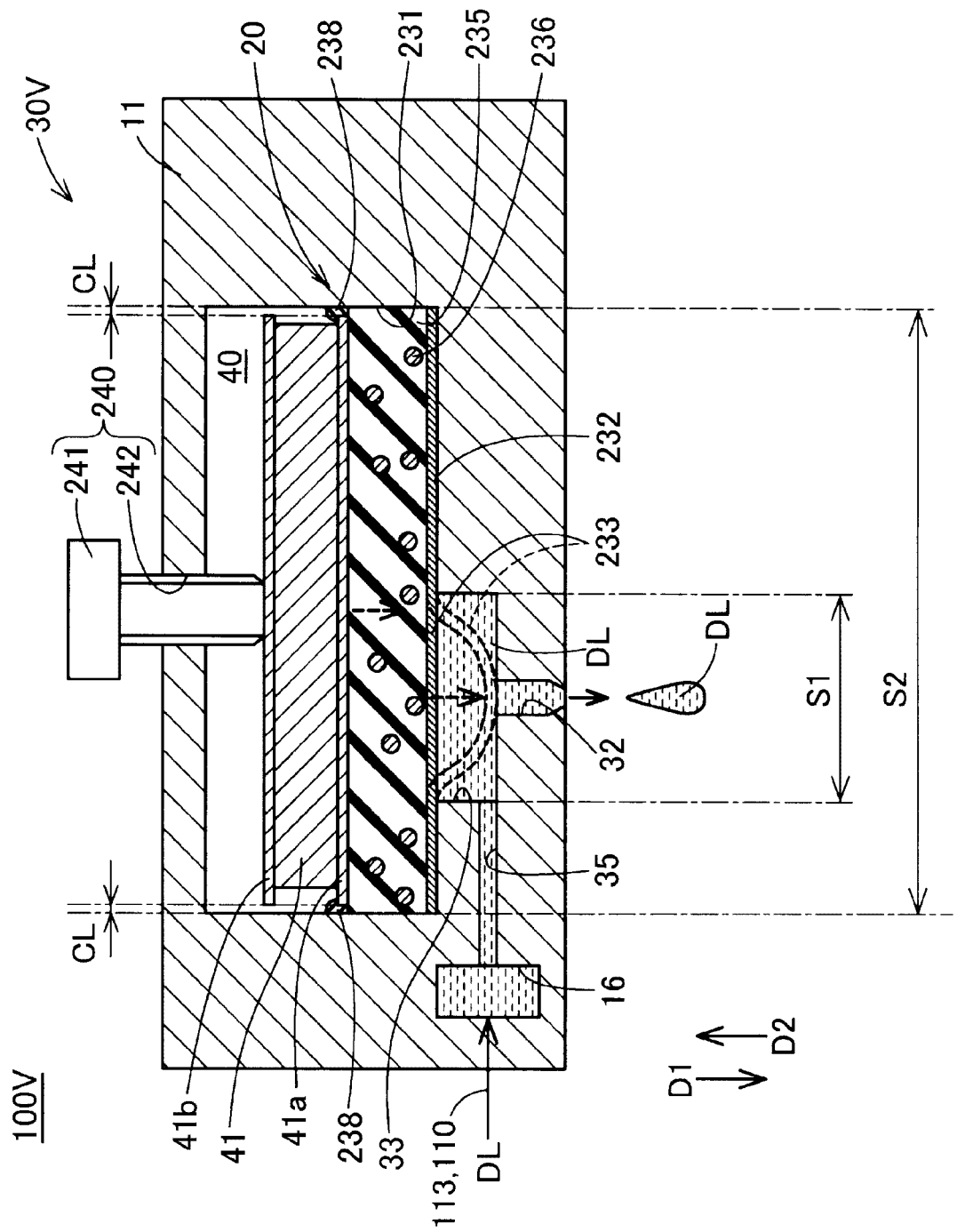
FIG. 26 is a schematic diagram showing a configuration of a head portion according to a twenty-first embodiment.

FIG. 26 is a schematic cross-sectional view showing a configuration of a head portion 30V provided with a liquid ejecting apparatus 100V according to a twenty-first embodiment. The configuration of the liquid ejecting apparatus 100V of the twenty-first embodiment is substantially the same as that of the liquid ejecting apparatus 100U of the twentieth embodiment except that the head portion 30V of the twenty-first embodiment is provided instead of the head portion 30U of the twentieth embodiment. The configuration of the head portion 30V of the twenty-first embodiment is substantially the same as that of the head portion 30U of the twentieth embodiment (FIG. 25) except that a gap CL is filled with the adhesive 238.

According to the liquid ejecting apparatus 100V of the twenty-first embodiment, the adhesive 238 inhibits the elastic material 235 from leaking in the direction of the actuator 41 from the gap CL. As the adhesive 238, it is desirable to use a material deformable so as not to be ruptured by the displacement of the actuator 41. Additionally, according to the liquid ejecting apparatus 100V of the twenty-first embodiment, the various operational effects similar to those described in the twentieth embodiment and in each of the above embodiments can be achieved.

22. Twenty-Second Embodiment

Figure 27:
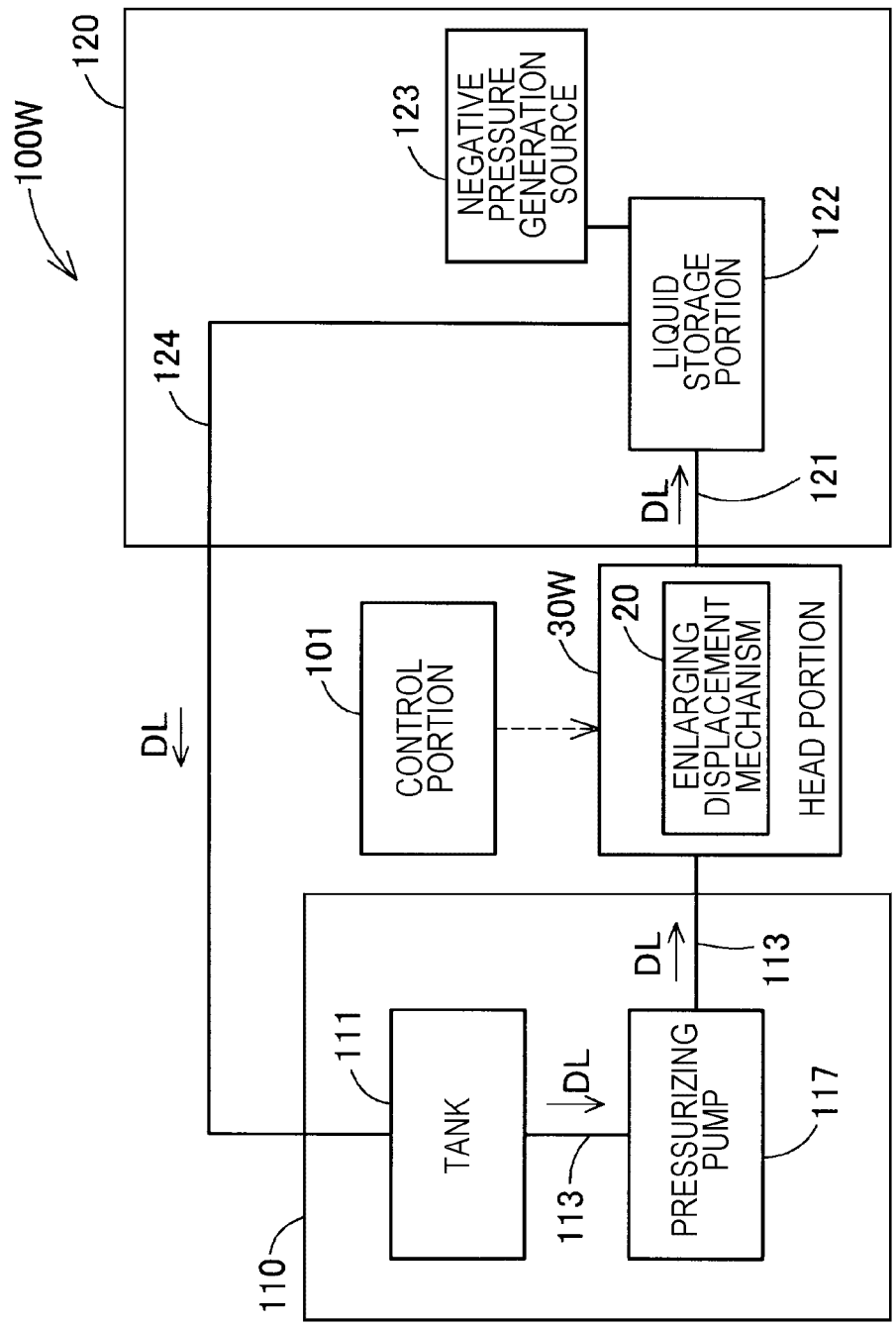
FIG. 27 is a schematic block diagram showing a configuration of a liquid ejecting apparatus according to a twenty-second embodiment.

FIG. 27 is a schematic block diagram showing a configuration of a liquid ejecting apparatus 100W according to a twenty-second embodiment. The configuration of the liquid ejecting apparatus 100W of the twenty-second embodiment is substantially the same as that of the liquid ejecting apparatus 100R of the seventeenth embodiment (FIG. 21) except that the points described below. The supply portion 110 of the liquid ejecting apparatus 100W is provided with the pressurizing pump 117 instead of the pressure adjustment portion 115. The liquid ejecting apparatus 100W is provided with the head portion 30W of the twenty-second embodiment instead of the head portion 30R of the seventeenth embodiment. The liquid ejecting apparatus 100W is further provided with the circulation portion 120 connected to the head portion 30W. The circulation portion 120 is provided with the discharge path 121, the liquid storage portion 122, the negative pressure generation source 123, and the circulation path 124.

The pressurizing pump 117 pressure-feeds the liquid DL in the tank 111 to the head portion 30W through the supply path 113. The configuration of the head portion 30W will be described later. The discharge path 121 connects the head portion 30W and the liquid storage portion 122. The liquid DL not used for ejection in the head portion 30W is discharged to the liquid storage portion 122 through the discharge path 121. The negative pressure generation source 123 is connected to the liquid storage portion 122. The negative pressure generation source 123 sucks the liquid DL from the head portion 30W through the discharge path 121 by setting the inside of the liquid storage portion 122 to a negative pressure. The negative pressure generation source 123 is formed of various pumps.

In the liquid ejecting apparatus 100W, the pressure in the pressure chamber 33 of the head portion 30W (shown in FIG. 28 to be referred to later) is adjusted by pressurization by the pressurizing pump 117 and depressurization by the negative pressure generation source 123. In the liquid ejecting apparatus 100W, any one of the pressurizing pump 117 and the negative pressure generation source 123 may be omitted. In a case where the pressurizing pump 117 is omitted, it can be interpreted that the negative pressure generation source 123 functions as a component of the supply portion 110 that generates pressure for pressure-feeding the liquid DL from the tank 111 to the head portion 30W.

The circulation path 124 is a flow path for circulating the liquid DL discharged from the head portion 30W through the discharge path 121 to the pressure chamber 33 of the head portion 30W. The circulation path 124 connects the liquid storage portion 122 and the tank 111. The liquid DL stored in the liquid storage portion 122 through the discharge path 121 is returned to the tank 111 through the circulation path 124 and is again supplied to the pressure chamber 33 of the head portion 30W through the supply path 113. The circulation path 124 may be provided with a pump for sucking liquid from the liquid storage portion 122.

In the liquid ejecting apparatus 100W, since the circulation portion 120 is provided, the liquid DL flowing out from the head portion 30W can be reused. Therefore, it is possible to prevent the liquid DL from being wastefully consumed, and to enhance the utilization efficiency of the liquid DL. The liquid storage portion 122 and the tank 111 may be provided with the adjustment portion for adjusting various states such as the concentration, viscosity, temperature, and the like of the liquid DL to be reused. In addition, in the discharge path 121 and the circulation path 124, a filter portion for removing air bubbles and foreign matter contained in the liquid DL may be provided.

Figure 28:
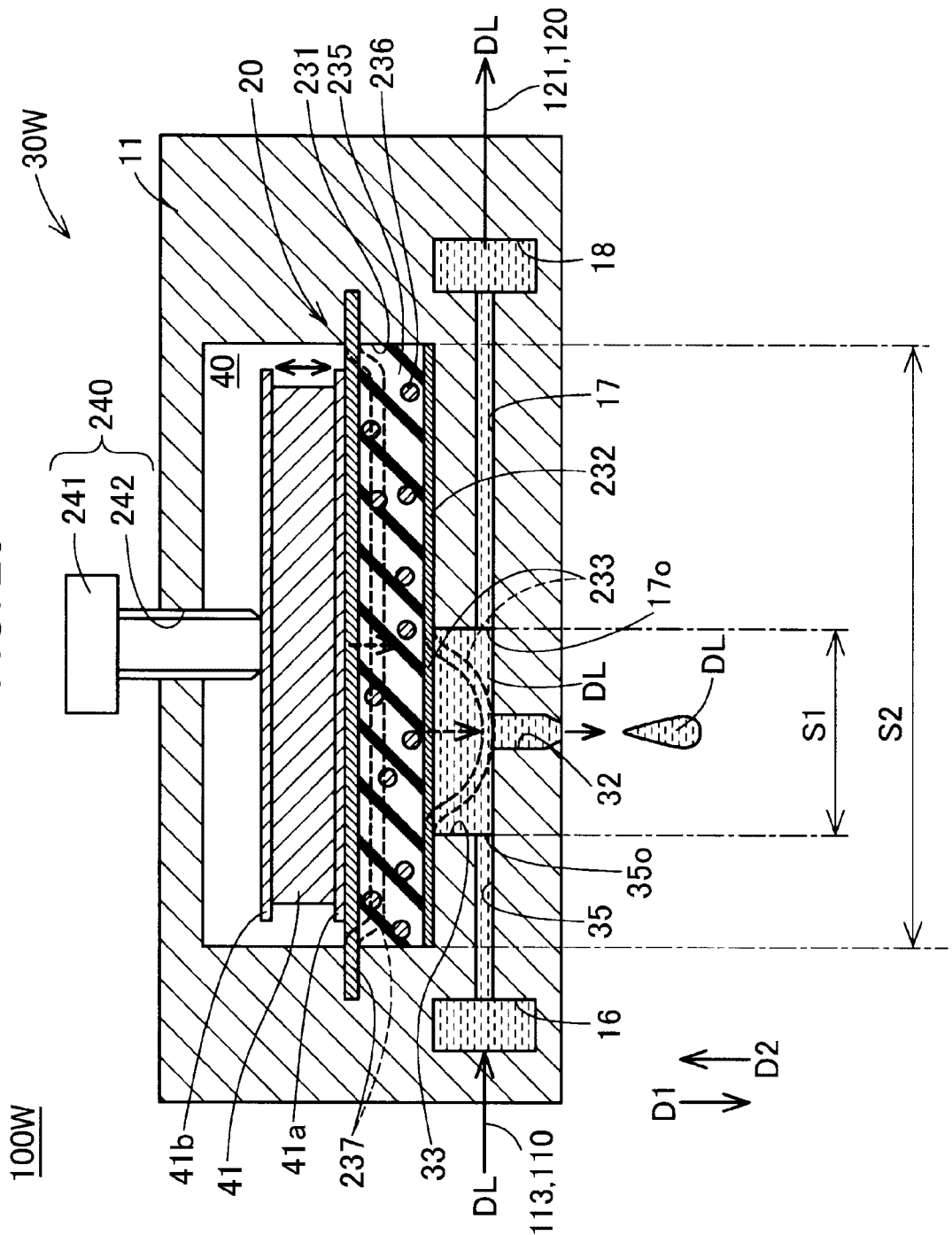
FIG. 28 is a schematic diagram showing a configuration of a head portion according to the twenty-second embodiment.

FIG. 28 is a schematic cross-sectional view showing a configuration of a head portion 30W according to the twenty-second embodiment. The configuration of the head portion 30W of the twenty-second embodiment is substantially the same as that of the head portion 30R of the seventeenth embodiment (FIG. 22) except that a discharge flow path 17 and a common discharge flow path 18 are added.

The discharge flow path 17 is provided in the housing 11 and is connected to the pressure chamber 33. In the head portion 30W, each of the plurality of discharge flow paths 17 is connected to a corresponding chamber of the plurality of pressure chambers 33. On the wall surface of each of the pressure chambers 33, a flow path port 17o which is an opening end portion of the discharge flow path 17 is opened, in addition to the flow path port 35o which is the opening end portion of the supply flow path 35. Each of the discharge flow paths 17 is provided inside the housing 11 and joins a single common discharge flow path 18 connected to the discharge path 121 (FIG. 27) of the circulation portion 120. In the head portion 30W, the liquid DL not used for ejection is discharged from the pressure chamber 33 through the discharge flow path 17, and is discharged from the head portion 30W through the common discharge flow path 18.

In the head portion 30W of the liquid ejecting apparatus 100W, a flow of the liquid DL flowing from the flow path port 35o of the supply flow path 35 to the flow path port 17o of the discharge flow path 17 can be generated in the pressure chamber 33. Therefore, for example, occurrence of troubles of the liquid DL caused by the retention of the liquid DL such as accumulation of sedimentary components in the liquid DL, and concentration change with evaporation of the solvent component in the liquid DL is inhibited in the pressure chamber 33 while the liquid DL is not being ejected for a long time. In addition, occurrence of ejection failure of the liquid DL caused by such troubles is inhibited. In the liquid ejecting apparatus 100W, for example, even if air bubbles enter the pressure chamber 33 through the nozzle 32, the air bubbles can be discharged from the discharge flow path 17 together with the liquid DL. Therefore, occurrence of ejection failure due to air bubbles in the pressure chamber 33 is inhibited. Additionally, according to the liquid ejecting apparatus 100W of the twenty-second embodiment, the various operational effects described in the seventeenth embodiment can be achieved, in addition to the various operational effects described in the twenty-second embodiment.

23. Other Embodiment

Various configurations described in the above embodiments can be modified as follows, for example. Each of the other embodiments described below is positioned as an example of an aspect for performing the invention similar to the above embodiments.

23-1. Other Embodiment 1

In the above embodiment, the actuator 41 may not be formed of a piezo element. For example, the actuator 41 may be formed of various elements that generate displacement, such as an air cylinder, a solenoid, and a magnetostrictive element.

23-2. Other Embodiment 2

In the above embodiment, the filler 25 dispersed in the liquid 22 may be omitted. In addition, in each of the above embodiments, an agitating mechanism for agitating the liquid 22 may be provided in the accommodation chamber 21 in order to inhibit settling of the filler 25.

23-3. Other Embodiment 3

In the liquid ejecting apparatuses 100E to 100I of the fifth embodiment, the sixth embodiment, the seventh embodiment, the eighth embodiment, and the ninth embodiment, the first wall portion 23E may be disposed along the direction of gravity as described in the tenth embodiment and the eleventh embodiment.

23-4. Other Embodiment 4

In the head portion 30M of the liquid ejecting apparatus 100M of the thirteenth embodiment, the configurations of the displacement amplifying mechanisms 20D to 20L of the fourth embodiment, the fifth embodiment, the sixth embodiment, the seventh embodiment, the eighth embodiment, the ninth embodiment, the tenth embodiment, the eleventh embodiment, and the twelfth embodiment may be applied.

23-5. Other Embodiment 5

In the liquid ejecting apparatuses 100C to 100N according to the third embodiment to the fourteenth embodiment described above, the head portions 30C to 30N may have a configuration in which a plurality of nozzles 32 are disposed. In this case, a plurality of pressure chambers 33 corresponding to the number of nozzles 32 and a plurality of displacement amplifying mechanisms 20C to 20N may be provided in the housing 31. In addition, for example, the ejection liquid DL different in composition, concentration, contained component, color and the like may be ejected from each nozzle 32.

23-6. Other Embodiment 6

In the above fourteenth embodiment, the discharge flow path 60 may be omitted.

23-7. Other Embodiment 7

In the above embodiment, the elastic material 235 may be disposed in the accommodation chamber 231 in a state molded in advance in accordance with the shape of the accommodation chamber 231 or may be injected into the accommodation chamber 231 in a fluid state and molded. The elastic material 235 may not be formed of a material that is held in shape when taken out from the accommodation chamber 231, and may be formed of a gel body having both fluidity and elasticity, for example. The elastic material 235 is not limited to a rubbery elastic body. As described in the seventeenth embodiment, the elastic material 235 can be formed of a material exhibiting a fluid behavior in which pressure can be transmitted in all directions like a liquid inside when applied with pressure. It is desirable that the elastic material 235 is formed of a material which is difficult to be compressed in volume when externally applied pressure is applied thereto.

23-8. Other Embodiment 8

In the above embodiment, the filler 236 dispersed inside the elastic material 235 may be omitted.

23-9. Other Embodiment 9

In the above embodiment, the deformation portion 233 is formed of a material that is flexibly deformed in a state where an elastic force is generated in the second direction D2 when the deformation portion 233 is flexibly deformed in the first direction D1 from the accommodation chamber 231 toward the pressure chamber 33. On the other hand, the deformation portion 233 may be formed of a film-like member that does not substantially generates an elastic force enough to restore the shape of the deformation portion 233 when the external force is released.

The material forming the deformation portion 233 is not particularly limited. The deformation portion 233 can be made of various materials as follows, for example. The deformation portion 233 may be formed of natural rubber (NR), synthetic natural rubber, butadiene rubber (BR), butyl rubber (IIR), nitrile rubber (NBR), ethylene propylene rubber (EPM), chloroprene rubber (CR), rubber (ACM), fluororubber (FKM), ethylene vinyl acetate rubber, epichlorohydrin rubber (CO, ECO), polysulfide rubber, and the like.

In addition, the deformation portion 233 is formed of a material such as polyethylene or polypropylene (PP), polystyrene (PS), polyvinyl chloride (PVC), nylon, polyethylene terephthalate (PET), polycarbonate (PC), polyvinylidene fluoride resin (PVDF resin), EVOH resin, and the like. The sealing wall portion 237 may be formed of the above-described material, similarly to the deformation portion 233.

The shape of the deformation portion 233 is not limited to a flat shape having a substantially uniform thickness. For example, the deformation portion 233 may have a configuration bent into a bellows so as to be flexibly deformed in the thickness direction, or a configuration in which a groove for reducing the thickness to be likely to bend is provided. In each of the above embodiments, the deformation portion 233 and the partition wall portion 232 may be formed of the same material as the elastic material 235. In addition, the deformation portion 233 and the partition wall portion 232 may be formed of a portion of the elastic material 235.

23-10. Other Embodiment 10

The arrangement configuration of the actuator 41, the displacement amplifying mechanism 20, and the pressure chamber 33 is not limited to the configurations of each of the above embodiments. For example, in the above nineteenth embodiment, the twentieth embodiment, the twenty-first embodiment, and the twenty-second embodiment, as in the eighteenth embodiment, the accommodation chamber 231 and the pressure chamber 33 may be configured to be disposed in the horizontal direction. In addition, for example, in each of the above embodiments, the actuator 41 may be disposed so as to expand and contract in the horizontal direction, and the deformation portion 233 may be flexibly deformed along the direction of gravity.

23-11. Other Embodiment 11

The configuration of the discharge flow path 17 and the circulation portion 120 described in the twenty-second embodiment may be applied to the liquid ejecting apparatuses 100S to 100V of the eighteenth embodiment, the nineteenth embodiment, the twentieth embodiment, and the twenty-first embodiment. In the configuration of the twenty-second embodiment described above, a configuration in which the liquid storage portion 122 and the circulation path 124 are omitted, and the liquid DL discharged from the pressure chamber 33 through the discharge flow path 17 is discarded as it is may be adopted. In a case where the discharge flow path 17 of the twenty-second embodiment is applied to the head portion 30T of the nineteenth embodiment, when the deformation portion 233 is flexibly deformed in the first direction D1, the flow path port 17o of the discharge flow path 17 may be configured to be substantially closed.

23-12. Other Embodiment 12

The inclined wall surface 34 described in the nineteenth embodiment may be applied to the head portions 30R, 30S, 30U, 30V, 30W of the seventeenth embodiment, the eighteenth embodiment, the twentieth embodiment, the twenty-first embodiment, and the twenty-second embodiment. In the above nineteenth embodiment, the inclined wall surface 34 may be omitted.

23-13. Other Embodiment 13

In the above embodiment, the adjustment portion 240 may be omitted. In addition, in the above embodiment, the accommodation chamber 231 may not be filled with the elastic material 235 in a pressurized state. The elastic material 235 may not be pressurized by the adjustment portion 240, but may be pressurized by press-fitting the material into the accommodation chamber 231 when assembled in the accommodation chamber 231 in the manufacturing step.

23-14. Other Embodiment 14

In the above embodiment, the head portions 30R to 30W are provided with a plurality of sets of the nozzle 32, the pressure chamber 33, and the displacement amplifying mechanism 20. On the other hand, the head portions 30R to 30W may have only one ejection mechanism including the nozzle 32, the pressure chamber 33, and the displacement amplifying mechanism 20.

23-15. Other Embodiment 15

In the seventeenth embodiment, the eighteenth embodiment, and the nineteenth embodiment, the sealing wall portion 237 is formed of a member which is flexibly deformed. On the other hand, the sealing wall portion 237 may be formed of a plate-like member having rigidity which is not substantially flexibly deformed. In this case, the sealing wall portion 237 is disposed between the actuator 41 and the elastic material 235 in a state where the outer peripheral end portion thereof is not fixed to the housing 11 so as to move by the displacement of the actuator 41. In this configuration, it is desirable that the gap between the outer peripheral end portion of the sealing wall portion 237 and the side wall surface of the accommodation chamber 231 has a width that provides a flow path resistance to the extent that the elastic material 235 pressed by the actuator 41 is inhibited from moving toward the actuator 41 side. Alternatively, similarly to the structure described in the twenty-first embodiment, a configuration in which the adhesive is disposed in the gap between the outer peripheral end of the sealing wall portion 237 and the side wall surface of the accommodation chamber 231 may be applied.

23-16. Other Embodiment 16

The invention is not limited to a liquid ejecting apparatus that ejects ink, and can also be applied to any liquid ejecting apparatus that ejects liquid other than ink. For example, the invention can be applied to various liquid ejecting apparatuses as follows.

(1) An image recording apparatus such as a facsimile apparatus.

(2) A color material ejecting apparatus used for manufacturing a color filter for an image display device such as a liquid crystal display.

(3) An electrode material ejecting apparatus used for forming electrodes of organic electro luminescence (EL) display, field emission display (FED), and the like.

(4) A liquid ejecting apparatus which ejects liquid containing bioorganic matter used for manufacturing biochip.

(5) A sample ejecting apparatus as a precision pipette.

(6) A lubricating oil ejecting apparatus.

(7) A resin liquid ejecting apparatus.

(8) A liquid ejecting apparatus that ejects lubricating oil at pinpoint to a precision machine such as a watch or a camera.

(9) A liquid ejecting apparatus for ejecting a transparent resin liquid such as an ultraviolet curable resin liquid onto a substrate to form a micro hemispherical lens (optical lens) or the like used for an optical communication element or the like.

(10) A liquid ejecting apparatus which ejects an acidic or alkaline etchant for etching a substrate or the like.

(11) A liquid ejecting apparatus provided with a liquid ejecting head for ejecting any other minute amount of liquid droplets.

In this specification, the term "liquid" may be a material that can be consumed by the liquid ejecting apparatus. For example, "liquid" may be a material in the state when the material is in liquid phase, and the material in liquid state having high or low viscosity and the material in liquid state such as sol, gel water, other inorganic solvents, organic solvents, solutions, liquid resins, liquid metals (metal melts) are also included in "liquid". In addition, "liquid" includes not only liquid as one state of a material, but also particles obtained by dissolving, dispersing or mixing particles of a functional material formed of a solid such as pigment or metallic particle in a solvent. Representative examples of liquids include ink and liquid crystal. Herein, the ink includes various liquid compositions such as general water-based ink and oil-based ink, gel ink, hot melt ink, and the like. In addition, "liquid droplet" refers to a state of liquid ejected from the liquid ejecting apparatus, and includes a state where a tail is drawn in the form of granules, teardrops, and threads.

23-17. Other Embodiment 17

In the above embodiment, a portion or all of the functions and processes realized by the software may be realized by hardware. In addition, a portion or all of the functions and processes realized by hardware may be realized by software. As the hardware, for example, various circuits such as an integrated circuit, a discrete circuit, or a circuit module combining these circuits can be used.

The invention is not limited to the above-described embodiment (including other embodiments) and example, and can be realized in various configurations without departing from the gist thereof. For example, in order to solve a portion or all of the above-described problems, or to achieve a portion or all of the above-described effects, embodiments corresponding to technical features in each aspect described in the summary of the invention and the technical features in the examples can be replaced or combined as appropriate. In addition, the invention is not limited to the case where the technical feature is not essential in the specification and can be appropriately deleted unless the technical features are described as essential in the specification.

The entire disclosure of Japanese Patent Application No.: 2017-189285, filed Sep. 29, 2017 and Japanese Patent Application No. 2017-229812, filed Nov. 30, 2017 are expressly incorporated by reference herein.

What is claimed is:

1. A liquid ejecting apparatus comprising:
a pressure chamber that communicates with a nozzle and contains an ejection liquid ejected from the nozzle;
a flow path that is connected to the pressure chamber and through which the ejection liquid circulates;
an actuator that changes a pressure of the pressure chamber by changing a volume of the pressure chamber; and
a displacement amplifying mechanism that is disposed between the pressure chamber and the actuator, enlarges an amount of displacement of the actuator, and transmits the enlarged amount of displacement to the pressure chamber,
wherein the displacement amplifying mechanism includes an accommodation chamber in which an elastic material is accommodated, and
a deformation portion that forms a wall surface of the accommodation chamber and is displaced in a first direction which is a direction away from the accommodation chamber in a state where an elastic force acting in a second direction approaching the accommodation chamber is generated by a pressure of the elastic material when the actuator applies a pressure to the elastic material, and
an area of the deformation portion in contact with the elastic material is smaller than an area of a region of the elastic material subjected to pressure from the actuator.

2. The liquid ejecting apparatus according to claim 1, wherein a wall surface of the deformation portion of the displacement amplifying mechanism opposite to the accommodation chamber forms a portion of a wall surface of the pressure chamber, and
when the deformation portion is displaced by the actuator, the deformation portion generates a pressure for ejecting the ejection liquid from the nozzle in the pressure chamber and closes the flow path.

3. The liquid ejecting apparatus according to claim 1, wherein the flow path includes a supply flow path that supplies the ejection liquid to the pressure chamber, and
the liquid ejecting apparatus further comprises a supply portion that pressure-feeds the ejection liquid to the pressure chamber through the supply flow path.

4. The liquid ejecting apparatus according to claim 3, wherein the flow path further includes a discharge flow path that discharges the ejection liquid from the pressure chamber, and
the liquid ejecting apparatus further comprises a circulation portion that circulates the ejection liquid discharged through the discharge flow path to the pressure chamber.

5. The liquid ejecting apparatus according to claim 1, further comprising:
a plurality of sets of the nozzle, the pressure chamber, the actuator, and the displacement amplifying mechanism.

* * * * *